(12) United States Patent
Ueki et al.

(10) Patent No.: US 10,595,021 B2
(45) Date of Patent: Mar. 17, 2020

(54) IMAGE PROCESSING DEVICE AND METHOD

(71) Applicant: SONY CORPORATION, Tokyo (JP)

(72) Inventors: Nobuo Ueki, Tokyo (JP); Takefumi Nagumo, Kanagawa (JP); Toshinori Ihara, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/554,575

(22) PCT Filed: Feb. 26, 2016

(86) PCT No.: PCT/JP2016/055795
§ 371 (c)(1),
(2) Date: Aug. 30, 2017

(87) PCT Pub. No.: WO2016/147836
PCT Pub. Date: Sep. 22, 2016

(65) Prior Publication Data
US 2018/0098069 A1    Apr. 5, 2018

(30) Foreign Application Priority Data

Mar. 13, 2015  (JP) ................................. 2015-050970

(51) Int. Cl.
*H04N 19/157*   (2014.01)
*H04N 19/172*   (2014.01)
(Continued)

(52) U.S. Cl.
CPC ......... *H04N 19/126* (2014.11); *H04N 19/172* (2014.11)

(58) Field of Classification Search
CPC .. H04N 19/126; H04N 19/157; H04N 19/159; H04N 19/172; H04N 19/117; H04N 19/176; H04N 19/82; H04N 19/86
(Continued)

(56) References Cited

U.S. PATENT DOCUMENTS 7,110,459 B2 * 9/2006 Srinivasan ............. H04N 19/52
                                                               375/240
7,116,831 B2 * 10/2006 Mukerjee ............. H04N 19/117
                                                               382/236
(Continued)

FOREIGN PATENT DOCUMENTS

JP    8-163549 A    6/1996
JP    08-163549 A   6/1996
(Continued)

OTHER PUBLICATIONS

Budagavi et al., Video Coding Using Compressed Reference Frames, 2008, IEEE, pp. 1165-1168. (Year: 2008).*

(Continued)

*Primary Examiner* — Christopher S Kelley
*Assistant Examiner* — Kathleen M Walsh
(74) *Attorney, Agent, or Firm* — Chip Law Group

(57) ABSTRACT

The present disclosure relates to an image processing device and method that can suppress deterioration of the picture quality by encoding. The image processing device includes a decoding unit configured to decode encoded data obtained by lossy encoding an image of a frame encoded already which is used as a reference image in encoding of an image of a current frame and perform rounding of a decoded image obtained by the decoding with a rounding value whose value is changed over in a time direction of the image. The present disclosure can be applied, for example, to an image processing device, an image encoding device or the like.

19 Claims, 31 Drawing Sheets

(51) Int. Cl.
*H04N 19/126* (2014.01)
*H04N 19/117* (2014.01)

(58) Field of Classification Search
USPC .................................................. 375/240.12
See application file for complete search history.

(56) References Cited

U.S. PATENT DOCUMENTS

| | | | |
|---|---|---|---|
| 7,822,282 B2* | 10/2010 | Kajiwara | H04N 19/46 |
| | | | 341/79 |
| 7,957,604 B2* | 6/2011 | Suzuki | H04N 19/63 |
| | | | 375/240.12 |
| 8,923,389 B1 | 12/2014 | Hoang | |
| 2004/0126025 A1* | 7/2004 | Nakaya | H04N 19/52 |
| | | | 382/238 |
| 2006/0171460 A1* | 8/2006 | Masuda | H04N 19/159 |
| | | | 375/240.03 |
| 2010/0098169 A1* | 4/2010 | Budagavi | H04N 19/51 |
| | | | 375/240.16 |
| 2010/0135410 A1* | 6/2010 | Nakaya | H04N 19/159 |
| | | | 375/240.16 |
| 2010/0260429 A1* | 10/2010 | Ichinose | H04N 19/176 |
| | | | 382/232 |
| 2014/0355665 A1 | 12/2014 | Wegener | |

FOREIGN PATENT DOCUMENTS

| | | |
|---|---|---|
| JP | 2003-235047 A | 8/2003 |
| JP | 2003235047 A * | 8/2003 |

OTHER PUBLICATIONS

Budagavi, et al., "Video Coding Using Compressed Reference Frames", DSPS R&D Center, Texas Instruments Inc., Dallas, TX-75243, USA, ICASSP 2008, pp. 1165-1168.

Boa, Ety Al., "A Lossless Frame Recompression Scheme for Reducing DRAM Power in Video Encoding", IEEE 2010, pp. 677-680.

Budagavi, et al., "Video Coding Using Compressed Reference Frames", IEEE, ICASSP 2008, 1165-1168 pages.

International Search Report and Written Opinion of PCT Application No. PCT/JP2016/055795, dated Apr. 5, 2016, 02 pages of English Translation and 08 pages of ISRWO.

Bao, et al., "A Lossless Frame Recompression Scheme for Reducing DRAM Power in Video Encoding", IEEE, 2010, 677-680 pages.

Office Action for JP Patent Application No. 2017-506174, issued on Oct. 24, 2019, 05 pages Of Office Action and 04 pages Of English Translation.

Budagavi, et al, "Video coding using compressed reference frames", International Conference on Acoustics, and Signal Processing, IEEE, May 12, 2008, pp. 1165-1168.

\* cited by examiner

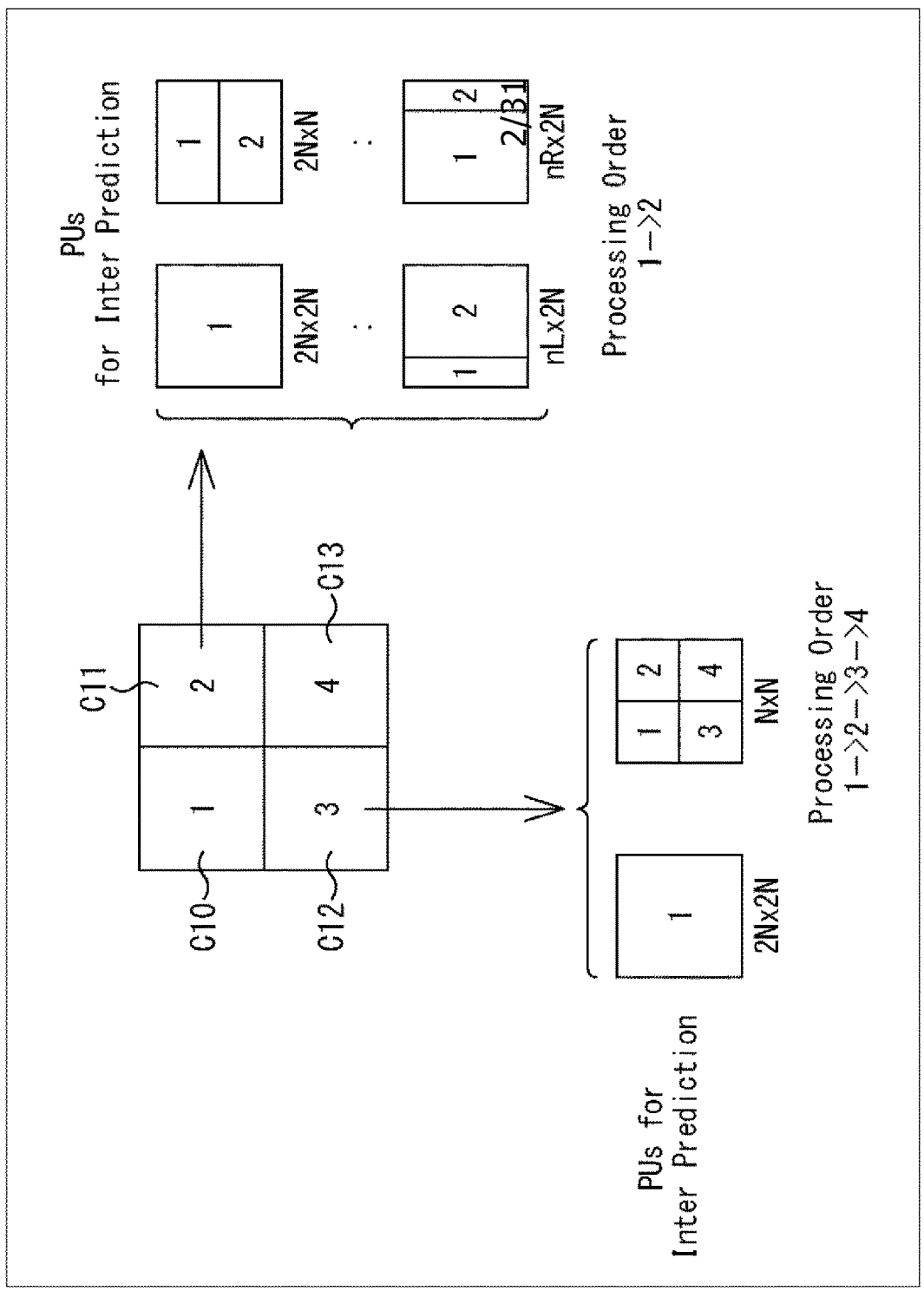
F I G. 4

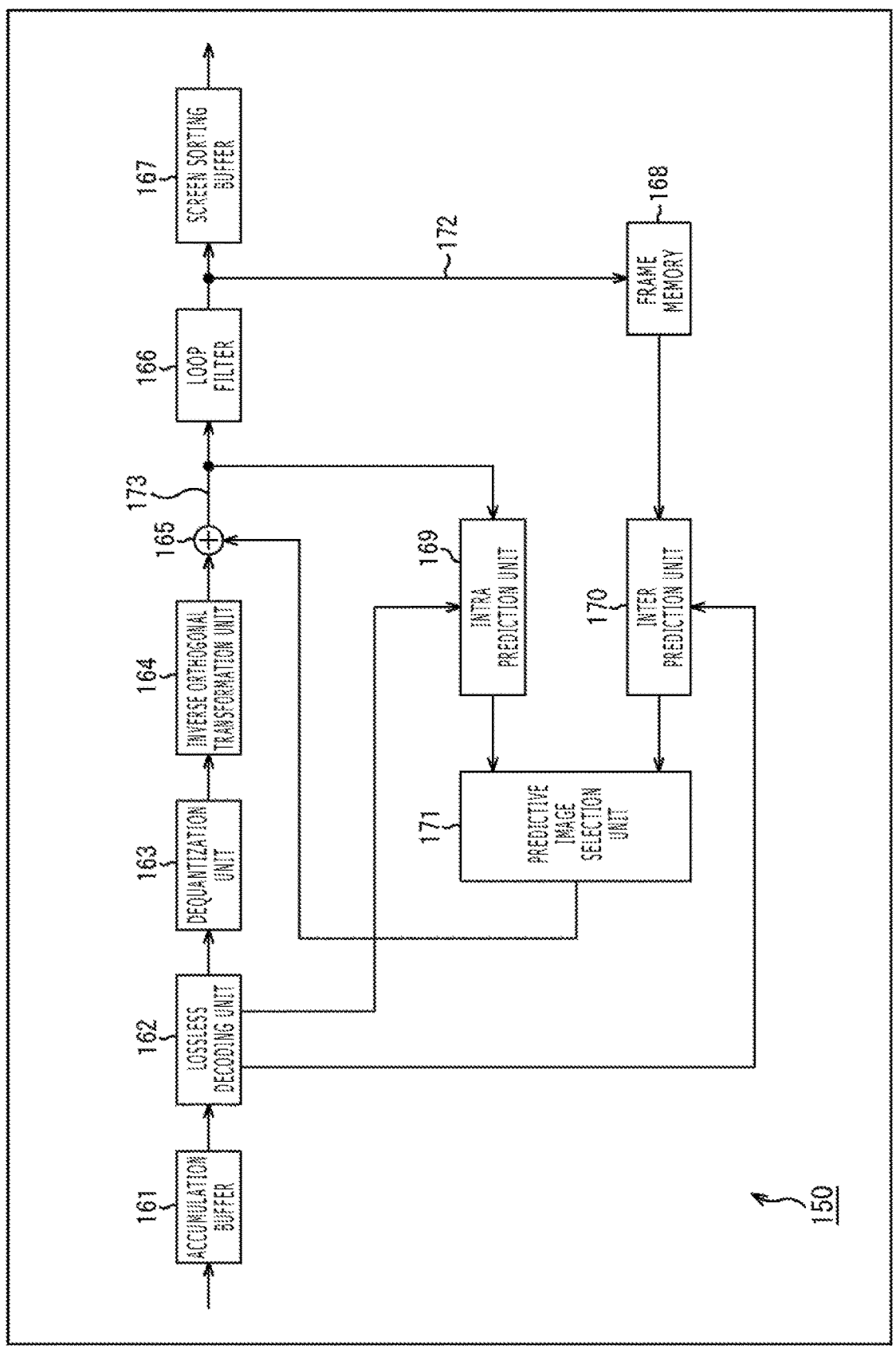

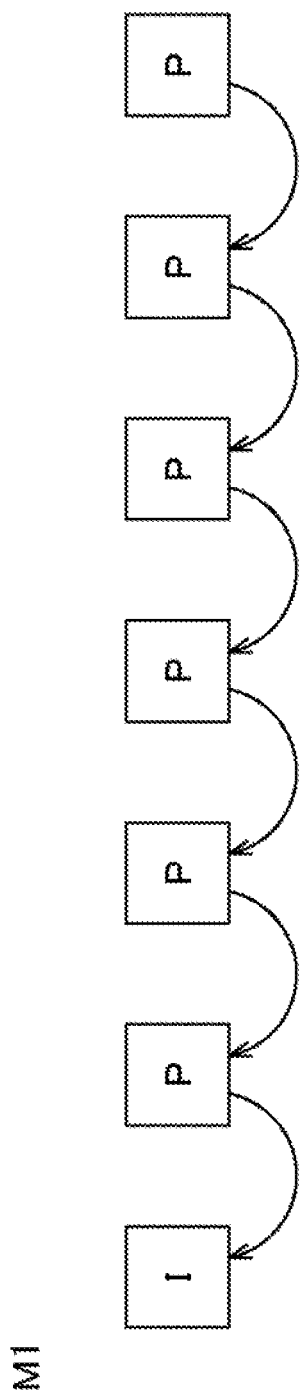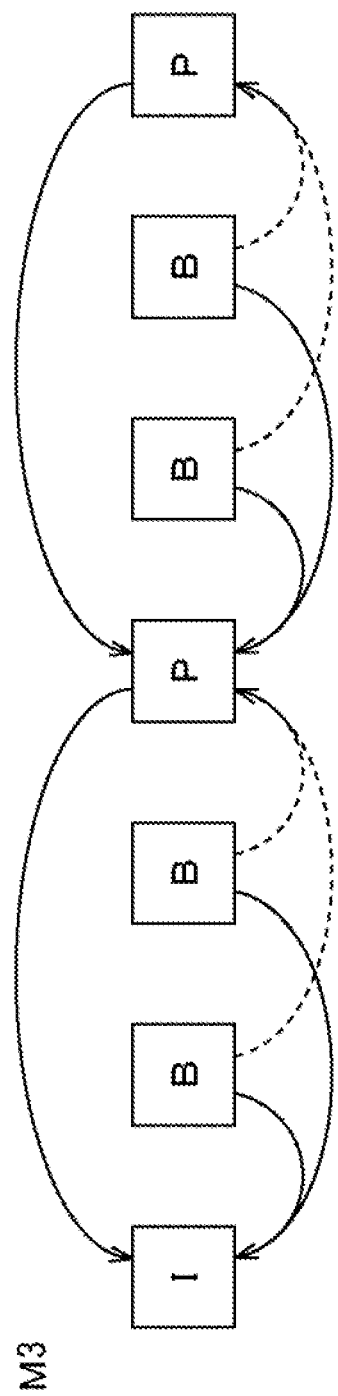
FIG. 11A
FIG. 11B

| POC | M1 | reference forward | backward |
|---|---|---|---|
| 0 | I-PICTURE | - | - |
| 1 | P-PICTURE | TYPE 2 | - |
| 2 | P-PICTURE | TYPE 1 | - |
| 3 | P-PICTURE | TYPE 2 | - |
| 4 | P-PICTURE | TYPE 1 | - |
| 5 | P-PICTURE | TYPE 2 | - |
| 6 | P-PICTURE | TYPE 1 | - |
| 7 | P-PICTURE | TYPE 2 | - |
| 8 | P-PICTURE | TYPE 1 | - |
| 9 | P-PICTURE | TYPE 2 | - |
| 10 | P-PICTURE | TYPE 1 | - |
| 11 | P-PICTURE | TYPE 2 | - |
| 12 | P-PICTURE | TYPE 1 | - |
| 13 | P-PICTURE | TYPE 2 | - |
| 14 | P-PICTURE | TYPE 1 | - |
| 15 | I-PICTURE | - | - |
| 16 | P-PICTURE | TYPE 2 | - |
| 17 | P-PICTURE | TYPE 1 | - |
| 18 | P-PICTURE | TYPE 2 | - |
| 19 | P-PICTURE | TYPE 1 | - |
| 20 | P-PICTURE | TYPE 2 | - |
| 21 | P-PICTURE | TYPE 1 | - |
| 22 | P-PICTURE | TYPE 2 | - |
| 23 | P-PICTURE | TYPE 1 | - |
| 24 | P-PICTURE | TYPE 2 | - |
| 25 | P-PICTURE | TYPE 1 | - |
| 26 | P-PICTURE | TYPE 2 | - |
| 27 | P-PICTURE | TYPE 1 | - |

FIG. 12A

| POC | M3 | reference forward | backward |
|---|---|---|---|
| 0 | I-PICTURE | - | - |
| 1 | B-PICTURE | TYPE 1 | TYPE 1 |
| 2 | B-PICTURE | TYPE 1 | TYPE 1 |
| 3 | P-PICTURE | TYPE 2 | - |
| 4 | B-PICTURE | TYPE 1 | TYPE 1 |
| 5 | B-PICTURE | TYPE 1 | TYPE 1 |
| 6 | P-PICTURE | TYPE 1 | - |
| 7 | B-PICTURE | TYPE 1 | TYPE 1 |
| 8 | B-PICTURE | TYPE 1 | TYPE 1 |
| 9 | P-PICTURE | TYPE 2 | - |
| 10 | B-PICTURE | TYPE 1 | TYPE 1 |
| 11 | B-PICTURE | TYPE 1 | TYPE 1 |
| 12 | P-PICTURE | TYPE 1 | - |
| 13 | B-PICTURE | TYPE 1 | TYPE 1 |
| 14 | B-PICTURE | TYPE 1 | TYPE 1 |
| 15 | I-PICTURE | - | - |
| 16 | B-PICTURE | TYPE 1 | TYPE 1 |
| 17 | B-PICTURE | TYPE 1 | TYPE 1 |
| 18 | P-PICTURE | TYPE 2 | - |
| 19 | B-PICTURE | TYPE 1 | TYPE 1 |
| 20 | B-PICTURE | TYPE 1 | TYPE 1 |
| 21 | P-PICTURE | TYPE 1 | - |
| 22 | B-PICTURE | TYPE 1 | TYPE 1 |
| 23 | B-PICTURE | TYPE 1 | TYPE 1 |
| 24 | P-PICTURE | TYPE 2 | - |
| 25 | B-PICTURE | TYPE 1 | TYPE 1 |
| 26 | B-PICTURE | TYPE 1 | TYPE 1 |
| 27 | P-PICTURE | TYPE 1 | - |

FIG. 12B

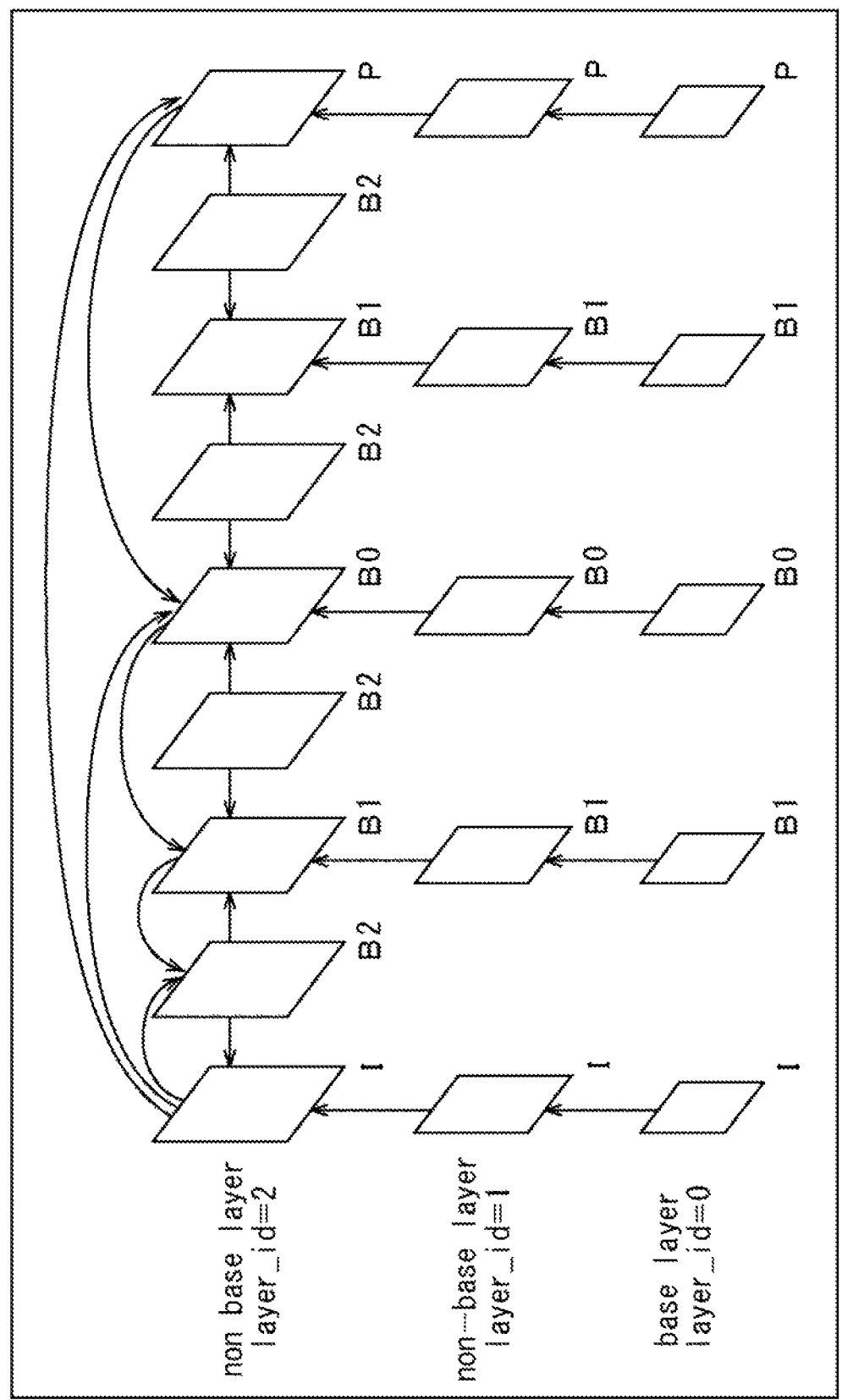
F I G. 2 1

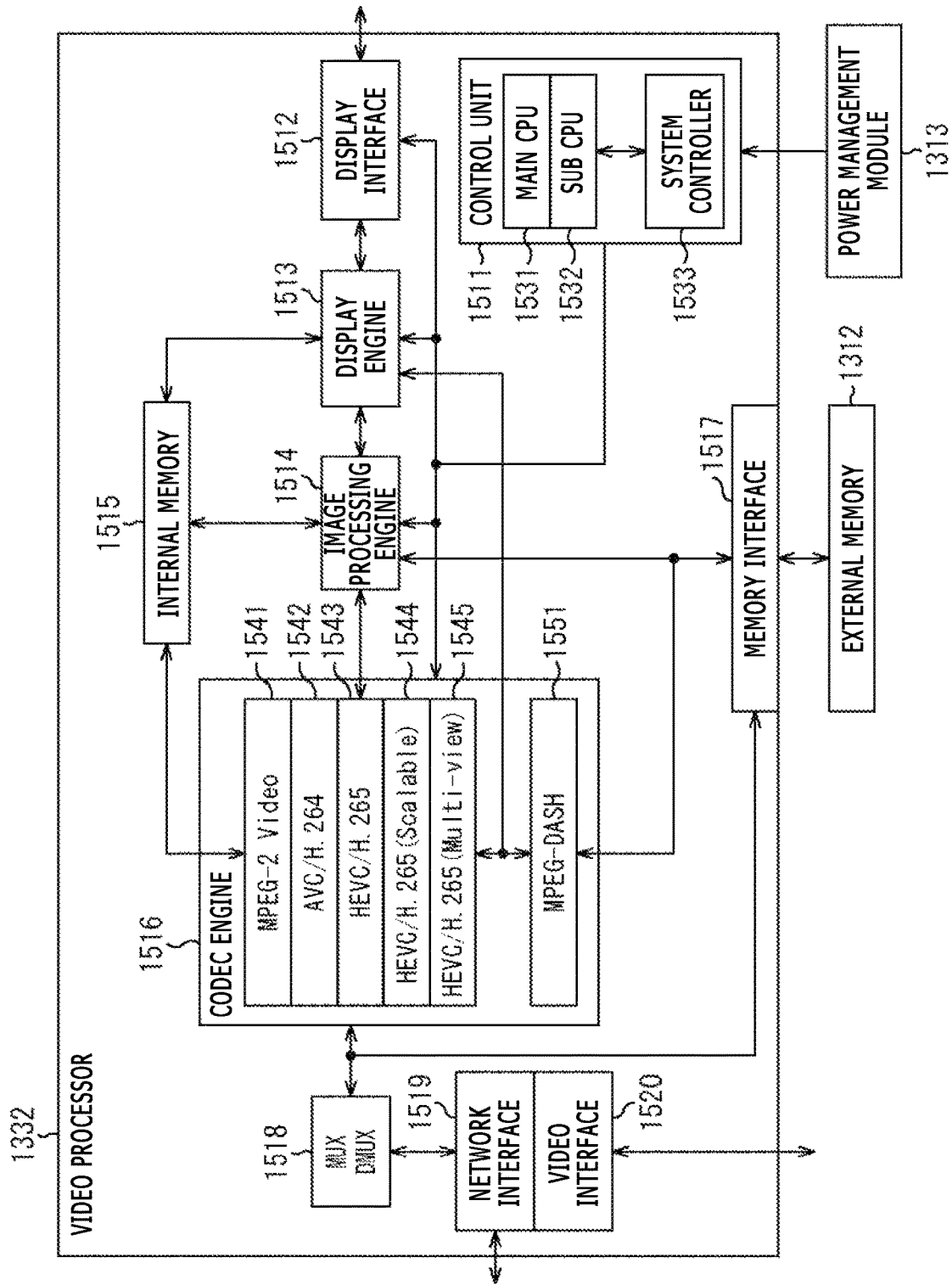

IMAGE PROCESSING DEVICE AND METHOD

CROSS REFERENCE TO RELATED APPLICATIONS

This application is a U.S. National Phase of International Patent Application No. PCT/JP2016/055795 filed on Feb. 26, 2016, which claims priority benefit of Japanese Patent Application No. JP 2015-050970 filed in the Japan Patent Office on Mar. 13, 2015. Each of the above-referenced applications is hereby incorporated herein by reference in its entirety.

TECHNICAL FIELD

The present disclosure relates to an image processing device and method, and particularly to an image processing device and method that can suppress deterioration of the picture quality by encoding.

BACKGROUND ART

Where image encoding is implemented by hardware, generally a frame memory for storing a reference frame is frequently incorporated as an external DRAM (Dynamic Random Access Memory) chip separate from an LSI (Large Scale Integration) for encoding. Since it is necessary for such a frame memory as just described to store a plurality of reference frames or to be accessed at a high speed in a process such as motion search (ME (Motion Estimation)), MC (Motion Compensation) or the like, it is necessary for the frame memory to have a sufficiently great data storage capacity and have a sufficient broad frequency bandwidth for inputting and outputting data.

However, due to 4K televisions or increase of the capacity of image data in recent years, there is a tendency that the data amount necessary to be handled by an image encoder increases. Therefore, also an external DRAM chip is demanded to have a greater capacity and a broader frequency bandwidth, and this makes a cause of increase of the product cost.

Therefore, a method for compressing and storing image data has been devised (for example, refer to NPL 1 and NPL 2).

CITATION LIST

Non Patent Literatures

[NPL 1]
Madhukar Budagavi and Minhua Zhou, "VIDEO CODING USING COMPRESSED REFERENCE FRAMES"
[NPL 2]
Xuena Bao, Dajiang Zhou, and Satoshi Goto, "A Lossless Frame Recompression Scheme for Reducing DRAM Power in Video Encoding"

SUMMARY

Technical Problems

However, according to the method disclosed in NPL 2, since lossless compression (lossless encoding) is applied, there is the possibility that the access method to a reference memory may be complicated. Further, lossless compression is generally low in compression ratio in comparison with lossy compression (lossy encoding), and there is the possibility that the reduction effect of the DRAM capacity or the bandwidth in memory access may be reduced.

In contrast, according to the method disclosed in NPL 1, since reference data is compressed (lossy encoded) using fixed length compression, data inputting and outputting to and from a frame memory can be performed simply and easily. For example, in the case of HEVC (High Efficiency Video Coding), since an orthogonal transformation coefficient is generated in an orthogonal transform process against the amount of loss arising from lossy encoding of reference data to perform compensation for the loss, deterioration of the picture quality is suppressed.

It is to be noted, however, that, in this case, in order to suppress deterioration of the picture quality, it is necessary to perform, also in decoding of encoded data of an image, similar lossy compression of reference data. Where lossy compression of reference data is not performed as in a general decoder of HEVC, the compensation for the loss by an orthogonal transformation coefficient generated in an orthogonal transform process becomes excessive compensation. Therefore, in the decoder (decoding process), where decoded image data is looped and utilized as reference data, there is the possibility that excessive compensation of an orthogonal transformation coefficient may be accumulated in the time direction of the image, resulting in increase of the deterioration of the picture quality.

The present disclosure has been made in view of such a situation as described above and makes it possible to suppress deterioration of the picture quality by encoding.

Solution to Problems

One aspect of the present technology is an image processing device including a decoding unit configured to decode encoded data obtained by lossy encoding an image of a frame encoded already which is used as a reference image in encoding of an image of a current frame and perform rounding of a decoded image obtained by the decoding with a rounding value whose value is changed over in a time direction of the image.

The decoding unit may change over the rounding value at a random timing.

The decoding unit may change over the rounding value for each frame of the image.

The decoding unit may perform the changeover of the rounding value based on a POC (Picture Order Count) included in header information of the encoded data of the image.

The decoding unit may change over the rounding value at a P picture.

The decoding unit may perform rounding of an I picture and a B picture using a rounding value having comparatively good characteristics from among a plurality of rounding values that are to be used for rounding of the P picture.

The decoding unit may perform the changeover of the rounding value based on information indicative of a POC and information indicative of a picture type both included in header information of the encoded data of the image.

The decoding unit may change over the rounding value at a block of a picture that is a target for changing over the rounding value, an orthogonal transformation coefficient being generated in the block in encoding of the image for the compensation for an error caused by lossy encoding of the image of the frame encoded already.

The decoding unit may change over the rounding value at the block of a P picture.

The decoding unit may perform rounding of an I picture and a B picture and rounding of a block of the P picture other than the block using a rounding value having comparatively good characteristics from among a plurality of rounding values that are to be used for the rounding of the block of the P picture.

The decoding unit may perform the changeover of the rounding value based on information indicative of a POC and information indicative of a picture type both included in header information of the encoded data of the image and information relating to a generation quantity of the orthogonal transformation coefficient.

The decoding unit may perform the rounding for lower bits of each pixel value of the decoded image.

The decoding unit may use a random number whose value is updated in a time direction of the image as the rounding value.

The decoding unit may alternately use two 5-bit values "10000" and "01111" in a time direction of the image as the rounding value.

The decoding unit may use three 4-bit values "1001," "1000" and "0111" in order in a time direction of the image as the rounding value.

The decoding unit may change over the rounding value in a time direction of the image so as to decrease an orthogonal transformation coefficient that is generated in the encoding of the image for the compensation for an error caused by lossy encoding for the image of the frame encoded already.

The image processing device may further include a storage unit configured to store the encoded data, and the decoding unit may decode the encoded data read out from the storage unit and perform rounding of a decoded image obtained by the decoding.

The image processing device may further include an encoding unit configured to lossy encode an image of a frame encoded already which is used as the reference image, and the storage unit may store the encoded data generated by the lossy encoding by the encoding unit.

The image processing device may further include an orthogonal transformation unit configured to orthogonally transform a difference image between the image of the current frame and the reference image obtained by the decoding by the decoding unit to generate an orthogonal transformation coefficient for the compensation for an error caused by the lossy encoding for the image of the frame encoded already.

Further, one aspect of the present technology is an image processing method including decoding encoded data obtained by lossy encoding an image of a frame encoded already which is used as a reference image in encoding of an image of a current frame, and performing rounding of a decoded image obtained by the decoding with a rounding value whose value is changed over in a time direction of the image.

In the one aspect of the present technology, encoded data obtained by lossy encoding an image of a frame encoded already which is used as a reference image in encoding of an image of a current frame is decoded, and rounding of a decoded image obtained by the decoding is performed with a rounding value whose value is changed over in a time direction of the image.

Advantageous Effect of Invention

According to the present disclosure, image data can be encoded. Especially, deterioration of the picture quality by encoding can be suppressed.

BRIEF DESCRIPTION OF DRAWINGS

FIG. 4 is an explanatory view illustrating a scanning order of CUs/PUs.

FIG. 6 is a block diagram depicting an example of a principal configuration of an image decoding device.

FIGS. 11A and 11B are views illustrating an example of a GOP (Group Of Picture) structure.

FIGS. 12A and 12B are views illustrating examples of control of changeover of a rounding value.

FIG. 21 is a view illustrating an example of a hierarchical image encoding method.

FIG. 31 is a block diagram depicting another example of a general configuration of the video processor.

DESCRIPTION OF EMBODIMENTS

In the following, modes for carrying out the present disclosure (hereinafter referred to as embodiments) are described. It is to be noted that the description is given in the following order.
1. First Embodiment (Image Encoding Device)
2. Second Embodiment (Image Encoding Device)
3. Third Embodiment (Multi-View Image Encoding Device and Multi-View Image Decoding Device)
4. Fourth Embodiment (Hierarchical Image Encoding Device and Hierarchical Image Decoding Device)
5. Fifth Embodiment (Computer)
6. Sixth Embodiment (Application Example)
7. Seventh Embodiment (Set, Unit, Module, Processor)

1. First Embodiment

<Encoding Method>

In the following, the present technology is described taking a case in which it is applied to image encoding of the HEVC method as an example.

<Block Division>

In old-fashioned image encoding methods such as MPEG2 (Moving Picture Experts Group 2 (ISO (International Organization for Standardization)/IEC (International Electrotechnical Commission) 13818-2)) or H.264, MPEG-4 Part 10 (hereinafter referred to as AVC (Advanced Video Coding)) and so forth, an encoding process is executed in a unit of processing called macro block. The macro block is a block having a uniform size of 16×16 pixels. In contrast, in HEVC, an encoding process is executed in a unit of processing (encoding unit) called CU. The CU is a block formed by recursively dividing an LCU (Largest Coding Unit) that is the largest encoding unit and having a variable size. The largest size of the CU which can be selected is 64×64 pixels. The smallest size of the CU which can be selected is 8×8 pixels. The CU of the smallest size is called SCU (Smallest Coding Unit).

Since the CU having a variable size is adopted in this manner, in HEVC, it is possible to adaptively adjust the picture quality and the encoding efficiency in response to the substance of the image. A prediction process for predictive encoding is executed in a processing unit (prediction unit) called PU. The PU is formed by dividing a CU in accordance with one of several division patterns. Further, the orthogonal transform process is executed in a processing unit called TU. The TU is formed by dividing a CU or a PU to a certain depth.

<Recursive Division of Block>

Figure 1:
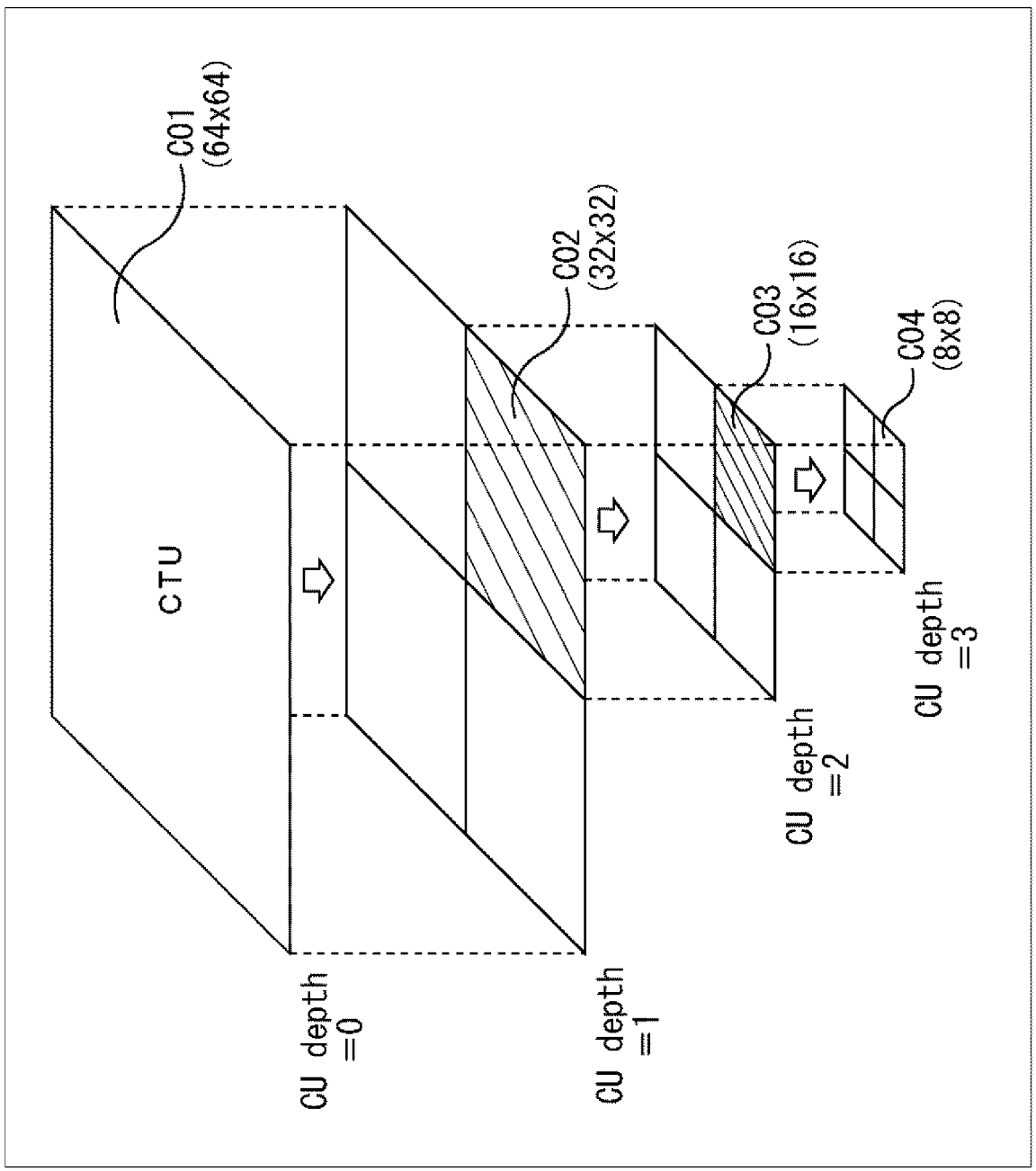
FIG. 1 is an explanatory view illustrating an outline of recursive block division of a CU (Coding Unit) in HEVC.

FIG. 1 is an explanatory view illustrating an outline of recursive block division of a CU in HEVC. Block division of a CU is performed by recursively repeating division of one block into 4 (=2×2) sub blocks, and as a result, a tree structure in the form of a quad-tree is formed. The entirety of one quad-tree is called CTB (Coding Tree Block), and a logical unit corresponding to the CTB is called CTU (Coding Tree Unit).

At an upper location in FIG. 1, C01 that is a CU having a size of 64×64 pixels is depicted as an example. The depth of division of C01 is equal to 0. This signifies that C01 is the root of the CTU and corresponds to the LCU. The LCU size can be designated by a parameter encoded in an SPS (Sequence Parameter Set) or a PPS (Picture Parameter Set). C02 that is a CU is one of four CUs divided from C01 and has a size of 32×32 pixels. The depth of division of C02 is equal to 1. C03 that is a CU is one of four CUs divided from C02 and has a size of 16×16 pixels. The depth of division of C03 is equal to 2. C04 that is a CU is one of four CUs divided from C03 and has a size of 8×8 pixels. The depth of division of C04 is equal to 3. In this manner, a CU is formed by recursively dividing an image to be encoded. The depth of the division is variable. For example, in a flat image region like a region of the blue sky, a CU of a comparatively large size (namely, of a small depth) can be set. On the other hand, in a steep image region that includes many edges, a CU of a comparatively small size (namely, of a great depth) can be set. Further, each of the set CUs becomes a processing unit in an encoding process.

<Setting of PU to CU>

Figure 2:
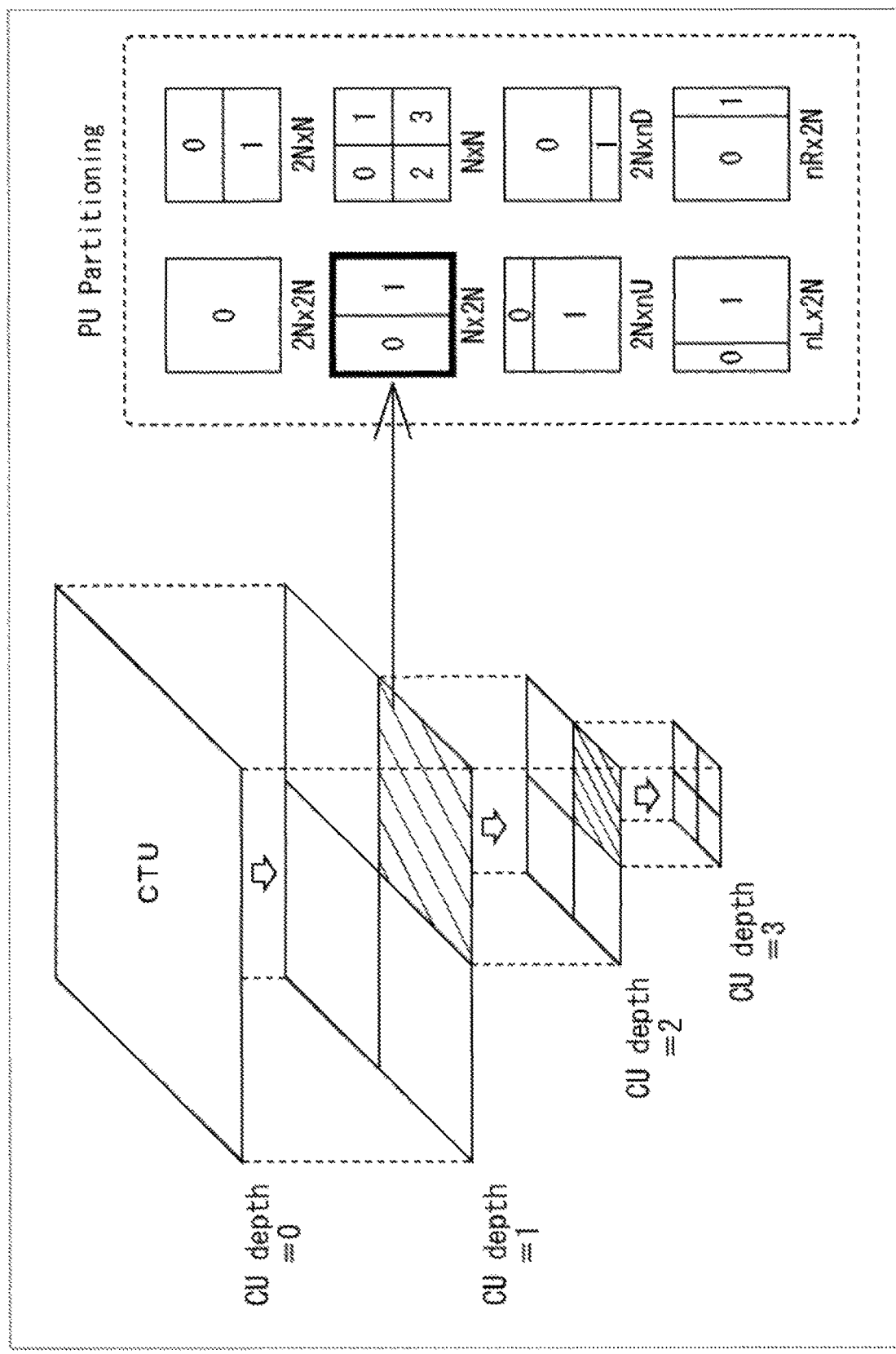
FIG. 2 is an explanatory view illustrating setting of a PU (Prediction Unit) to a CU depicted in FIG. 1.

The PU is a processing unit in a prediction process including intra prediction and inter prediction. A PU is formed by dividing a CU in accordance with one of several division patterns. FIG. 2 is an explanatory view illustrating setting of a PU to a CU illustrated in FIG. 1. At the right side in FIG. 2, eight different division patterns of 2N×2N, 2N×N, N×2N, N×N, 2N×nU, 2N×nD, nL×2N and nR×2N are illustrated. In the intra prediction, it is possible to select the two division patterns of 2N×2N and N×N from among the division patterns (N×N is selectable only for the SCU). On the other hand, in the inter prediction, where asymmetrical motion division is enabled, all of the eight division patterns are selectable.

<Setting of TU to CU>

Figure 3:
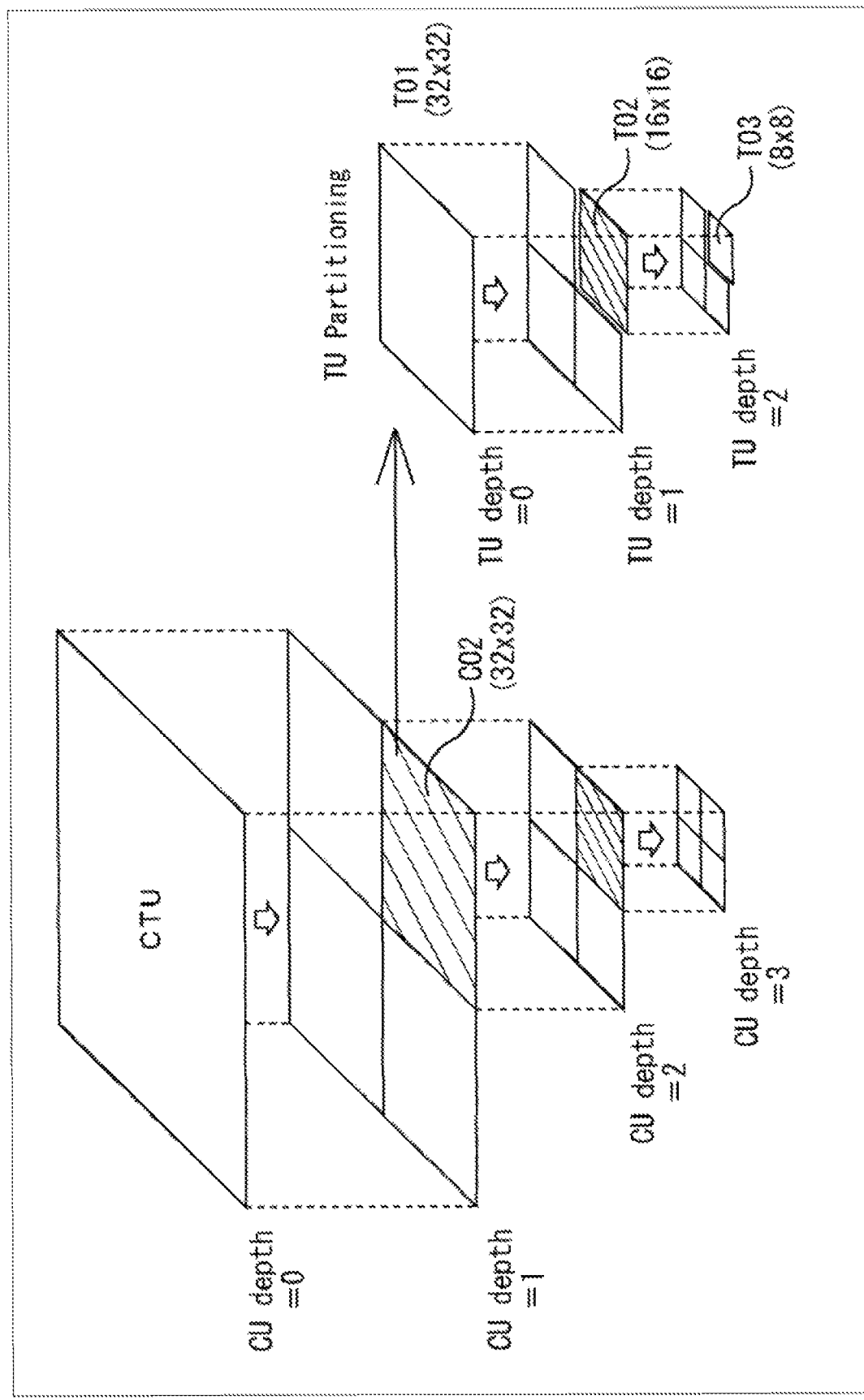
FIG. 3 is an explanatory view illustrating setting of a TU (Transform Unit) to a CU depicted in FIG. 1.

The TU is a processing unit in an orthogonal transform process. A TU is formed by dividing a CU (in the case of an intra CU, each PU in a CU) to a certain depth. FIG. 3 is an explanatory view illustrating setting of a TU to a CU illustrated in FIG. 1. At the right side in FIG. 3, one or more TUs that can be set to C02 are illustrated. For example, T01 that is a TU has a size of 32×32 pixels, and the depth of TU division of the same is equal to 0. T02 that is a TU has a size of 16×16 pixels, and the depth of TU division of the same is equal to 1. T03 that is a TU has a size of 8×8 pixels, and the depth of TU division of the same is equal to 2.

What block division is to be performed in order to set such a block as a CU, a PU or a TU as described above to an image is determined typically on the basis of comparison in cost that affects the encoding efficiency. An encoder compares the cost, for example, between one CU of 2M×2M pixels and four CUs of M×M pixels, and if the encoding efficiency is higher where four CUs of M×M pixels are set, then the encoder determines to divide a CU of 2M×2M pixels into four CUs of M×M pixels.

<Scanning Order of CUs and PUs>

When an image is to be encoded, CTBs (or LCUs) set in a lattice pattern in an image (or a slice or a tile) are scanned in a raster scan order. Within one CTB, CUs are scanned such that the quad-tree is traced from the left to the right and from the top to the bottom. When a current block is to be processed, information of upper and left neighboring blocks is utilized as input information. FIG. 4 is an explanatory view illustrating a scanning order of CUs and PUs. At a left upper location in FIG. 4, C10, C11, C12 and C13 that are four CUs that can be included in one CTB are illustrated. A numeral in a frame of each CU represents a sequence number in processing. The encoding process is executed in the order of C10 that is the left upper CU, C11 that is the right upper CU, C12 that is the left lower CU, and C13 that is the right lower CU. At a right location in FIG. 4, one or more PUs for inter prediction that can be set to C11 that is a CU are illustrated. At a lower location in FIG. 4, one or more PUs for intra prediction that can be set to C12 that is a CU are illustrated. As indicated by numerals in frames of the PUs, also the PUs are scanned such that they are traced from the left to the right and from the top to the bottom.

In the following description, it is assumed that the LCU includes also a macro block in the AVC method and the CU includes a block (sub block) in the AVC method. In other words, the "block" used in the following description represents an arbitrary partial region in a picture and is not restricted in terms of the size, shape, property and so forth. In particular, the "block" includes an arbitrary region (processing unit) such as, for example, a TU, a PU, an SCU, a CU, an LCU, a sub block, a macro block, a slice and so forth. Naturally, also any other partial region (processing unit) than those described above is included. Where it is necessary to restrict a size, a processing unit or the like, description is given suitably.

<Image Encoding Device>

Figure 5:
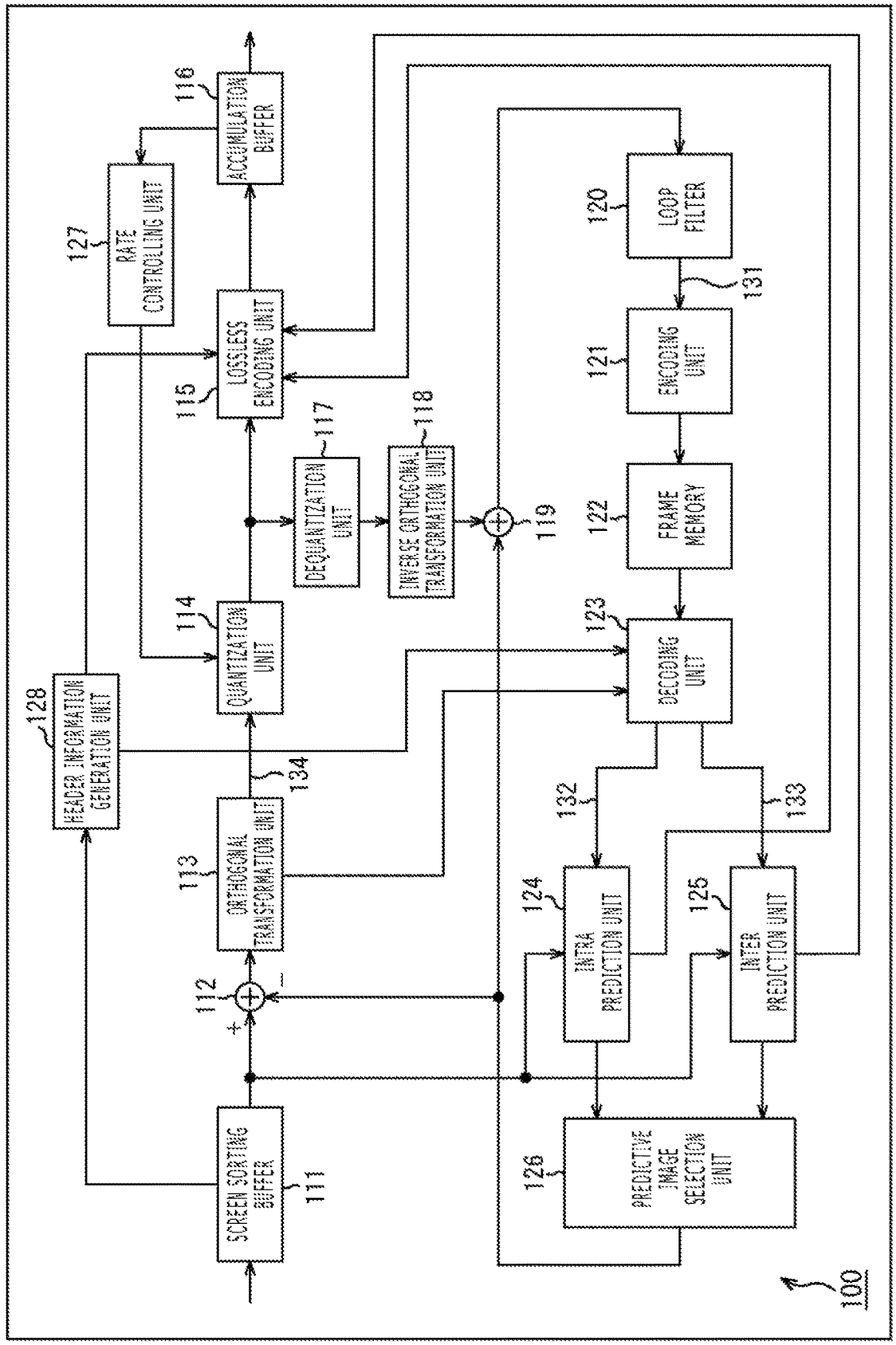
FIG. 5 is a block diagram depicting an example of a principal configuration of an image encoding device.

FIG. 5 is a block diagram depicting an example of a configuration of an image encoding device that is a mode of an image processing device to which the present technology is applied. The image encoding device 100 depicted in FIG. 5 encodes image data of a moving image using, for example, a prediction process of HEVC or a prediction process of a method conforming to HEVC.

As depicted in FIG. 5, the image encoding device 100 includes a screen sorting buffer 111, an arithmetic operation unit 112, an orthogonal transformation unit 113, a quantization unit 114, a lossless encoding unit 115, an accumulation buffer 116, a dequantization unit 117 and an inverse orthogonal transformation unit 118. The image encoding device 100 further includes an arithmetic operation unit 119, a loop filter 120, an encoding unit 121, a frame memory 122, a decoding unit 123, an intra prediction unit 124, an inter prediction unit 125 and a predictive image selection unit 126. Furthermore, the image encoding device 100 includes a rate controlling unit 127 and a header information generation unit 128.

The screen sorting buffer 111 stores images of frames of inputted image data in their displaying order, sorts the images of the frames stored in the displaying order into an order of frames for encoding in response to a GOP, and supplies the images sorted into the order of frames to the arithmetic operation unit 112. Further, the screen sorting buffer 111 supplies the images sorted into the order of frames to the intra prediction unit 124 and the inter prediction unit 125.

The arithmetic operation unit 112 subtracts a predictive image supplied from the intra prediction unit 124 or the inter prediction unit 125 through the predictive image selection unit 126 from an image read out from the screen sorting buffer 111 and supplies resulting difference information (residual data) to the orthogonal transformation unit 113. For example, in the case of an image for which intra encoding is to be performed, the arithmetic operation unit 112 subtracts image data of a predictive image supplied from the intra prediction unit 124 from image data of an image read out from the screen sorting buffer 111. Meanwhile, for example, in the case of an image for which inter encoding is to be performed, the arithmetic operation unit 112 subtracts image data of a predictive image supplied from the inter prediction unit 125 from image data of an image read out from the screen sorting buffer 111.

The orthogonal transformation unit 113 performs orthogonal transformation such as discrete cosine transform, Karhunen Loé transform or the like for the residual data supplied from the arithmetic operation unit 112. The orthogonal transformation unit 113 supplies a transformation coefficient obtained by the orthogonal transformation to the quantization unit 114.

The quantization unit 114 quantizes the transformation coefficient supplied from the orthogonal transformation unit 113. The quantization unit 114 sets a quantization parameter on the basis of information on a target value of the code amount supplied from the rate controlling unit 127 and performs quantization of the transformation coefficient. The quantization unit 114 supplies the quantized transformation coefficient to the lossless encoding unit 115.

The lossless encoding unit 115 encodes the transformation coefficient quantized by the quantization unit 114 in accordance with an arbitrary encoding method. Further, the lossless encoding unit 115 acquires information representative of a mode of intra prediction and so forth from the intra prediction unit 124, and acquires information indicative of a mode of inter prediction, difference motion vector information and so forth from the inter prediction unit 125.

The lossless encoding unit 115 encodes the various kinds of information mentioned above in accordance with an arbitrary encoding method and makes (multiplexes) the encoded information a part of header information of the encoded data (referred to also as encoded stream). The lossless encoding unit 115 supplies the encoded data obtained by the encoding to the accumulation buffer 116 so as to accumulate the encoded data in the accumulation buffer 116.

As an encoding method of the lossless encoding unit 115, for example, variable length encoding, arithmetic encoding and so forth are available. As the variable length encoding, for example, CAVLC (Context-Adaptive Variable Length Coding) prescribed in the H.264/AVC method and so forth are available. As the arithmetic encoding, for example, CABAC (Context-Adaptive Binary Arithmetic Coding) and so forth are available.

The accumulation buffer 116 temporarily holds encoded data supplied from the lossless encoding unit 115. The accumulation buffer 116 outputs the encoded data held therein to the outside of the image encoding device 100 at a predetermined timing. In other words, the accumulation buffer 116 serves also as a transmission unit that transmits encoded data.

Meanwhile, a transformation coefficient quantized by the quantization unit 114 is supplied also to the dequantization unit 117. The dequantization unit 117 dequantizes the quantized transformation coefficient in accordance with a method corresponding to the quantization by the quantization unit 114. The dequantization unit 117 supplies the transformation coefficient obtained by the dequantization to the inverse orthogonal transformation unit 118.

The inverse orthogonal transformation unit 118 performs inverse orthogonal transformation of the transformation coefficient supplied from the dequantization unit 117 in accordance with a method corresponding to the orthogonal transform process by the orthogonal transformation unit 113. The inverse orthogonal transformation unit 118 supplies an output obtained by the inverse orthogonal transformation (restored residual data) to the arithmetic operation unit 119.

The arithmetic operation unit 119 adds a predictive image supplied from the intra prediction unit 124 or the inter prediction unit 125 through the predictive image selection unit 126 to the restored residual data supplied from the inverse orthogonal transformation unit 118 to obtain a locally reconstructed image (hereinafter referred to as reconstruction image). The reconstruction image is supplied to the loop filter 120.

The loop filter 120 includes a deblock filter, an adaptive loop filter or the like and suitably performs a filter process for the reconstruction image supplied from the arithmetic operation unit 119. For example, the loop filter 120 performs a deblock filter process for the reconstruction image to remove block distortion of the reconstruction image. Further, for example, the loop filter 120 performs a loop filter process using a Wiener filter for a result of the deblock filter process (reconstruction image for which removal of block distortion is performed) to perform picture quality improvement.

It is to be noted that the loop filter 120 may further perform some other arbitrary filter process for the reconstruction image. Also it is possible for the loop filter 120 to supply information of a filter coefficient and so forth used in the filter process to the lossless encoding unit 115 such that the information is encoded by the lossless encoding unit 115 as occasion demands.

The loop filter 120 supplies a result of the filter process (hereinafter referred to as decoded image) to the encoding unit 121.

The encoding unit 121 encodes the decoded image supplied from the loop filter 120. Data of the decoded image is stored into the frame memory 122 and is read out upon encoding of a different frame or the like and utilized as a reference image. Accordingly, the frame memory 122 must store data of a decoded image, for example, of several frames. In other words, a sufficiently great storage capacity is required for the frame memory 122. Therefore, it is difficult to implement the frame memory 122 using an SRAM (Static Random Access Memory) or the like which is small in capacity, operates at a high speed and is expensive like a cache memory of a CPU (Central Processing Unit) (there is the possibility that the cost may increase to an unallowable level or shortage in capacity may occur). Therefore, the frame memory 122 is usually implemented by a memory that is great in capacity, operates at a low speed and is less expensive like a DRAM or the like. However, in this case, if the data amount of a decoded image is excessively great, then there is the possibility that, upon transmission of the decoded image, shortage in bandwidth may occur in an input or output bus of the frame memory 122. In other words, it is desirable for the data amount of a decoded image to be as small as possible. Further, also in this case, since it is expectable to share the DRAM with a different process, it is desirable that the data amount of the decoded image is as small as possible such that shortage in capacity may not occur with the frame memory 122.

Therefore, the encoding unit 121 encodes data of the decoded image before the data is supplied to the frame memory 122 to compress (reduce) the data amount (of the encoded data) of the decoded image so as to become sufficiently small with respect to the storage capacity of the frame memory 122 or the bandwidth of the input/output bus of the frame memory 122. In particular, the encoding unit 121 compresses the data amount of a decoded image to such a degree that bandwidth shortage does not occur with the input/output bus of the frame memory 122 and besides the free space of the frame memory 122 does not become short.

Further, it is demanded that encoding by the encoding unit 121 be performed at a speed as high as possible such that encoding of an image by the image encoding device 100 may not be delayed. In addition, since the decoded image is to be utilized as a reference image as described hereinabove, in encoding by the encoding unit 121, increase in speed and increase in compression ratio of the encoding process are prioritized to improvement of the picture quality.

Therefore, the encoding unit 121 encodes this decoded image by an encoding method that is higher in speed and easier and simpler than that where a complicated encoding method like AVC or HEVC is used. This encoding is referred to also as simplified encoding. In particular, the simplified encoding (also referred to as simplified compression) is an image encoding technology for reducing the data transfer rate or the memory bandwidth. In the present simplified encoding, encoding (compression) of data is performed such that the subjective picture quality is maintained at an equivalent level. Generally, the compression ratio of the simplified encoding is low (for example, by approximately 50%) in comparison with general purpose encoding such as AVC in order to maintain the subject picture quality at an equivalent level.

A particular technique for such simplified encoding is arbitrary. For example, the encoding unit 121 may encode a decoded image by a lossy encoding method as the simplified encoding. Generally, the compression ratio can be increased more readily by a lossy encoding method than by general purpose encoding such as AVC or a lossless encoding method. For example, in the case of a (lossy) encoding method that simply deletes data by a desired data amount, control of the compression ratio can be performed readily by controlling the amount of data to be deleted. In other words, the encoding unit 121 can increase the compression ratio of a decoded image to a sufficiently high level (sufficiently compresses the data amount) more readily by encoding the decoded image by a lossy encoding method. In short, the storage capacity of the frame memory 122 and the transfer rate upon data transmission can be reduced more readily.

Further, generally such a lossy encoding method as described above is easier (simpler) in processing than general purpose encoding such as AVC or the like. In other words, the encoding unit 121 can encode a decoded image at a high speed and with a low load by using a lossy encoding method. In other words, in comparison with the case of general purpose encoding or the like, not only encoding can be performed in a short period of time but also increase of the power consumption and the production cost can be suppressed.

Further, for example, the encoding unit 121 may encode a decoded image independently in a unit of a block (in a state in which a surrounding block encoded or decoded already is not referred to) as the simplified encoding. By performing the simplified encoding by such a method as just described, when encoded data is to be read out from the frame memory 122, the encoding unit 121 can read out only necessary data (arbitrary block) in an arbitrary order (in other words, can perform random access). Accordingly, increase of the bandwidth occupancy (used amount) of a memory bus that is used when data is read out from the frame memory 122 can be suppressed.

Furthermore, for example, the encoding unit 121 may encode a decoded image by a fixed length encoding method as the simplified encoding. In other words, the bit amount (bit length) after encoding by the encoding unit 121 may be fixed. This makes it possible to further facilitate management of encoded data of a decoded image in the frame memory 122 (for example, management of a storage location, reading out control and so forth).

It is added that the encoding unit 121 may encode a decoded image by an encoding method that is ready for a plurality of ones of the characteristics described hereinabove as the simplified encoding. For example, the encoding unit 121 may encode a decoded image by an encoding method that processes a decoded image independently by lossy encoding and fixed length encoding and besides in a unit of a block. For example, as the simplified encoding, a compression method that uses DPCM (Differential Pulse Code Modulation) or one-dimensional DCT (Discrete Cosine Transform) can be applied. Naturally, the method of the simplified encoding may further include any other arbitrary characteristics than those described above.

Naturally, if the data amount of a decoded image can be compressed sufficiently at a sufficiently high speed, then an arbitrary method can be applied as the encoding method by the encoding unit 121. In the following, description is given assuming that the encoding unit 121 encodes a decoded image by such simplified encoding as described above (encodes at least by a lossy method). The encoding unit 121 supplies the encoded data of the decoded image generated in such a manner as described above to the frame memory 122.

The frame memory 122 stores the encoded data of the decoded image supplied from the encoding unit 121. As described hereinabove, this frame memory 122 is configured from a large capacity, low speed and less expensive memory such as, for example, a DRAM. The frame memory 122 supplies the encoded data of the decoded image stored therein to the decoding unit 123 in response to a request from the decoding unit 123.

The decoding unit 123 reads out encoded data of image data to be utilized as a reference image from the frame memory 122 and decodes the encoded data at a predetermined timing (or in response to a request from the intra prediction unit 124 or the inter prediction unit 125). The decoding unit 123 decodes by a method corresponding to the encoding method of the encoding unit 121. In particular, the decoding unit 123 decodes encoded data of a decoded image encoded by the simplified encoding by the encoding unit 121 in accordance with a decoding method corresponding to the simplified encoding to generate image data of the decoded image.

The decoding method corresponding to the simplified encoding described hereinabove is referred to also as simplified decoding. Similarly as in the case of the simplified encoding, in the case of the simplified decoding, encoded data can be decoded (decompressed) by a simple process in comparison with a general purpose decoding method such as AVC or the like. In other words, the decoding unit 123 can decode encoded data at a high speed and with a low load. In particular, the decoding unit 123 not only can perform decoding in a short period of time but also can suppress increase of the power consumption and the production cost in comparison with a case of general purpose encoding and so forth.

Incidentally, since the encoding method of the encoding unit 121 is lossy, the picture quality of a decoded image obtained by the decoding unit 123 is deteriorated (degraded) from that before encoding by the encoding unit 121.

The decoding unit 123 supplies image data of the decoded image as a reference image (reference data) to the intra prediction unit 124 or the inter prediction unit 125. For example, where intra prediction is to be performed, the decoding unit 123 supplies the reference data to the intra prediction unit 124. On the other hand, for example, where inter prediction is to be performed, the decoding unit 123 supplies the reference data to the inter prediction unit 125.

The intra prediction unit 124 performs intra prediction (in-screen prediction) by which a predictive image is generated using pixel values in a processing target picture that is a reconstruction image supplied as a reference image from the decoding unit 123. The intra prediction unit 124 performs this intra prediction by a plurality of intra prediction modes prepared in advance.

The intra prediction unit 124 generates a predictive image in all intra prediction modes that are considered candidates and evaluates a cost function value of the predictive images using an input image supplied from the screen sorting buffer 111 to select an optimum mode. After the intra prediction unit 124 selects an optimum intra prediction mode, it supplies a predictive image generated in the optimum mode to the predictive image selection unit 126. Further, the intra prediction unit 124 suitably supplies intra prediction mode information indicative of the adopted intra prediction mode and so forth to the lossless encoding unit 115 so as to be encoded.

The inter prediction unit 125 performs an inter prediction process using an input image supplied from the screen sorting buffer 111 and a reference image supplied from the decoding unit 123. More particularly, the inter prediction unit 125 performs motion prediction to detect a motion vector and performs a motion compensation process in response to the motion vector to generate a predictive image (inter predictive image information).

The inter prediction unit 125 generates a predictive image in all inter prediction modes that are considered candidates. The inter prediction unit 125 evaluates a cost function value of the predictive images using an input image supplied from the screen sorting buffer 111, information of a generated difference motion vector and so forth to select an optimum mode. After the inter prediction unit 125 selects an optimum inter prediction mode, it supplies a predictive image generated in the optimum mode to the predictive image selection unit 126. Further, the inter prediction unit 125 supplies information indicative of the adopted inter prediction mode, information necessary to perform processing in the inter prediction mode when encoded data is to be decoded and so forth to the lossless encoding unit 115 so as to be encoded. The necessary information may include, for example, information of the generated difference motion vector, and a flag or the like indicative of an index of the predicted motion vector as a prediction motion vector information.

The predictive image selection unit 126 selects a supplying source of a predictive image to be supplied to the arithmetic operation unit 112 and the arithmetic operation unit 119. For example, in the case of intra encoding, the predictive image selection unit 126 selects the intra prediction unit 124 as the supplying source of a predictive image and supplies a predictive image supplied from the intra prediction unit 124 to the arithmetic operation unit 112 and the arithmetic operation unit 119. On the other hand, for example, in the case of inter encoding, the predictive image selection unit 126 selects the inter prediction unit 125 as the supplying source of a predictive image and supplies a predictive image supplied from the inter prediction unit 125 to the arithmetic operation unit 112 and the arithmetic operation unit 119.

The rate controlling unit 127 controls the rate of a quantization action of the quantization unit 114 on the basis of a code amount of encoded data accumulated in the accumulation buffer 116 such that overflow or underflow does not occur.

The header information generation unit 128 generates header information, which is meta data of encoded data (bit stream), which is obtained by encoding an image of an encoding target, on the basis of an instruction or reference information supplied from the outside, information relating to image data supplied from the screen sorting buffer 111 or the like. This header information may be any information. For example, the header information may be a video parameter set, a sequence parameter set, a picture parameter set, a slice header or the like or may be information to be added to an LCU or the like or additional information such as SEI (Supplemental Enhancement Information) or the like. This header information may be embedded in encoded data (bit stream) or may be added to the top or the tail end or else may be used as separate data associated with encoded data (bit stream).

It is to be noted that the header information generation unit 128 can acquire arbitrary information from an arbitrary processing unit without being limited to relationships of arrow marks depicted in FIG. 5 and generate header information using the information.

The header information generation unit 128 supplies the generated header information to the lossless encoding unit 115. The lossless encoding unit 115 encodes the header information and suitably embeds the encoded header information into encoded data (bit stream) of image data, adds the encoded header information to the top or the tail end or associates the encoded header information with the encoded data (bit stream).

It is to be noted that the header information generation unit 128 can supply part or all of the generated header information to an arbitrary processing unit without being limited to relationships of arrow marks depicted in FIG. 5. For example, the header information generation unit 128 can supply information of a POC, a picture type and so forth generated as the header information to the decoding unit 123.

<Image Decoding Device>

Here, a general image decoding device that performs decoding in accordance with the HEVC decoding method is described. FIG. 6 is a block diagram depicting an example of a principal configuration of a general image decoding device of the HEVC decoding method. The image decoding device 150 depicted in FIG. 6 performs decoding of encoded data (bit stream) of an image encoded by the HEVC encoding method.

As depicted in FIG. 6, the image decoding device 150 includes an accumulation buffer 161, a lossless decoding unit 162, a dequantization unit 163, an inverse orthogonal transformation unit 164, an arithmetic operation unit 165, a loop filter 166 and a screen sorting buffer 167. The image decoding device 150 further includes a frame memory 168, an intra prediction unit 169, an inter prediction unit 170 and a predictive image selection unit 171.

The accumulation buffer 161 serves also as a reception unit that receives encoded data transmitted thereto from the encoding side. The accumulation buffer 161 receives and accumulates the encoded data transmitted thereto and supplies the encoded data to the lossless decoding unit 162 at a predetermined timing.

The lossless decoding unit 162 lossless decodes the encoded data supplied from the accumulation buffer 161 by a decoding method corresponding to the encoding method of the lossless encoding performed by the lossless encoding unit (for example, the lossless encoding unit 115) of the encoding side. For example, the lossless decoding unit 162 performs decoding by a decoding method corresponding to the variable length encoding (CAVLC or the like) or a decoding method corresponding to the arithmetic encoding (CABAC or the like). The lossless decoding unit 162 supplies quantized coefficient data obtained by the decoding to the dequantization unit 163.

Further, the lossless decoding unit 162 decides on the basis of information relating to an optimum prediction mode added to the encoded data whether the intra prediction mode is selected or the inter prediction mode is selected as an optimum prediction mode, and supplies information relating to the optimum prediction mode to that one of the intra prediction unit 169 and the inter prediction unit 170 which corresponds to the mode decided to be selected. For example, if the intra prediction mode is selected as an optimum prediction mode by the encoding side, then information relating to the optimum prediction mode is supplied to the intra prediction unit 169. On the other hand, for example, if the inter prediction mode is selected as an optimum prediction mode by the encoding side, then information relating to the optimum prediction mode is supplied to the inter prediction unit 170.

Furthermore, the lossless decoding unit 162 supplies information necessary for dequantization such as, for example, a quantization matrix and quantization parameters to the dequantization unit 163. Further, the lossless decoding unit 162 can suitably supply various kinds of information (for example, header information and so forth) obtained decoding encoded data (bit stream) to an arbitrary processing unit of the image decoding device 150 without being limited to relationships of arrow marks depicted in FIG. 6.

The dequantization unit 163 dequantizes quantized coefficient data supplied from the lossless decoding unit 162 by a method corresponding to the quantization method of the quantization performed by the quantization unit (for example, the quantization unit 114) of the encoding side. The dequantization unit 163 supplies resulting coefficient data to the inverse orthogonal transformation unit 164.

The inverse orthogonal transformation unit 164 transforms the orthogonal transformation coefficient supplied from the dequantization unit 163 by inverse orthogonal transformation by a method corresponding to the orthogonal transformation method of the orthogonal transformation performed by the orthogonal transformation unit (for example, the orthogonal transformation unit 113) of the encoding side. The inverse orthogonal transformation unit 164 obtains, by the inverse orthogonal transform process, residual data corresponding to that in a state before the orthogonal transformation by the encoding side. The residual data obtained by the inverse orthogonal transformation is supplied to the arithmetic operation unit 165.

The arithmetic operation unit 165 acquires the residual data from the inverse orthogonal transformation unit 164. Further, the arithmetic operation unit 165 acquires a predictive image from the intra prediction unit 169 or the inter prediction unit 170 through the predictive image selection unit 171. The arithmetic operation unit 165 adds the difference image and the predictive image to obtain a decoded image corresponding to the image before the predictive image is subtracted by the encoding side. The arithmetic operation unit 165 supplies the decoded image to the loop filter 166 and the intra prediction unit 169.

The loop filter 166 is a processing unit similar to the loop filer (for example, the loop filter 120) of the encoding side and performs similar processing. In particular, the loop filter 166 suitably performs a loop filter process for the decoded image supplied from the arithmetic operation unit 165. This loop filter process may be an arbitrary process if this is a filter process that includes at least a deblocking filter process. For example, the loop filter 166 may otherwise perform a deblock filter process for a decoded image to remove deblock distortion and perform an adaptive loop filter process using a Wiener filter to perform picture quality improvement. The loop filter 166 supplies the decoded image for which the filter process is performed suitably to the screen sorting buffer 167 and the frame memory 168.

The screen sorting buffer 167 performs sorting of images. In particular, the order of frames sorted into an order for encoding by the encoding side is sorted into an original order for displaying of frames. The screen sorting buffer 167 outputs the decoded image data whose order of frames is sorted to the outside of the image decoding device 150.

The frame memory 168 stores a decoded image supplied thereto and supplies the decoded image stored therein as a reference image to the inter prediction unit 170 at a predetermined timing or on the basis of a request from the outside such as the inter prediction unit 170 or the like.

To the intra prediction unit 169, information representative of the intra prediction mode obtained by decoding header information and so forth are suitably supplied from the lossless decoding unit 162. The intra prediction unit 169 performs intra prediction in the intra prediction mode used by the encoding side using a decoded image supplied from the arithmetic operation unit 165 as a reference image to generate a predictive image. The intra prediction unit 169 supplies the generated predictive image to the predictive image selection unit 171.

The inter prediction unit 170 acquires information obtained by decoding header information (optimum prediction mode information, reference image information and so forth) from the lossless decoding unit 162. The inter prediction unit 170 performs inter prediction using the reference image acquired from the frame memory 168 in the inter prediction mode indicated by the optimum prediction mode information acquired from the lossless decoding unit 162 to generate a predictive image. The inter prediction unit 170 supplies the generated predictive image to the predictive image selection unit 171.

The predictive image selection unit 171 supplies the predictive image supplied from the intra prediction unit 169 or the inter prediction unit 170 to the arithmetic operation unit 165.

The image decoding device 150 having such a configuration as described above can decode encoded data generated by a general image encoding device that encodes an image by the HEVC encoding method. Since also the encoding method of the image encoding device 100 (FIG. 5) complies with the HEVC encoding method, the image decoding device 150 can decode also encoded data generated by the image encoding device 100.

<Accumulation of Errors>

However, since the image decoding device 150 does not perform lossy encoding of image data to be stored into the frame memory 168, it loops decoded image data to utilize the same as reference data, and consequently, there is the possibility that errors of the orthogonal transformation coefficient may be accumulated in the time direction of the image to increase the deterioration of the picture quality.

The accumulation of errors is described. White bar charts at the left side in FIGS. 7A, 7B and 7C of frames from a frame (n−1) to a frame (n+2) depicted in A of FIG. 7A indicate signal levels of image data inputted to the encoding unit 121 (indicated by an arrow mark 131 in FIG. 5). Meanwhile, bar charts of a slanting line pattern at the right side in FIGS. 7A, 7B and 7C of the frames from the frame (n−1) to the frame (n+2) depicted in FIG. 7A indicate signal levels of image data outputted from the decoding unit 123 (indicated by an arrow mark 132 or another arrow mark 133 in FIG. 5).

Figure 7A:
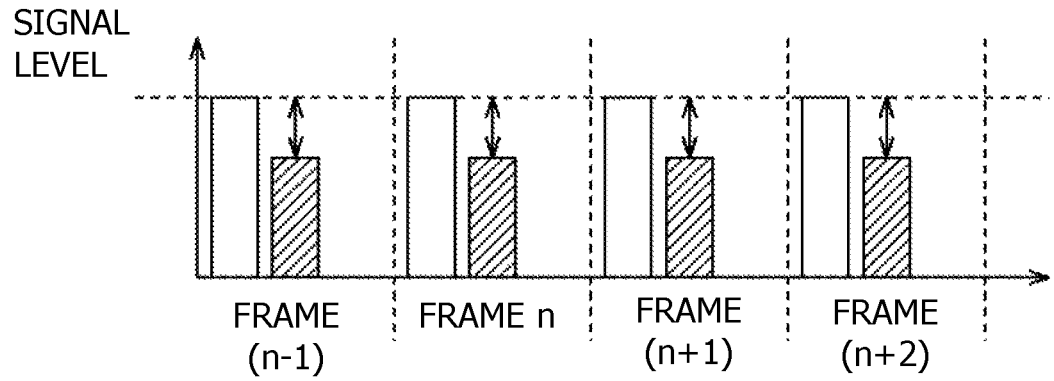
FIGS. 7A, 7B and 7C are views illustrating accumulation of errors.
Figure 7B:
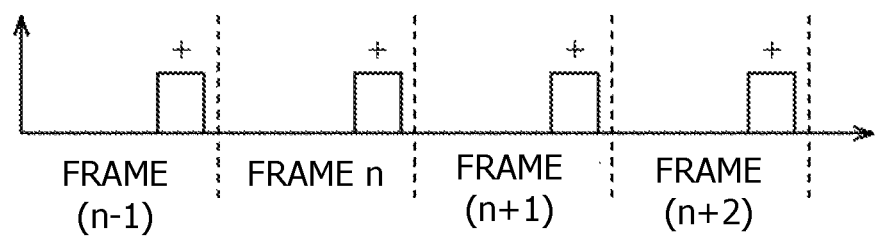
Figure 7C:
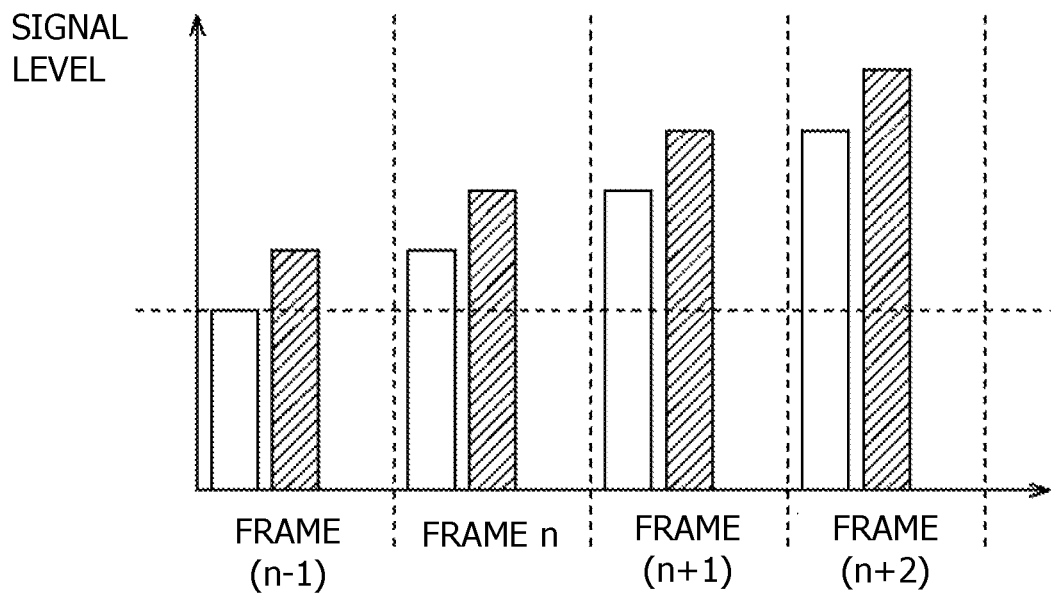

As described hereinabove, since the encoding and decoding methods of the encoding unit 121 and the decoding unit 123 are of the lossy type, the signal level of an output from the decoding unit 123 in each frame decreases from the signal level of the input to the encoding unit 121 as indicated in FIGS. 7A, 7B and 7C. The difference (double-sided arrow mark) is an error caused by compression.

However, the error appearing in the reference image is compensated for by the orthogonal transformation unit 113. In particular, the orthogonal transformation unit 113 generates, in each frame, an orthogonal transformation coefficient for compensating this error. White bar charts of the frames from the frame (n−1) to the frame (n+2) depicted in FIG. 7B indicate orthogonal transformation coefficients generated by the orthogonal transformation unit 113 in order to compensate the error. By generation of such orthogonal transformation coefficients, the signal level of the input (arrow mark 131) to the encoding unit 121 ideally returns, in each frame, to a substantially original level.

Incidentally, since the encoding and decoding methods in the frames by the encoding unit 121 and the decoding unit 123 are same as each other, the compression characteristics for the frames are uniform as indicated by FIG. 7A, and also the manners in appearance of errors in the frames are uniform. Therefore, as depicted in FIG. 7B, also the manners of generation (sign and magnitude) of orthogonal transformation coefficients in the frames by the orthogonal transformation unit 113 are uniform.

In contrast, to such encoding of the image encoding device 100 as described above, the image decoding device 150 does not perform lossy encoding for image data stored in the frame memory 168. In other words, such deterioration of a signal level (deterioration of the picture quality) as indicated by FIG. 7A does not occur. Accordingly, there is the possibility that the addition of an orthogonal transformation coefficient (compensation for an error) for each frame indicated by FIG. 7B may become excessive correction and may rather give rise to an error. Further, since the orthogonal transformation coefficients added to the frames are uniform as described hereinabove, there is the possibility that the error may be accumulated (the total error may increase) in the time direction of the image (as the frame advances).

FIG. 7C illustrates an example of a manner of accumulation of errors. White bar charts at the left side in FIGS. 7A, 7B and 7C of frames depicted in C of FIG. 7C indicate signal levels of image data inputted to the frame memory 168 (indicated by an arrow mark 172 in FIG. 6). Meanwhile, bar charts of a slanting line pattern at the right side in FIGS. 7A, 7B and 7C of the frames depicted in FIG. 7C indicate signal levels of image data outputted from the arithmetic operation unit 165 (indicated by an arrow mark 173 in FIG. 6).

As depicted in FIG. 7C, since similar orthogonal transformation coefficients are added to the frames, the signal level increases in the time direction of the image (as the frame advances). In other words, the total error increases in the time direction of the image (as the frame advances). In short, the deterioration of the picture quality of the decoded image increases.

Although occurrence of bandwidth shortage at the input/output bus of the frame memory 122 and occurrence of shortage of the free space of the frame memory 122 can be suppressed by compressing image data to be accumulated in the frame memory 122 as in the case of the image encoding device 100 (FIG. 5) as described above, if the encoded data is decoded by the image decoding device 150 of a general configuration, then there is the possibility that deterioration (degradation) of the picture quality of the decoded image may increase in the time direction of the image.

<Control of Rounding Value>

Therefore, encoded data obtained by lossy encoding an image of a frame encoded already which is to be used as a reference image in encoding of an image of a current frame is decoded, and rounding of a decoded image obtained by the decoding is performed with a rounding value whose value is changed over in the time direction of the image.

This makes it possible to suppress deterioration of the picture quality by encoding.

It is to be noted that the rounding value may otherwise be changed over in the time direction of an image such that an orthogonal transformation coefficient generated in encoding of an image is reduced, for example, for the compensation for an error by lossy encoding of an image of a frame encoded already.

<Decoding Unit>

Figure 8:
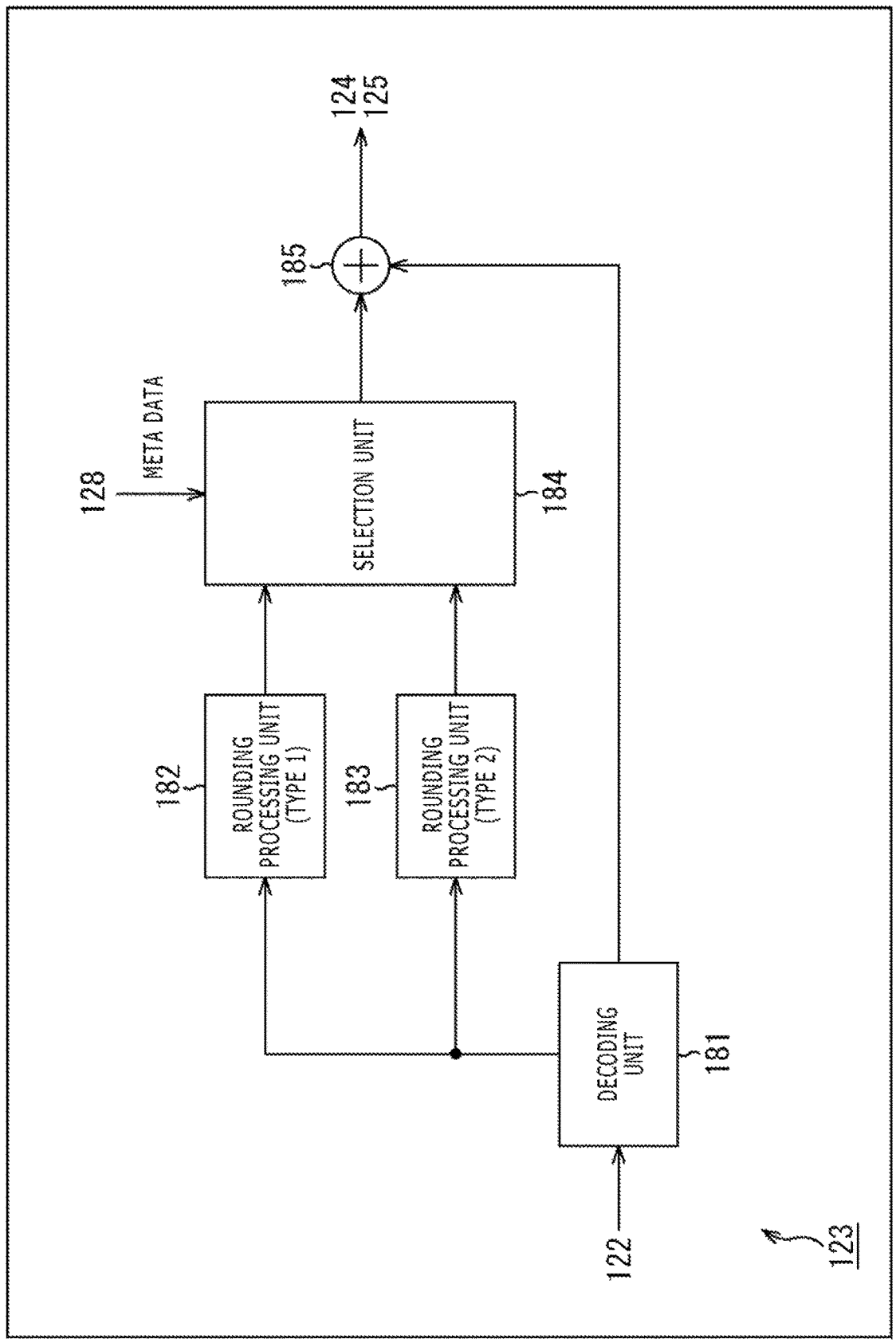
FIG. 8 is a block diagram depicting an example of a principal configuration of a decoding unit.

FIG. 8 is a block diagram depicting an example of a principal configuration of the decoding unit 123 of FIG. 5. As depicted in FIG. 8, the decoding unit 123 includes a decoding unit 181, a rounding processing unit 182, a rounding processing unit 183, a selection unit 184 and an arithmetic operation unit 185.

The decoding unit 181 decodes encoded data of a decoded image read out from the frame memory 122 (encoded data of a decoded image encoded by lossy encoding by the encoding unit 121) by a lossy decoding method to generate image dada of the decoded image. The decoding unit 181 supplies the generated image data to the arithmetic operation unit 185. Further, the decoding unit 181 supplies a notification that decoding is performed to the rounding processing unit 182 and the rounding processing unit 183.

When the notification that decoding is performed is received from the decoding unit 181, the rounding processing unit 182 supplies a rounding value of a predetermined value (type 1) as a rounding value for the image data generated by the decoding to the selection unit 184.

When the notification that decoding is performed is received from the decoding unit 181, the rounding processing unit 183 supplies, as a rounding value for the image data generated by the decoding, a rounding value (type 2) of a predetermined value having a value different from that of the rounding value of the type 1 to the selection unit 184.

The selection unit 184 selects one of the rounding value of the type 1 supplied from the rounding processing unit 182 and the rounding value of the type 2 supplied from the rounding processing unit 183 and supplies the selected rounding value to the arithmetic operation unit 185.

The arithmetic operation unit 185 adds the rounding value supplied from the selection unit 184 to image data supplied from the decoding unit 181. The arithmetic operation unit 185 supplies a result of the addition to the intra prediction unit 124 or the inter prediction unit 125.

The encoded data supplied to the decoding unit 181 is encoded data read out from the frame memory 122 and encoded data obtained by lossy encoding of image data of a frame encoded already by the encoding unit 121. On the other hand, the image data outputted from the arithmetic operation unit 185 is used as data (reference data) of a reference image by the intra prediction unit 124 or the inter prediction unit 125. In short, an image of the image data outputted from the arithmetic operation unit 185 is used as a reference image in encoding of an image of a current frame that is a processing target.

Since lossy encoding and lossy decoding are performed, image data obtained by decoding by the decoding unit 181 has an information amount reduced from that before the encoding by the encoding unit 121. For example, lower bits of each pixel value (for example, lower 5 bits from a pixel value of a bit depth of 10 bits) are missing.

The arithmetic operation unit 185 adds the rounding value supplied from the selection unit 184 to such image data supplied from the decoding unit 181 to perform rounding of the image data. For example, it is assumed that the lower 5 bits of each pixel value of 10 bits of image data supplied from the decoding unit 181 are missing and the rounding processing unit 182 and the rounding processing unit 183 supply rounding values of 5 bits. In this case, the arithmetic operation unit 185 adds the rounding value selected by the selection unit 184 from among the rounding values to the lower 5 bits of the image data to perform rounding of the image data.

Further, the selection unit 184 performs setting (selection) of a rounding value to be used for rounding of image data.

For example, it is assumed that the selection unit 184 changes over the selection of the rounding value from the type 1 to the type 2 in a certain frame. Thereafter, in a certain different frame that becomes a processing target newly as a result of advancement in the time direction of the image, the selection unit 184 changes over the selection of the rounding value from the type 2 to the type 1. In this manner, the selection unit 184 changes over the rounding value in the time direction of the image (advancing direction of the frame).

Thereafter, the selection unit 184 may perform setting (selection) of a rounding value on the basis of metadata (header information) supplied from the header information generation unit 128. For example, the selection unit 184 may decide a frame of image data to be lossy decoded on the basis of the POC (grasps the advancement of the frame) and change over the rounding value in the time direction of the image in response to a result of the decision (advancement of the frame).

As described above, since the selection unit 184 performs such selection as described above, the arithmetic operation unit 185 performs rounding of image data (decoded image) supplied from the decoding unit 181 with a rounding value whose value is changed over in the time direction of the image.

Accordingly, deterioration of the picture quality by encoding can be suppressed.

<Examples of Rounding Value>

Figure 9:
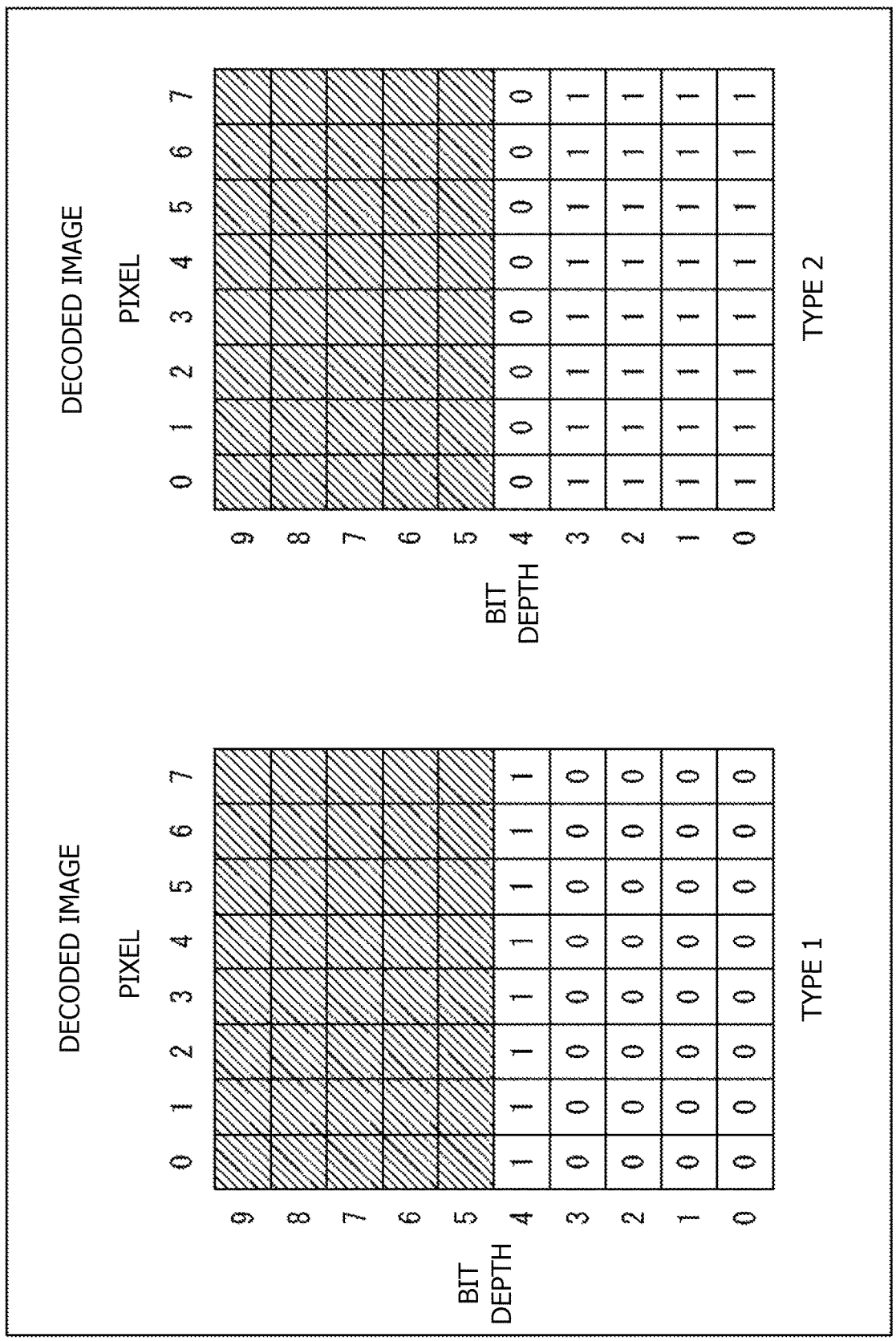
FIG. 9 is a view illustrating examples of a rounding value.

An example of the rounding value of the type 1 provided by the rounding processing unit 182 and an example of the rounding value of the type 2 provided by the rounding processing unit 183 are illustrated in FIG. 9. FIG. 9 illustrates a state in which rounding values are added to results of lossy decoding of image data formed from pixel values of a bit depth of 10 bits. In FIG. 9, the example at the left side indicates an example of image data when a rounding value of the type 1 is added, and the example at the right side indicates an example of image data when a rounding value of the type 2 is added.

At the higher 5 bits indicated by squares of a slanting line pattern (bit depth 5 to bit depth 9), data before lossy encoding is reproduced by lossy decoding. In short, basically missing of no information occurs with the higher 5 bits of the pixel value. In contrast, in information of the lower 5 bits indicated by white squares (bit depth 0 to bit depth 4), information is missing as a result of lossy encoding and lossy decoding, and the rounding values are individually added by rounding.

In particular, in the present case, the rounding value of the type 1 provided by the rounding processing unit 182 is a 5-bit value "10000," and the rounding value of the type 2 provided by the rounding processing unit 183 is another 5-bit value "01111."

<Accumulation of Errors>

Accumulation of errors when the two rounding values of the 5-bit values indicated in FIG. 9 are changed over for each frame is described with reference to FIGS. 10A 10B and 10C.

Figure 10A:
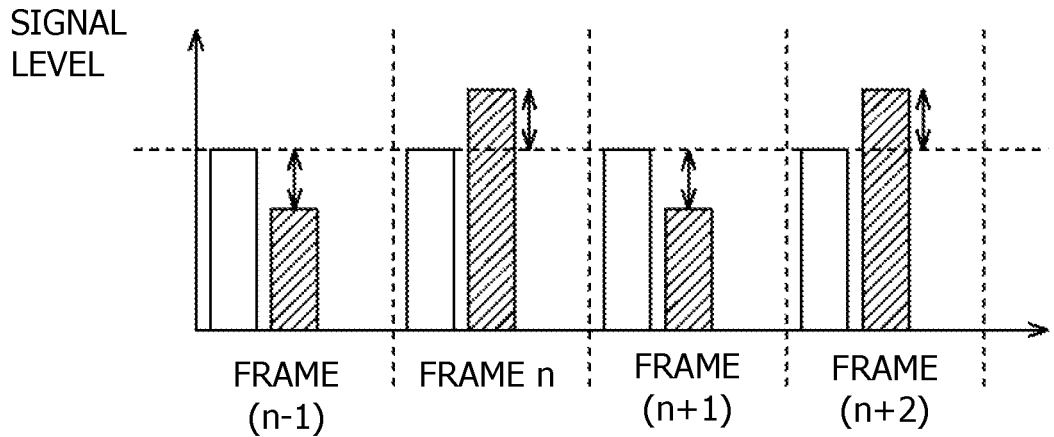
FIGS. 10A, 10B and 10C are views illustrating accumulation of errors.
Figure 10B:
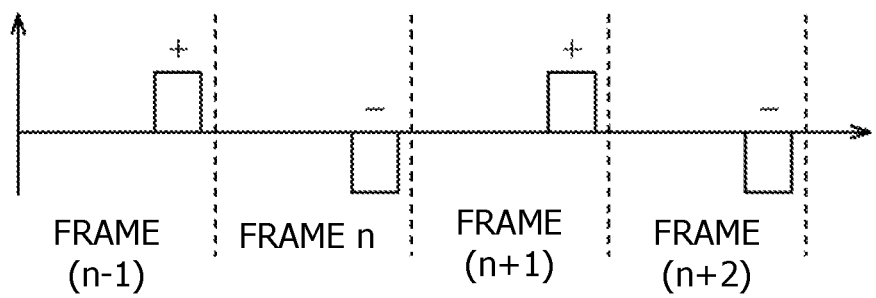
Figure 10C:
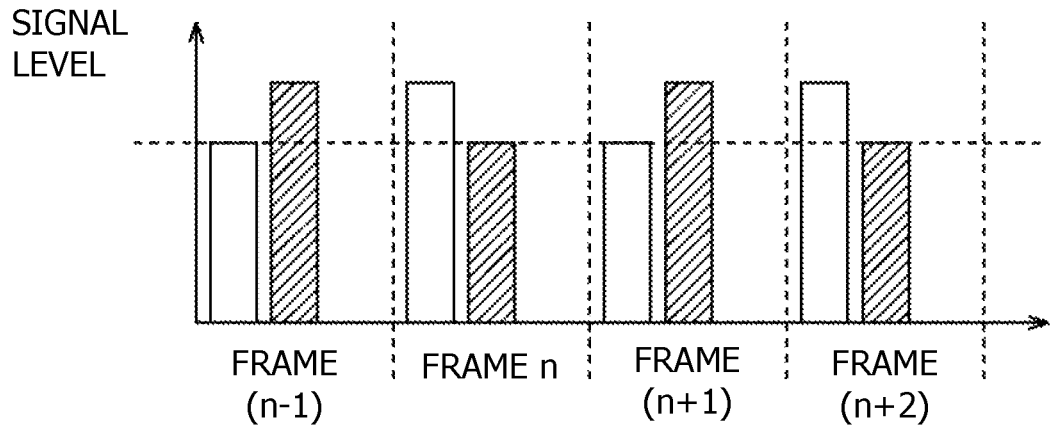

White bar charts at the left side in FIGS. 10A, 10B and 10C of frames from a frame (n−1) to a frame (n+2) depicted in FIG. 10A indicate signal levels of image data inputted to the encoding unit 121 (indicated by the arrow mark 131 of FIG. 5). Meanwhile, bar charts of a slanting line pattern at the right side in FIGS. 10A, 10B and 10C of the frames from the frame (n−1) to the frame (n+2) depicted in FIG. 10A indicate signal levels of image data outputted from the decoding unit 123 (indicated by the arrow mark 132 or the arrow mark 133 of FIG. 5).

Since the encoding and decoding methods of the encoding unit 121 and the decoding unit 123 are lossy methods, the signal level of an output from the decoding unit 123 in each frame varies in comparison with the signal level of an input to the encoding unit 121 as depicted in FIG. 10A. This difference (double-sided arrow mark) is an error by compression. However, in the case of FIG. 10A, the rounding value is changed over for each frame and the direction of appearance of an error is not uniform (signal level increases or decreases).

White bar charts of the frames from the frame (n−1) to the frame (n+2) depicted in FIG. 10B indicate orthogonal transformation coefficients generated by the orthogonal transformation unit 113 in order to compensate the errors.

Since the direction of appearance of an error is not uniform as depicted in FIG. 10A, also the manner of generation (sign and magnitude) of an orthogonal transformation coefficient disperses for each frame (is not uniform as in the example of FIG. 7B) as depicted in FIG. 10B.

White bar charts at the left side in FIGS. 10A, 10B and 10C of the frames from the frame (n−1) to the frame (n+2) depicted in C of FIG. 10C indicate signal levels of image data inputted to the frame memory 168 of the image decoding device 150 (indicated by the arrow mark 172 of FIG. 6). Meanwhile, bar charts of a slanting line pattern at the right side in FIGS. 10A, 10B and 10C of the frames from the frame (n−1) to the frame (n+2) depicted in FIG. 10C indicate signal levels of image data outputted from the arithmetic operation unit 165 (indicated by the arrow mark 173 of FIG. 6).

In this case, the signal level does not increase in the time direction of the image (as the frame advances) as indicated by FIG. 10C. Also in this case, although the orthogonal transformation coefficient to be added for each frame makes excessive correction (error), since the orthogonal transformation coefficients to be added in the frames are not uniform, the orthogonal transformation coefficients added in the frames cancel each other. Therefore, errors do not increase in the time direction of the image (as the frame advances). In other words, deterioration of the picture quality of a decoded image does not increase in the time direction of the image.

Accordingly, the decoding unit 123 decodes encoded data obtained by lossy encoding an image of a fame encoded already which is used as a reference image in encoding of an image of a current frame, and performs rounding of a decoded image obtained by the decoding with the rounding value changed over in the time direction of the image as described hereinabove. Deterioration of the picture quality by encoding can be suppressed thereby.

<Rounding Values and Number of Values>

It is to be noted that the rounding values to be changed over by the selection unit 184 (rounding values provided by the rounding processing unit 182 and the rounding processing unit 183) are arbitrary values and, although they may be the 5-bit values "10000" and "01111" depicted in FIG. 9, they may otherwise be values different from the examples. For example, a random number may be used as a rounding value. In this case, the selection unit 184 updates the value of the random number in the time direction of the image (as the frame advances).

However, although it is assumed that, in this case, theoretically also the manner of generation (sign and magnitude) of an orthogonal transformation coefficient becomes random and errors cancel each other, actually it becomes difficult to control the manner of generation of an orthogonal transformation coefficient and, in some cases, there is the possibility that the manner of generation of an orthogonal transformation coefficient may be biased, resulting in accumulation of errors.

Therefore, it is rather desirable to use a known value as a rounding value as in the example of FIG. 9. Thereupon, by exchanging the value ("1" or "0") of each bit of the rounding value between the types as in the example of FIG. 9, it is possible to make it easy to generate an orthogonal transformation coefficient in the opposite direction (make it easy to reverse the sign). Consequently, it is possible to make it easy for errors to cancel each other (to make it difficult for errors to be accumulated) and further suppress deterioration of the picture quality.

It is to be noted that, in the example of FIG. 9, substantially middle values "10000" and "01111" of 5-bit values are used alternately as a rounding value. This makes it possible to minimize the difference in value between the rounding value of the type 1 and the rounding value of the type 2 (namely, to "1") and besides make the bit values different from each other as described hereinabove. By minimizing the difference between the rounding value of the type 1 and the rounding value of the type 2 in this manner, it is possible to suppress a variation of a property of encoding of an image caused by changing over the rounding value and further stabilize the encoding efficiency.

Further, although it is described that selection of a rounding value in the example of FIG. 9 is performed from between two different rounding values (type 1 and type 2), the number of rounding values (type number) to be prepared is an arbitrary number if it is a plural number and may be three or more. For example, selection of a rounding value may be performed from among three 4-bit values. For example, also in this case, substantially middle values of the 4-bit values may be used as the rounding values similarly as in the case of the 5-bit values described hereinabove. For example, three 4-bit values "1001," "1000" and "0111" may be used in a predetermined order or at random as a rounding value.

It is to be noted that the number of rounding processing units the decoding unit 123 has may be equal to the type number of rounding values, or a single rounding processing unit may be configured so as to be able to provide a plurality of types of rounding values.

<Changeover Timing of Rounding Value>

Changeover of a rounding value may be performed at an arbitrary timing if it is performed in the time direction of an image. For example, changeover of a rounding value may be performed at random (at an arbitrary frame (picture)). Alternatively, for example, changeover of a rounding value may be performed for each plural number of frames (plural number of pictures). Furthermore, for example, changeover of a rounding value may be performed for each frame (for each picture).

It is to be noted that changeover of a rounding value is performed by the selection unit 184. Thereupon, the selection unit 184 may grasp a timing (frame) at which the rounding value is to be changed over on the basis of a POC supplied from the header information generation unit 128.

Alternatively, for example, changeover of a rounding value may be performed in response to a picture type. For example, changeover of a rounding value may be performed in response to the P picture. In other words, at the B picture and the I picture, changeover of a rounding value may be inhibited. In this case, the selection unit 184 may grasp a timing (frame) at which a rounding value is to be changed over on the basis of a POC and a picture type supplied from the header information generation unit 128.

The GOP structure of an image is arbitrary, and the manner of the arrangement of the I picture, P picture and B picture is arbitrary. For example, a case (M1) in which P pictures appear successively as depicted in FIG. 11A sometimes occurs. Also, for example, another case (M3) in which a set of a B picture, a B picture and a P picture is repeated occurs as depicted in FIG. 11B. Naturally, the GOP structure may be any other structure than those examples, and also the GOP length (N) is arbitrary.

An example of changeover control of a rounding value for the pattern of FIG. 11A is illustrated in FIG. 12A. Meanwhile, an example of changeover control of a rounding value for the pattern of FIG. 11B is illustrated in FIG. 12B. In the examples of FIGS. 12A and 12B, changeover of a rounding value is performed only at the P picture. The P picture is a picture that refers to a different picture and is referred to from another different picture. In particular, the P picture is a picture with which accumulation of errors is likely to occur. By performing changeover of a rounding value at the P picture having such a property as just described, the decoding unit 123 can suppress accumulation of errors more efficiently and suppress deterioration of the picture quality by encoding.

It is to be noted that changeover of a rounding value may be performed at each P picture as in the examples of FIGS. 12A and 12B or changeover of a rounding value may be performed at each plural number of P pictures, or else, changeover of a rounding value may be performed at an arbitrary P picture. For example, changeover of a rounding value may be performed at a P picture selected at random.

Alternatively, rounding of a picture at which a rounding value is not changed over (for example, at an I picture and a B picture) may be performed using a rounding value of a better property from among a plurality of rounding values that are used for rounding of a picture at which a rounding value is to be changed over (for example, at a P picture). For example, where the decoding unit 123 uses the rounding values of the examples of FIG. 9, at a P picture, rounding may be performed changing over the rounding value between the rounding value of the type 1 and the rounding value of the type 2, but at an I picture and a B picture, rounding may be performed using, from between the rounding value of the type 1 and the rounding value of the type 2, a rounding value that has a better encoding property (for example, of the "type 1"). This can make it possible to further improve the encoding efficiency.

Naturally, changeover of a rounding value may be performed at an I picture or a B picture, or a rounding value may be fixed at a P picture (changeover is not performed).

It is to be noted that such a decoding unit (for example, the decoding unit 123) that decodes encoded data, which is obtained by lossy encoding an image of a frame encoded already which is used as a reference image in encoding of an image of a current frame that is a processing target and performs rounding of a decoded image obtained by the decoding with a rounding value whose value is changed over in the time direction of the image as described hereinabove may be formed as an independent device (image processing device).

The image processing device may further include a storage unit for storing encoded data (for example, the frame memory 122) such that the decoding unit decodes encoded data read out from the storage unit and performs rounding of a decoded image obtained by the decoding.

The image processing device may further include an encoding unit that lossy encodes an image of a frame encoded already which is used as a reference image (for example, the encoding unit 121) such that the storage unit stores encoded data generated by lossy encoding by the encoding unit.

The image processing device may further include an orthogonal transformation unit that orthogonally transforms a difference image between an image of a current frame and a reference image obtained by decoding by the decoding unit and suitably generates an orthogonal transformation coefficient for the compensation for an error by lossy encoding of an image of a frame encoded already which is utilized as a reference image (for example, the orthogonal transformation unit 113).

<Flow of Encoding Process>

Now, an example of a flow of processes executed by the image encoding device 100 is described. First, an example of a flow of an encoding process is described with reference to a flow chart of FIG. 13.

After an encoding process is started, the header information generation unit 128 generates header information at step S101.

At step S102, the screen sorting buffer 111 stores images of frames (pictures) of a moving image inputted thereto in an order for displaying and performs sorting from the order for displaying into an order for encoding of the pictures.

At step S103, the decoding unit 123 reads out encoded data of a reference image from the frame memory 122. At step S104, the decoding unit 123 decodes the encoded data to obtain reference data.

At step S105, the intra prediction unit 124 performs an intra prediction process in accordance with the prediction restriction at step S102. Further, at step S106, the inter prediction unit 125 performs an inter prediction process in accordance with the prediction restriction at step S102.

At step S107, the predictive image selection unit 126 selects one of the predictive image generated by the intra prediction process at step S105 and the predictive image generated by the inter prediction process at step S106.

At step S108, the arithmetic operation unit 112 arithmetically operates a difference between the input image whose frame order is sorted by the process at step S102 and the predictive image selected by the process at step S107. In short, the arithmetic operation unit 112 generates residual data between the input image and the predictive image. The residual data determined in this manner is reduced in data amount in comparison with the original image data. Accordingly, the data amount can be compressed in comparison with that in an alternative case in which the image is encoded as it is.

At step S109, the orthogonal transformation unit 113 orthogonally transforms the residual data generated by the process at step S108.

At step S110, the quantization unit 114 quantizes an orthogonal transformation coefficient obtained by the process at step S109.

At step S111, the dequantization unit 117 dequantizes the quantized coefficient (also referred to as quantization coefficient) generated by the process at step S110 with a property corresponding to the property of the quantization.

At step S112, the inverse orthogonal transformation unit 118 inversely orthogonally transforms an orthogonal transformation coefficient obtained by the process at step S111.

At step S113, the arithmetic operation unit 119 adds the predictive image selected by the process at step S107 to the residual data restored by the process at step S112 to generate image data of a reconstruction image.

At step S114, the loop filter 120 performs a loop filter process for the image data of the reconstruction image generated by the process at step S113. Consequently, block distortion and so forth of the reconstruction image are removed.

At step S115, the encoding unit 121 lossy encodes a decoded image obtained by the process at step S114 and locally decoded to compress resulting image. At step S116, the frame memory 122 stores encoded data obtained by the process at step S115.

At step S117, the lossless encoding unit 115 encodes the quantized coefficient obtained by the process at step S110. In particular, lossless encoding such as variable length encoding, arithmetic encoding or the like is performed for data corresponding to the residual data.

Further, at this time, the lossless encoding unit 115 encodes information relating to the prediction mode of the predictive image selected by the process at step S107 and adds the encoded information to the encoded data obtained by encoding the difference image. In particular, the lossless encoding unit 115 encodes also information according to the optimum intra prediction mode supplied from the intra prediction unit 124, information according to the optimum inter prediction mode supplied from the inter prediction unit 125 and so forth and adds the encoded information to the encoded data.

At step S118, the accumulation buffer 116 accumulates the encoded data and so forth obtained by the process at step S117. The encoded data and so forth accumulated in the accumulation buffer 116 are read out suitably as a bit stream and is transmitted to the decoding side through a transmission line or a recording medium.

At step S119, the rate controlling unit 127 controls the rate of the quantization process at step S110 such that overflow or underflow may not occur on the basis of the code amount (generation code amount) such as encoded data and so forth accumulated in the accumulation buffer 116 by the process at step S118.

If the process at step S118 ends, then the encoding process ends.

<Flow of Decoding Process>

Figure 13:
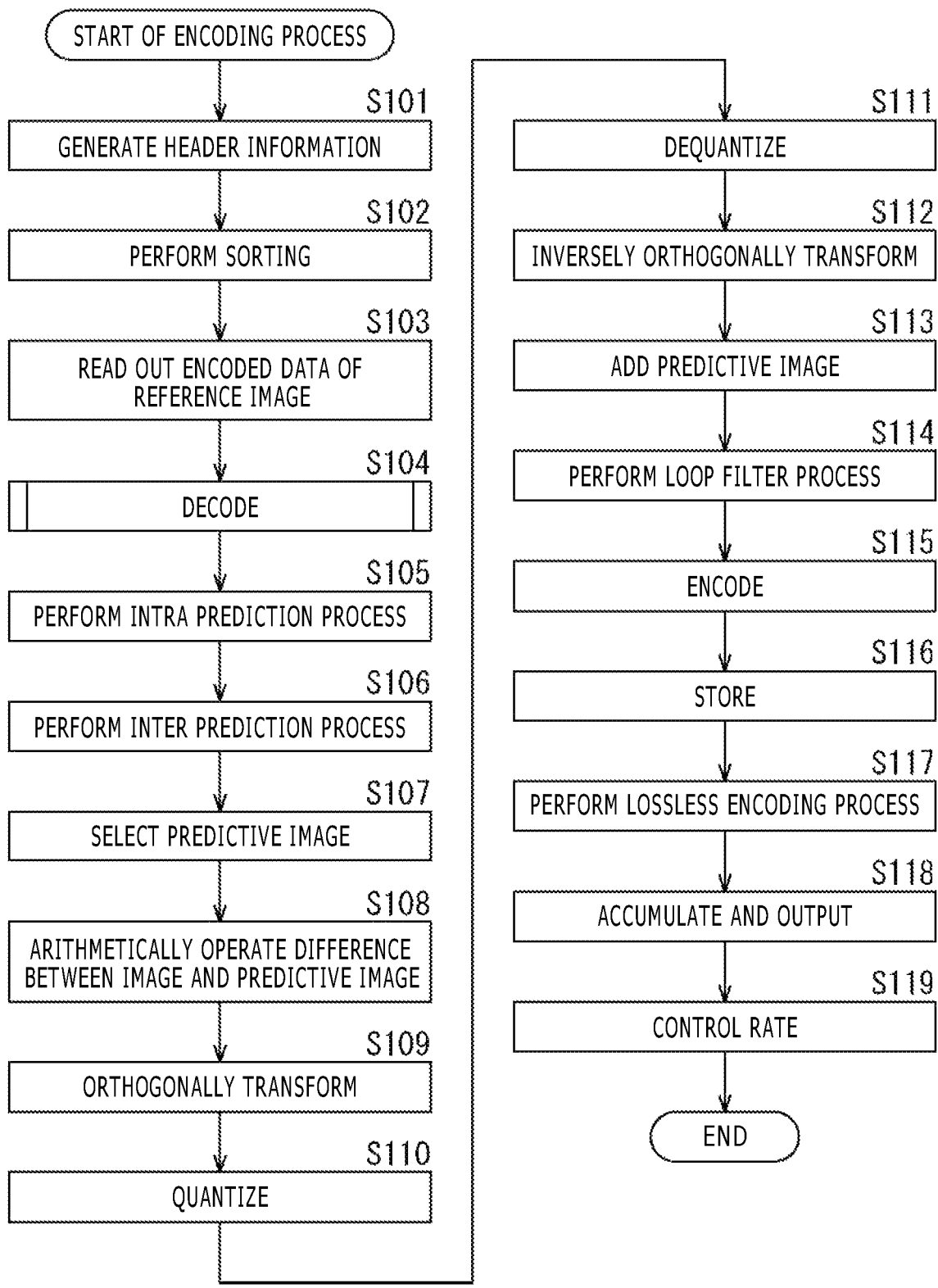
FIG. 13 is a flow chart illustrating an example of a flow of an encoding process.

Now, an example of a detailed flow of the decoding process executed at step S104 of FIG. 13 is described with reference to a flow chart of FIG. 14.

After the decoding process is started, the selection unit 184 sets a rounding value at step S131. At step S132, the decoding unit 181 decodes the encoded data of the reference image. At step S133, the arithmetic operation unit 185 performs rounding of the decoded image with the rounding value selected (set) by the selection unit 184.

If the process at step S133 ends, then the decoding process ends, and the processing returns to FIG. 13.

<Flow of Rounding Value Setting Process>

Figure 14:
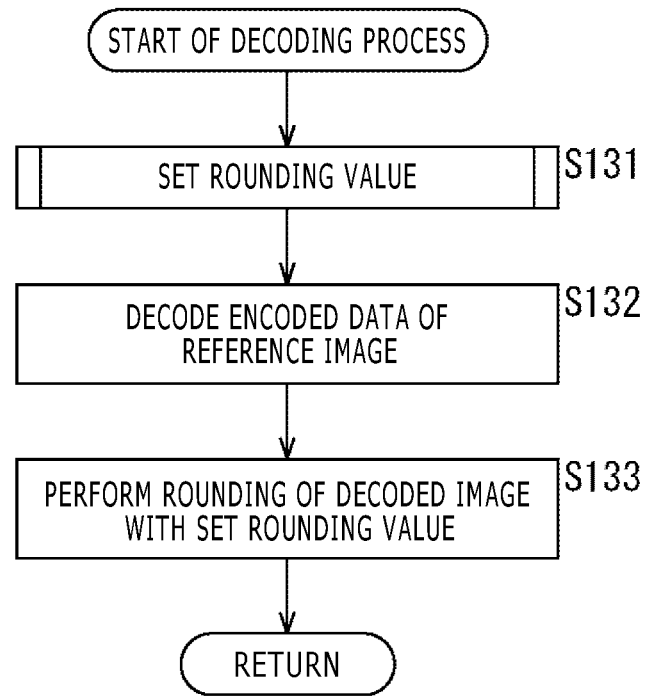
FIG. 14 is a flow chart illustrating an example of a flow of a decoding process.
Figure 15:
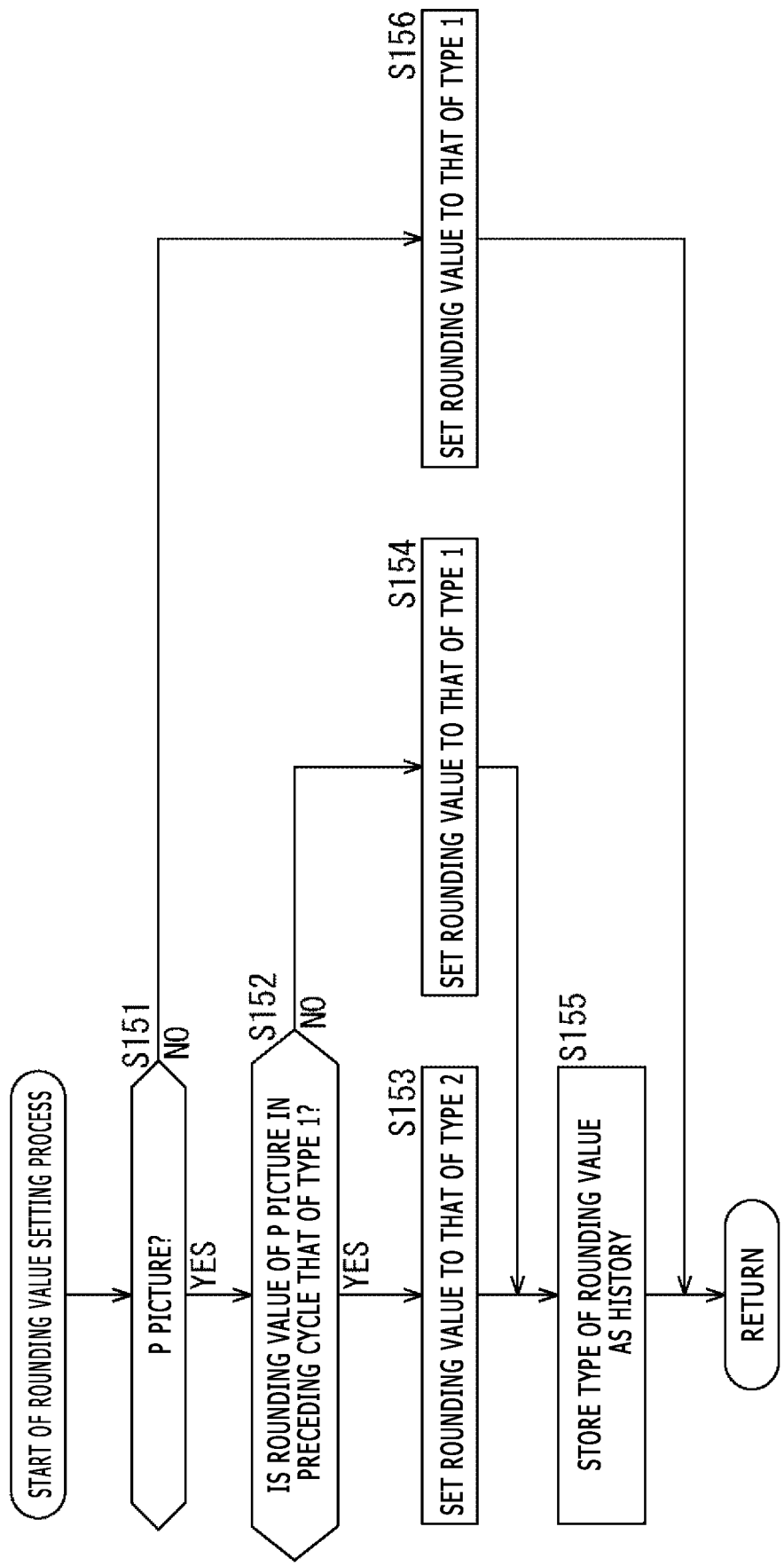
FIG. 15 is a flow chart illustrating an example of a flow of a rounding value setting process.

Now, an example of a flow of the rounding value setting process executed at step S131 of FIG. 14 is described with reference to a flow chart of FIG. 15.

After the rounding value setting process is started, the selection unit 184 decides whether or not the frame of the processing target is a P picture on the basis of metadata such as a POC, a picture type or the like at step S151. If it is decided that the frame of the processing target is a P picture, then the processing advances to step S152.

At step S152, the selection unit 184 refers to the history of the type of the rounding value to decide whether or not the rounding value of the P picture in the preceding cycle is of the type 1. If it is decided that the rounding value is of the type 1, then the processing advances to step S153.

At step S153, the selection unit 184 sets the rounding value to that of the type 2. After the rounding value is set, the processing advances to step S155.

On the other hand, if it is decided at step S152 that the rounding value of the P picture in the preceding cycle is not of the type 1 (is of the type 2), then the processing advances to step S154.

At step S154, the selection unit 184 sets the rounding value to that of the type 1. After the rounding value is set, the processing advances to step S155.

At step S155, the selection unit 184 stores the set type of the rounding value as a history. If the process at step S155 ends, then the rounding value setting process ends, and the processing returns to FIG. 14.

On the other hand, if it is decided at step S151 that the processing target is not a P picture (is an I picture or a B picture), then the processing advances to step S156.

At step S156, the selection unit 184 sets the rounding value to that of the type 1. If the process at step S156 ends, then the rounding value setting process ends, and the processing returns to FIG. 14.

By executing the processes in such a manner as described above, the decoding unit 123 can suppress deterioration of the picture quality by encoding.

2. Second Embodiment

<Decoding Unit>

It is to be noted that the rounding value may be changed over at a block that is a block of a picture of a target for changeover of a rounding value and in which an orthogonal transformation coefficient is generated in encoding of an image for the compensation for an error by lossy encoding of an image of a frame encoded already.

Figure 16:
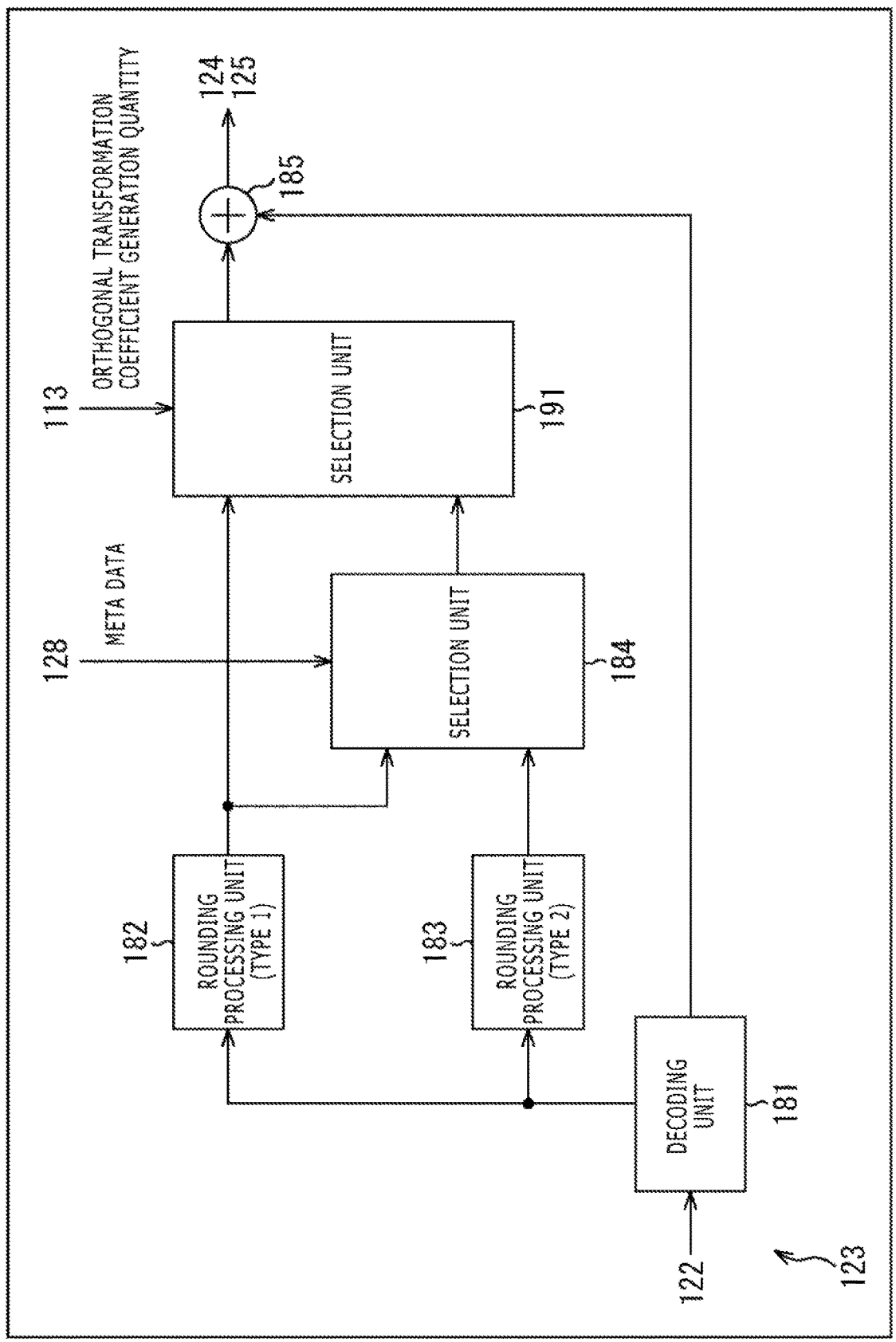
FIG. 16 is a block diagram depicting an example of another configuration of the decoding unit.

FIG. 16 is a block diagram depicting an example of a principal configuration of the decoding unit 123 in this case. Also in this case, the decoding unit 123 includes components from a decoding unit 181 to an arithmetic operation unit 185 similarly as in the case of FIG. 8. The decoding unit 123 further includes a selection unit 191.

The rounding processing unit 182 provides the rounding value of the type 1 to the selection unit 184 and the selection unit 191. Further, the selection unit 184 selects the rounding value of the type 1 supplied from the rounding processing unit 182 or the rounding value of the type 2 supplied from the rounding processing unit 183 and supplies the selected rounding value to the selection unit 191.

The selection unit 191 selects one of the rounding value of the type 1 supplied from the rounding processing unit 182 and the rounding value selected by the selection unit 184 and supplies the selected rounding value to the arithmetic operation unit 185.

The arithmetic operation unit 185 adds the rounding value supplied from the selection unit 191 to image data supplied from the decoding unit 181. The arithmetic operation unit 185 supplies a result of the addition to the intra prediction unit 124 or the inter prediction unit 125.

It is to be noted that the selection unit 191 may be able to acquire an orthogonal transformation coefficient generation quantity from the orthogonal transformation unit 113. Then, the selection unit 191 may decide whether or not a current block (for example, a current LCU) that is a processing target is a block (for example, an LCU) in which an orthogonal transformation coefficient is generated on the basis of the orthogonal transformation coefficient generation quantity. Then, if it is decided that the current block is a block in which an orthogonal transformation coefficient is generated, then the selection unit 191 may change over the rounding value.

Thereupon, the selection unit 191 may change over the rounding value at the block in which an orthogonal transformation coefficient is generated. Further, the selection unit 191 may perform rounding of a picture at which the rounding value is not to be changed over (for example, an I picture and a B picture as well as a block of a P picture in which an orthogonal transformation coefficient is not generated) using a rounding value having a better property from among a plurality of rounding values that are to be used for rounding of a block in which an orthogonal transformation coefficient is generated in a picture at which the rounding value is to be changed over (for example, a P picture).

Furthermore, the selection unit 191 may perform changeover of the rounding value on the basis of information indicative of a POC and information indicative of a picture type both included in the header information of the encoded data of the image as well as information relating to the generation quantity of orthogonal transformation coefficients.

In particular, also the decoding unit 123 in this case may control (changeover) the rounding value by a method similar to that in the case of the first embodiment except that it is taken into consideration whether or not an orthogonal transformation coefficient is generated. It is to be noted that, although it is described in the foregoing description that the unit of data for deciding whether or not an orthogonal transformation coefficient is generated is a unit of a block (for example, an LCU), the data unit is arbitrary. For example, the data unit may be a slice unit or the like. Further, whether or not the rounding value is to be changed over may be controlled depending upon whether the generation quantity of orthogonal transformation coefficients is great or small. For example, the rounding value may be changed over in regard to a block of a P picture in which the generation quantity of orthogonal transformation coefficients is greater than a predetermined threshold value while the rounding value is fixed in regard to an I picture and a B picture as well as a block of a P picture in which the generation quantity of orthogonal transformation coefficients is equal to or smaller than the predetermined threshold value.

<Flow of Rounding Value Setting Process>

Figure 17:
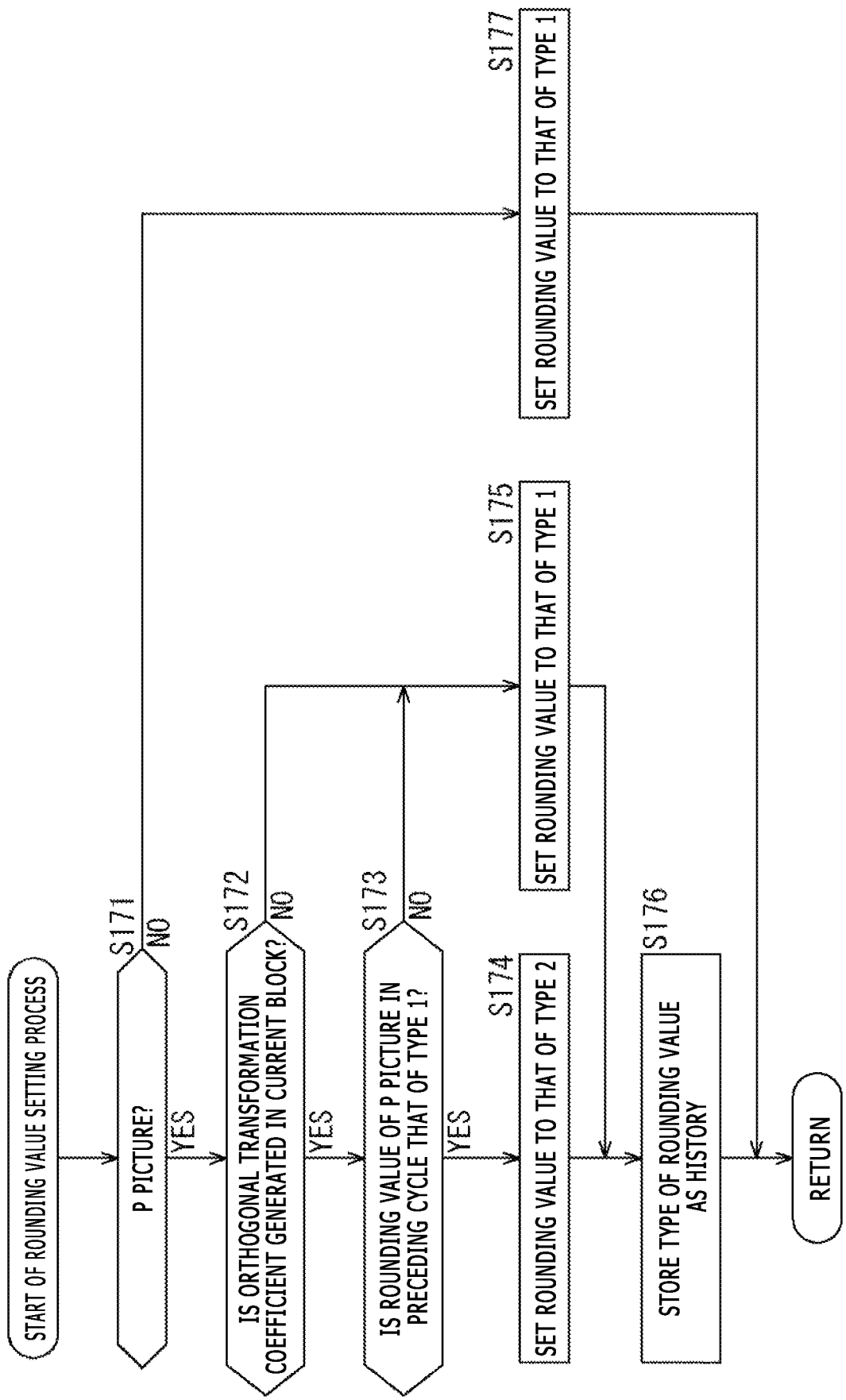
FIG. 17 is a flow chart illustrating another example of a flow of the rounding value setting process.

Now, an example of a flow of the rounding value setting process in this case is described with reference to a flow chart of FIG. 17.

After the rounding value setting process is started, the selection unit 184 decides at step S171 whether or not a frame of a processing target is a P picture on the basis of metadata such as a POC, a picture type and so forth. If it is decided that the frame of the processing target is a P picture, then the processing advances to step S172.

At step S172, the selection unit 191 decides whether or not an orthogonal transformation coefficient is generated in the current block. If it is decided that an orthogonal transformation coefficient is generated, then the processing advances to step S173.

At step S173, the selection unit 184 and the selection unit 191 refer to the history of the type of the rounding value to decide whether or not the rounding value of the P picture in the preceding cycle is that of the type 1. If it is decided that the rounding value is of the type 1, then the processing advances to step S174.

At step S174, the selection unit 184 and the selection unit 191 set the rounding value to that of the type 2. If the process at step S174 ends, then the processing advances to step S176.

On the other hand, if it is decided at step S172 that an orthogonal transformation coefficient is not generated in the current block, then the processing advances to step S175.

Further, if it is decided at step S173 that the rounding value of the P picture in the preceding cycle is not of the type 1 (is of the type 2), then the processing advances to step S175.

At step S175, the selection unit 191 (or the selection unit 184 and the selection unit 191) sets the rounding value to that of the type 1. After the process at step S175 ends, the processing advances to step S176.

At step S176, the selection unit 184 and the selection unit 191 store the set type of the rounding value as a history. After the process at step S176 ends, the rounding value setting process ends, and the processing returns to FIG. 14.

On the other hand, if it is decided at step S171 that the processing target is not a P picture (is an I picture or a B picture), then the processing advances to step S177.

At step S177, the selection unit 184 and the selection unit 191 set the rounding value to that of the type 1. When the process at step S177 ends, the rounding value setting process ends, and the processing returns to FIG. 14.

By executing the processes as described above, the decoding unit 123 can suppress deterioration of the picture quality by encoding.

Further, the present technology can be applied to an image encoding device and an image decoding device that are used when image information (bit stream) compressed by orthogonal transformation such as discrete cosine transformation or the like and motion compensation, for example, like MPEG, H.26x or the like is received through a network medium such as a satellite broadcast, a cable television, the Internet, a portable telephone set or the like. Further, the present technology can be applied to an image encoding device and an image decoding device that are used when processing is performed on a storage medium like an optical or magnetic disk or a flash memory.

3. Third Embodiment

<Application to Multi-View Image Encoding and Multi-View Image Decoding>

Figure 18:
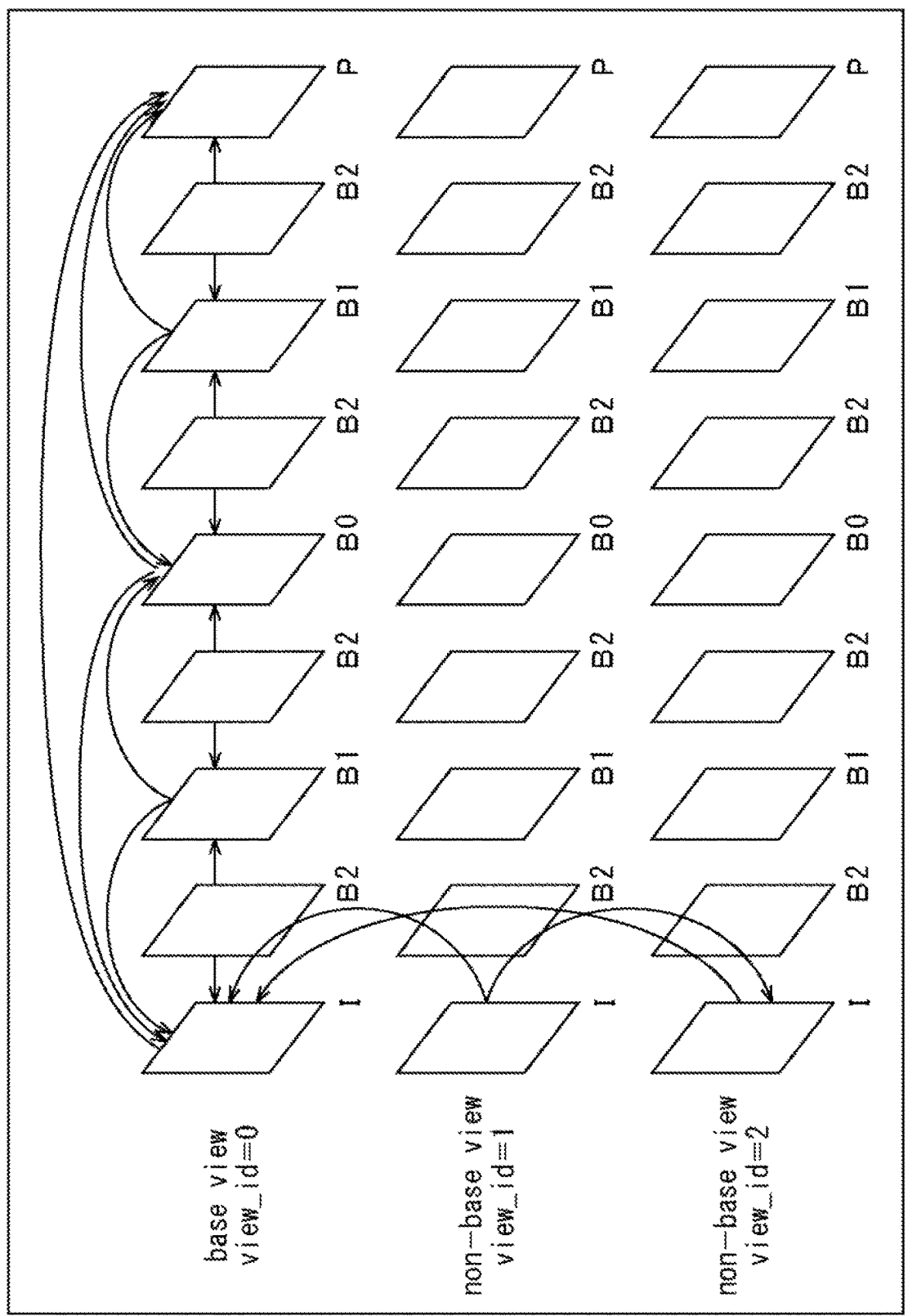
FIG. 18 is a view illustrating an example of a multi-view image encoding method.

The series of processes described hereinabove can be applied to multi-view image encoding and multi-view image decoding. FIG. 18 illustrates an example of a multi-view image encoding method.

As illustrated in FIG. 18, a multi-view image includes images of a plurality of points of view (view). The plurality of views of the multi-view image include a base view whose encoding or decoding is performed using only the image of the own view without utilizing information of a different view and a non-base view whose encoding or decoding is performed utilizing information of a different view. Encoding and decoding of a non-base view may be performed utilizing information of a base view or utilizing information of a different non-base view.

When such a multi-view image as in the case of the example of FIG. 18 is to be encoded, although images of the individual points of view are encoded, the methods described hereinabove in the description of the embodiments may be applied to the encoding of the images of the points of view. This can suppress deterioration of the picture quality by encoding in regard to the images of the points of view. In other words, also in the case of the multi-view image, deterioration of the picture quality by encoding can be suppressed similarly.

<Multi-View Image Encoding Device and Decoding Device>

Figure 19:
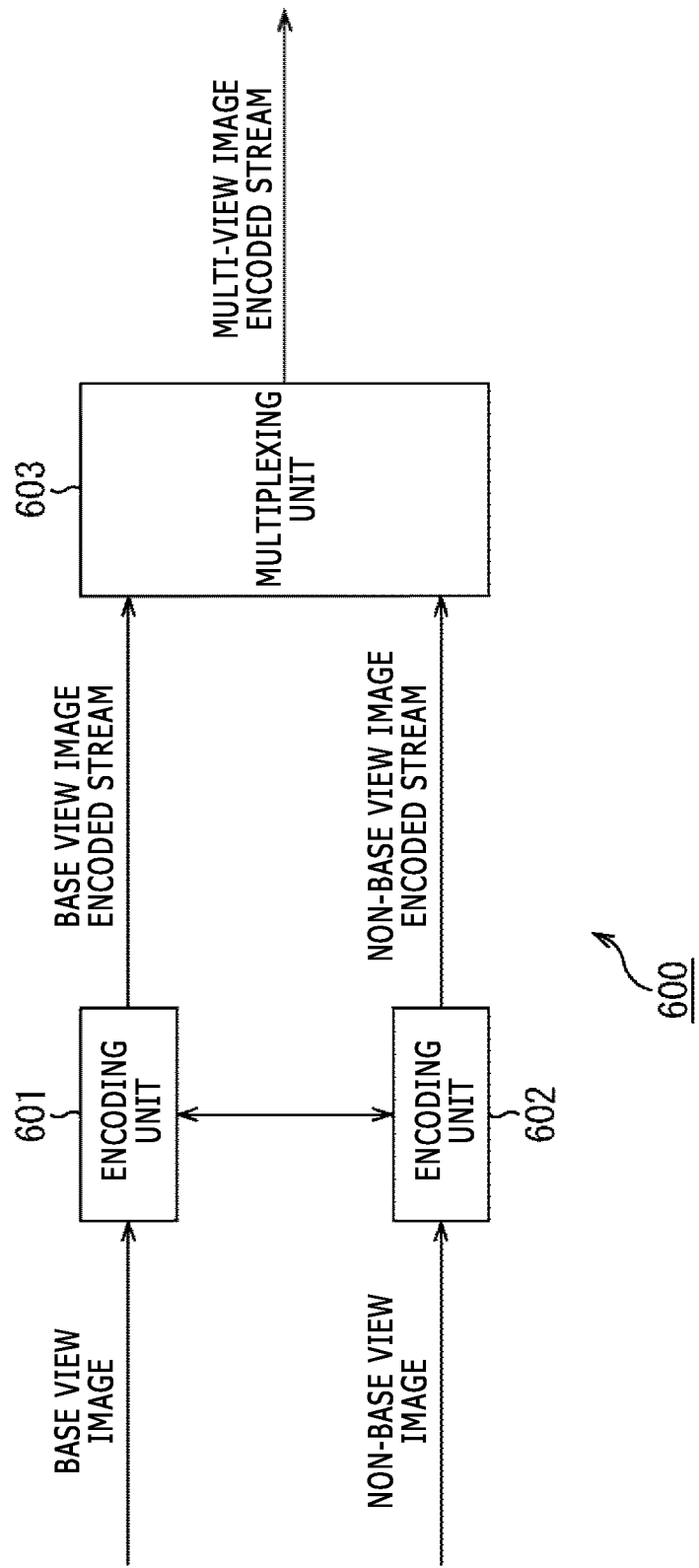
FIG. 19 is a view depicting an example of a principal configuration of a multi-view image encoding device to which the present technology is applied.

FIG. 19 is a view depicting an example of a principle configuration of a multi-view image encoding device that performs the multi-view image encoding described above. As depicted in FIG. 19, the multi-view image encoding device 600 includes an encoding unit 601, another encoding unit 602 and a multiplexing unit 603.

The encoding unit 601 encodes a base view image to generate a base view image encoded stream. The encoding unit 602 encodes a non-base view image to generate a non-base view image encoded stream. The multiplexing unit 603 multiplexes the base view image encoded stream generated by the encoding unit 601 and the non-base view image encoded stream generated by the encoding unit 602 to generate a multi-view image encoded stream.

Figure 20:
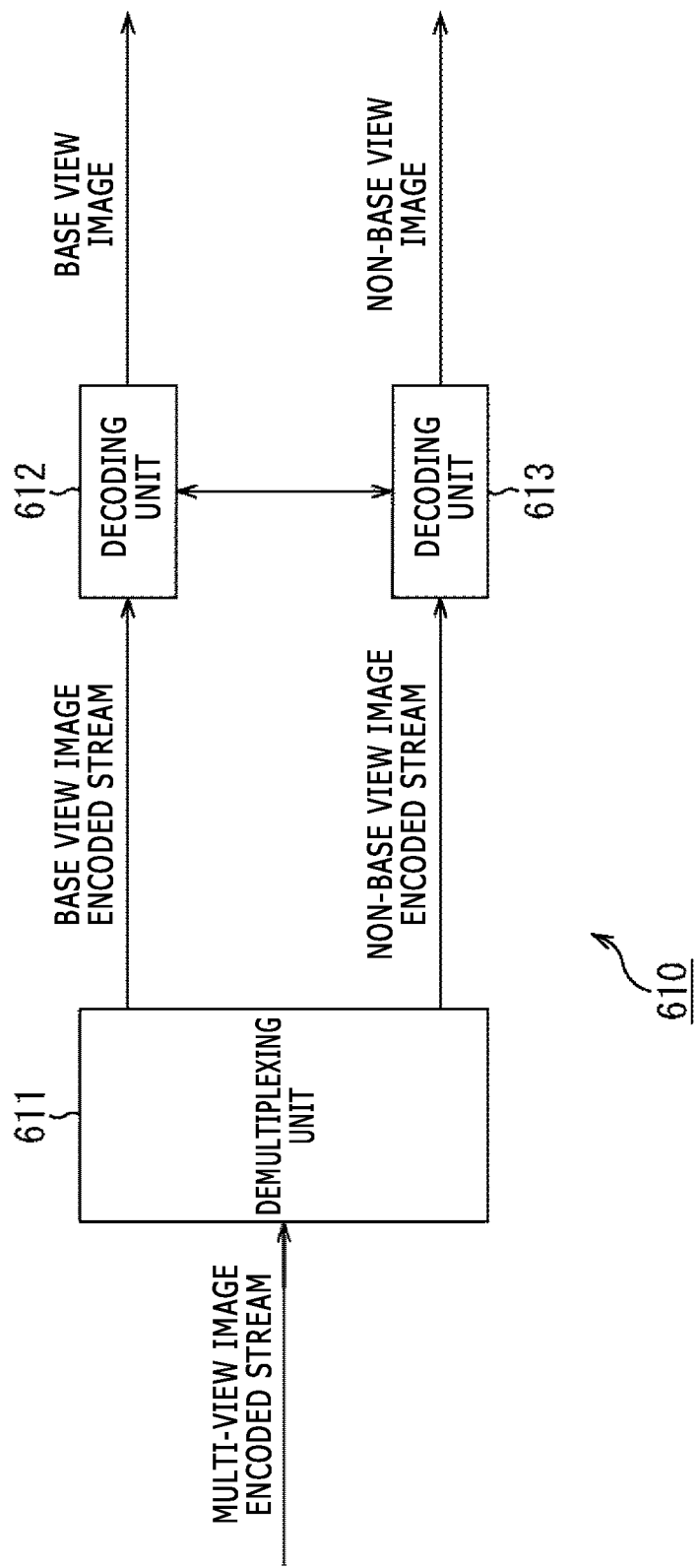
FIG. 20 is a view depicting an example of a principal configuration of a multi-view image decoding device to which the present technology is applied.

FIG. 20 is a view depicting an example of a principal configuration of a multi-view image decoding device corresponding to the multi-view image encoding device 600. In the example of FIG. 20, the multi-view image decoding device 610 includes a demultiplexing unit 611, a decoding unit 612 and another decoding unit 613.

The demultiplexing unit 611 demultiplexes a multi-view image encoded stream, in which a base view image encoded stream and a non-base view image encoded stream are multiplexed, to extract the base view image encoded stream and the non-base view image encoded stream. The decoding unit 612 decodes the base view image encoded stream extracted by the demultiplexing unit 611 to obtain a base view image. The decoding unit 613 decodes the non-base view image encoded stream extracted by the demultiplexing unit 611 to obtain a non-base view image.

It is assumed that, for example, each of the encoding units of the multi-view image encoding device 600 lossy encodes image data to be used as a reference image and stores resulting image data as encoded data into the frame memory and, when the reference image is to be utilized, the encoded data is read out from the frame memory and lossy decoded. In contrast, it is assumed that each of the decoding units of the multi-view image decoding device 610 stores image data to be used as a reference image into the frame memory without encoding the image data and reads out, when the reference image is to be utilized, the image data from the frame memory.

In such a case as described above, there is the possibility that orthogonal transformation coefficients generated for the compensation for errors of lossy encoding of image data of a reference image in encoding by the multi-view image encoding device 600 may be accumulated in decoding by the multi-view image decoding device 610 that does not perform lossy encoding of the image data of the reference image, resulting in deterioration of the picture quality of the decoded image as described hereinabove.

Therefore, the image encoding device 100 described hereinabove is applied as the encoding unit 601 and the encoding unit 602 of such a multi-view image encoding device 600 as described above. This makes it possible to apply the method described above also to encoding of a multi-view image. In other words, the multi-view image encoding device 600 can suppress deterioration of the picture quality by encoding of a multi-view image.

4. Fourth Embodiment

<Application to Hierarchical Image Encoding and Hierarchical Image Decoding>

Further, the series of processes described hereinabove can be applied to hierarchical image encoding and hierarchical image decoding (scalable encoding and scalable decoding). FIG. 21 illustrates an example of a hierarchical image encoding method.

The hierarchical image encoding (scalable encoding) divides (hierarchizes) images into multiple layers such that image data has a scalability function with regard to a predetermined parameter and encodes the image data for each layer. The hierarchical image decoding (scalable decoding) is decoding corresponding to the hierarchical image encoding.

As illustrated in FIG. 21, in hierarchization of an image, one image is divided into a plurality of images (layers) using a predetermined parameter having a scalability function as a reference. In particular, a hierarchized image (hierarchical image) includes images of a plurality of hierarchies (layers) that are different in value of the predetermined parameter from each other. The plurality of layers of the hierarchical image are configured from a base layer whose encoding and decoding are performed using only an image of the own layer without utilizing an image of any other layer and a non-base layer (also called enhancement layer) whose encoding and decoding are performed using an image of a different layer. The non-base layer may utilize an image of the base layer or may utilize an image of a different non-base layer.

Generally, the non-base layer is configured from data of a difference image between an image of the own layer and an image of a different layer (difference data) so as to reduce the redundancy. For example, where one image is divided into two hierarchies including a base layer and a non-base layer (also called enhancement layer), an image of lower picture quality than that of an original image is obtained only from data of the base layer, and the original image (namely, an image of high quality) is obtained by synthesizing data of the base layer and data of the non-base layer.

By hierarchizing an image in this manner, images having a variety of quality can be obtained easily in response to a situation. Image compression information according to the capacity of a terminal or a network can be transmitted from a server without performing a transcode process such that, for a terminal having low processing capacity such as, for example, a portable telephone set, image compression information only of the base layer is transmitted such that a moving image having a low space time resolution or having low picture quality is reproduced, but for a terminal having high processing capacity such as a television set or a personal computer, image compression information not only of the base layer but also of the enhancement layer is transmitted such that a moving image having a high space time resolution or having high picture quality is reproduced.

When a hierarchical image like the example of FIG. 21 is to be encoded, images of the layers are encoded, and to encoding for each layer, the methods described hereinabove in connection with the embodiments may be applied. This makes it possible to suppress deterioration of picture quality of the images of the layers by encoding. In short, also in the case of a hierarchical image, deterioration of the picture quality by encoding can be suppressed similarly.

<Scalable Parameter>

In such hierarchical image encoding and hierarchical image decoding (scalable encoding and scalable decoding) as described above, the parameter having a scalability function is arbitrary. For example, the space resolution may be used as the parameter (spatial scalability). Alternatively, for example, the time resolution may be applied (temporal scalability). Furthermore, for example, the SNR (Signal to Noise Ratio) may be applied (SNR scalability). Alternatively, for example, the bit depth may be applied (bit-depth scalability). Furthermore, for example, a chroma format may be applied (chroma scalability).

<Hierarchical Image Encoding Device and Decoding Device>

Figure 22:
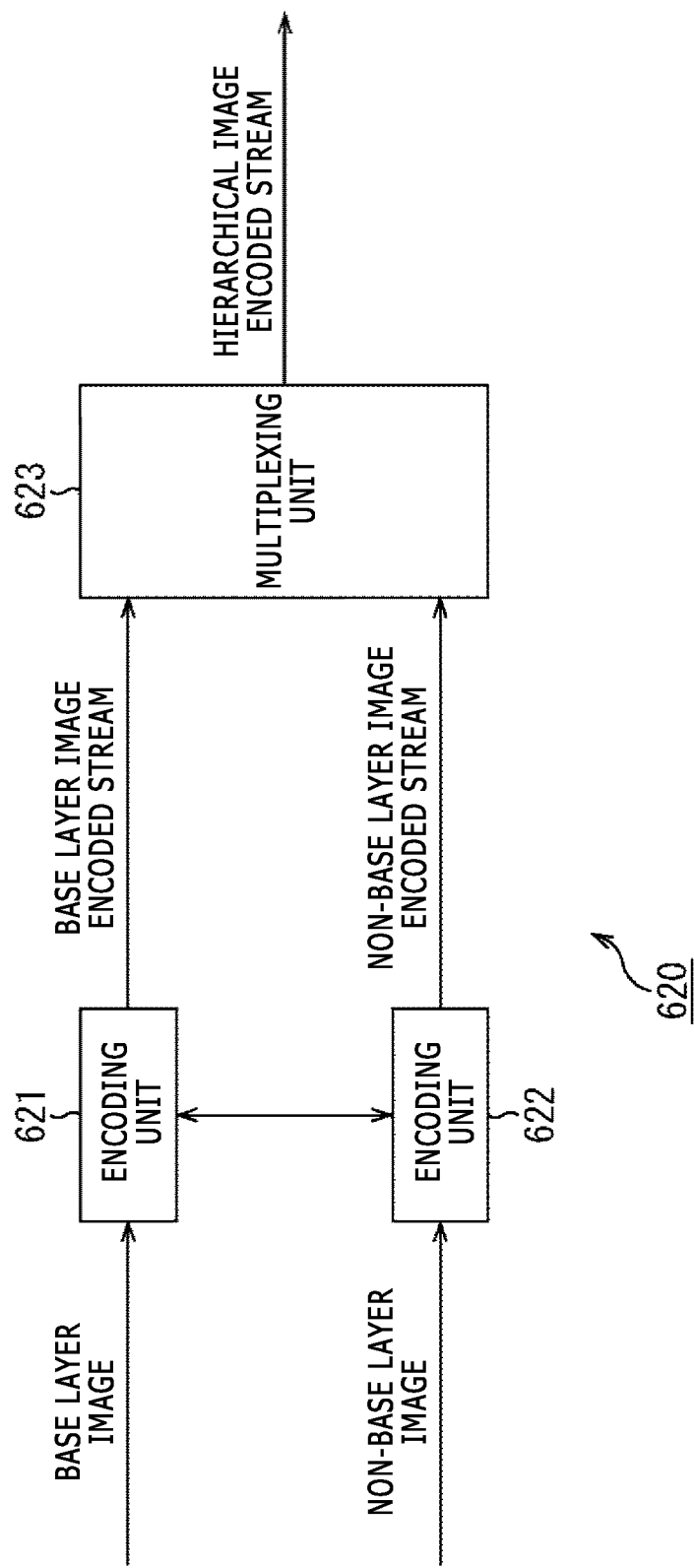
FIG. 22 is a view depicting an example of a principal configuration of a hierarchical image encoding device to which the present technology is applied.

FIG. 22 is a view depicting an example of a principal configuration of a hierarchical image encoding device that performs the hierarchical image encoding described above. As depicted in FIG. 22, the hierarchical image encoding device 620 includes an encoding unit 621, another encoding unit 622 and a multiplexing unit 623.

The encoding unit 621 encodes a base layer image to generate a base layer image encoded stream. The encoding unit 622 encodes a non-base layer image to generate a non-base layer image encoded stream. The multiplexing unit 623 multiplexes the base layer image encoded stream generated by the encoding unit 621 and the non-base layer image encoded stream generated by the encoding unit 622 to generate a hierarchical image encoded stream.

Figure 23:
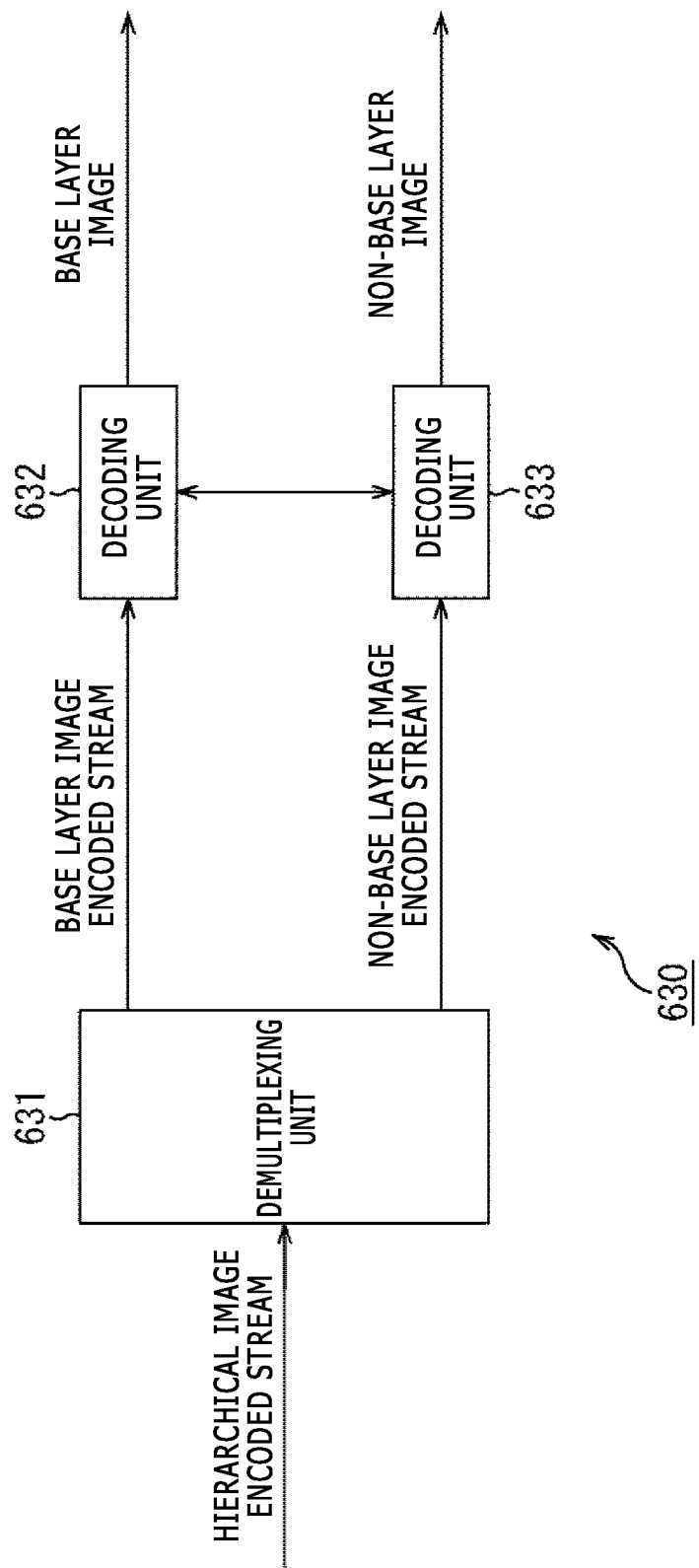
FIG. 23 is a view depicting an example of a principal configuration of a hierarchical image decoding device to which the present technology is applied.

FIG. 23 is a view depicting an example of a principal configuration of a hierarchical image decoding device corresponding to the hierarchical image encoding device 620. As depicted in FIG. 23, the hierarchical image decoding device 630 includes a demultiplexing unit 631, a decoding unit 632 and another decoding unit 633.

The demultiplexing unit 631 demultiplexes a hierarchical image encoded stream, in which a base layer image encoded stream and a non-base layer image encoded stream are multiplexed, to extract the base layer image encoded stream and the non-base layer image encoded stream. The decoding unit 632 decodes the base layer image encoded stream extracted by the demultiplexing unit 631 to obtain a base layer image. The decoding unit 633 decodes the non-base layer image encoded stream extracted by the demultiplexing unit 631 to obtain a non-base layer image.

It is assumed that, for example, each of the encoding units of the hierarchical image encoding device 620 lossy encodes image data to be used as a reference image and stores resulting image data as encoded data into the frame memory and, when the reference image is to be utilized, reads out the encoded data from the frame memory and lossy decodes the read out data. In contrast, it is assumed that each of the decoding units of the hierarchical image decoding device 630 stores image data to be used as a reference image into the frame memory without encoding the image data and, when the reference image is to be utilized, reads out the image data from the frame memory.

In such a case as described above, there is the possibility that orthogonal transformation coefficients that are generated for the compensation for errors in lossy encoding of image data of a reference image in encoding by the hierarchical image encoding device 620 may be accumulated by decoding by the hierarchical image decoding device 630 that does not perform lossy encoding of the image data of the reference image, resulting in deterioration of the picture quality of the decoded image as described hereinabove.

Therefore, the image encoding device 100 described hereinabove is applied as the encoding unit 621 and the encoding unit 622 of such a hierarchical image encoding device 620 as described hereinabove. This makes it possible to apply the methods described hereinabove also to encoding of a hierarchical image. In other words, the hierarchical image encoding device 620 can suppress deterioration of the picture quality by encoding of a hierarchical image.

5. Fifth Embodiment

<Computer>

While the series of processes described above can be executed by hardware, it may otherwise be executed by software. Where the series of processes is executed by software, a program that constructs the software is installed into a computer. Here, the computer includes a computer incorporated in hardware for exclusive use, a personal computer for universal use that can execute various functions by installing various programs and so forth.

Figure 24:
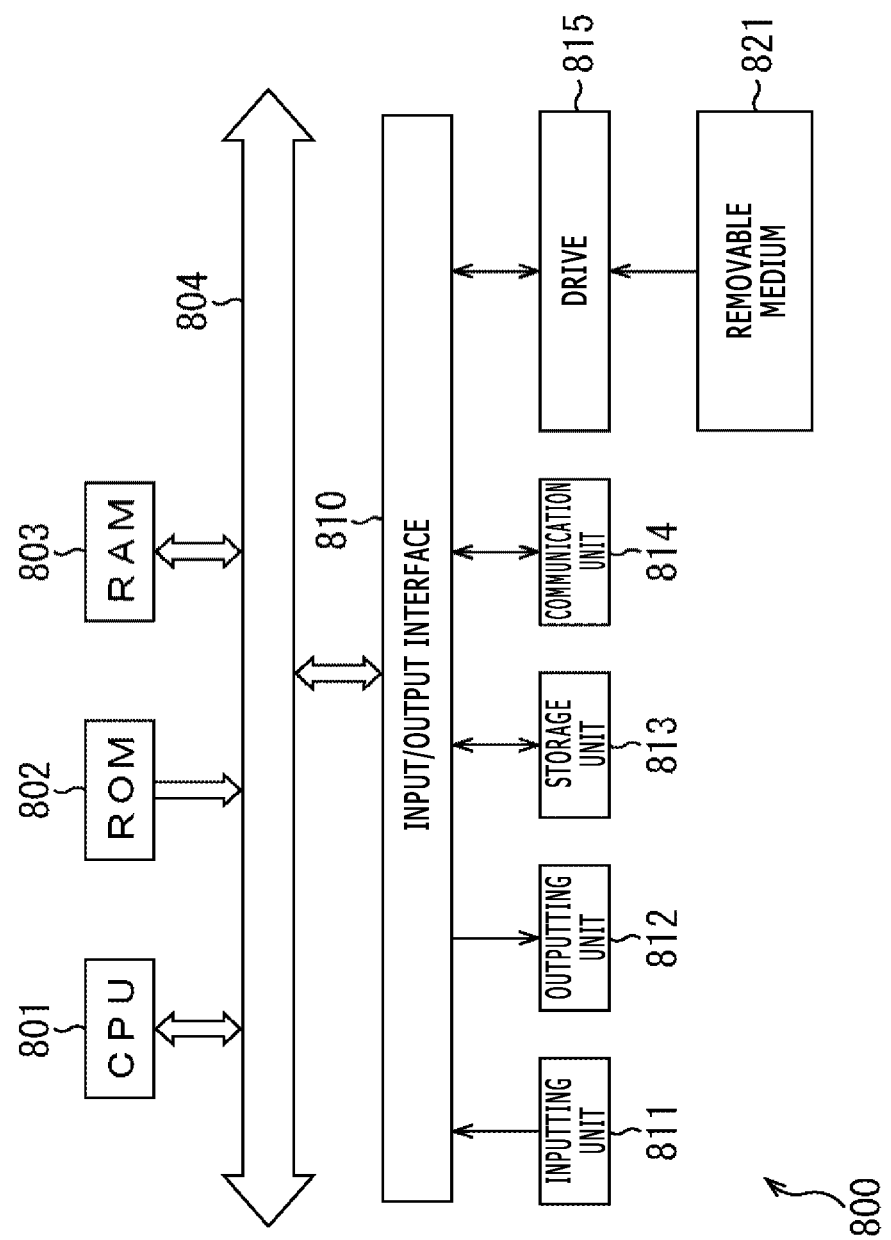
FIG. 24 is a block diagram depicting an example of a principal configuration of a computer.

FIG. 24 is a block diagram depicting an example of a configuration of hardware of a computer that executes the series of processes described above in accordance with a program.

In the computer 800 depicted in FIG. 24, a CPU 801, a ROM (Read Only Memory) 802 and a RAM (Random Access Memory) 803 are connected to each other by a bus 804.

To the bus 804, also an input/output interface 810 is connected. To the input/output interface 810, an inputting unit 811, an outputting unit 812, a storage unit 813, a communication unit 814 and a drive 815 are connected.

The inputting unit 811 is configured, for example, from a keyboard, a mouse, a microphone, a touch panel, an input terminal and so forth. The outputting unit 812 is configured, for example, from a display unit, a speaker, an output terminal and so forth. The storage unit 813 is configured, for example, from a hard disk, a RAM disk, a nonvolatile memory or the like. The communication unit 814 is configured, for example, from a network interface. The drive 815 drives a removable medium 821 such as a magnetic disk, an optical disk, a magneto-optical disk, a semiconductor memory or the like.

In the computer configured in such a manner as described above, the CPU 801 performs the series of processes described hereinabove by loading the program stored, for example, in the storage unit 813 into the RAM 803 through the input/output interface 810 and the bus 804 and executing the program. Into the RAM 803, also data and so forth necessary for the CPU 801 to execute various processes are stored suitably.

The program executed by the computer (CPU 801) can be recorded into and applied as the removable medium 821, for example, in the form of a package medium or the like. In this case, the program can be installed into the storage unit 813 through the input/output interface 810 by loading the removable medium 821 into the drive 815.

Further, it is possible to provide the program through a wire or wireless transmission medium such as a LAN (Local Area Network), the Internet or a digital satellite broadcast. In this case, the program can be received by the communication unit 814 and installed into the storage unit 813.

Also it is possible to install the program into the ROM 802 or the storage unit 813 in advance.

It is to be noted that the program to be executed by the computer may be a program in accordance with which processes are executed in a time series in accordance with the order described in the present specification or may be a program in accordance with which processes are otherwise executed in parallel or executed at a necessary timing such as a point of time at which the program is called or the like.

It is to be noted that, in the present specification, the steps that describe a program recorded in a recording medium not only include processes that are performed in a time series in accordance with the order described but also include processes that are executed in parallel or individually even if they are not necessarily be processed in a time series.

Further, in the present specification, the term system is used to signify an aggregation composed of a plurality of constituent elements (devices, modules (parts) and so forth) and it does not matter whether or not all of the constituent elements are accommodated in the same housing. Accordingly, a plurality of apparatus accommodated in separate housings and connected to each other through a network configure a system, and also one apparatus that includes a plurality of modules accommodated in a single housing configures a system.

Further, the configuration described as one apparatus (or processing unit) in the foregoing description may be divided so as to configure a plurality of apparatus (or processing units). Conversely, the configurations described as a plurality of apparatus (processing units) in the foregoing description may be put together so as to configure a single apparatus (or processing unit). Further, the apparatus (or processing units) may naturally include a configuration in addition to the configurations described hereinabove. Further, if a configuration or action of an entire system is substantially same, then some of the configurations of a certain apparatus (or processing unit) may be included in the configuration of some other apparatus (or some other processing unit).

While the preferred embodiments of the present disclosure have been described in detail with reference to the accompanying drawings, the technical scope of the present disclosure is not limited to the embodiments described above. It is apparent that those who have common knowledge in the technical field to which the present disclosure pertains could conceive various alterations or modifications without departing from the technical idea described in the claims, and it shall be interpreted that also such alterations and modifications naturally fall within the technical scope of the present disclosure.

For example, the present technology can assume a configuration for cloud computing in which one function is shared by a plurality of apparatus through a network and processed in collaboration.

Further, the steps described hereinabove in connection with the flow charts can be executed by a single apparatus or can be executed by sharing by a plurality of apparatus.

Further, where one step includes a plurality of processes, the plurality of processes included in the one step can be executed by a single apparatus and also can be executed by sharing by a plurality of apparatus.

The image encoding devices and the image decoding devices according to the embodiments described hereinabove can be applied to various electronic equipment such as, for example, a transmitter or a receiver in distribution through a satellite broadcast, a cable broadcast of a cable TV (Television) or the like or the Internet, in distribution to a terminal by cellular communication or the like, a recording apparatus for recording an image on a medium such as an optical disk, a magnetic disk, a flash memory or the like, a reproduction apparatus for reproducing an image from such recording media, or the like. In the following, four applications are described.

6. Sixth Embodiment

<First Application: Television Receiver>

Figure 25:
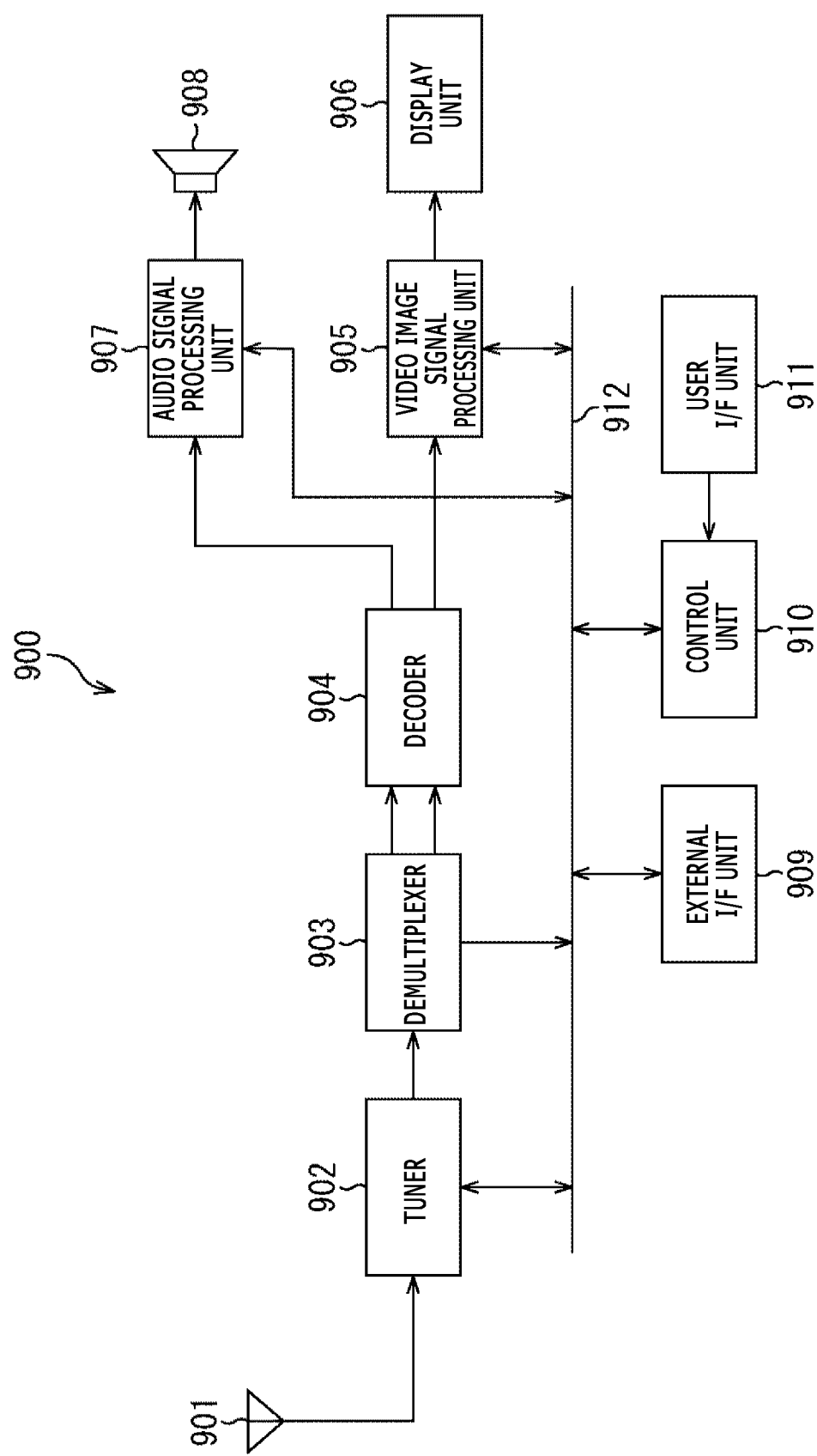
FIG. 25 is a block diagram depicting an example of a general configuration of a television apparatus.

FIG. 25 depicts an example of a general configuration of a television apparatus to which any of the embodiments described above is applied. The television apparatus 900 includes an antenna 901, a tuner 902, a demultiplexer 903, a decoder 904, a video image signal processing unit 905, a display unit 906, an audio signal processing unit 907, a speaker 908, an external interface (I/F) unit 909, a control unit 910, a user interface (I/F) unit 911, and a bus 912.

The tuner 902 extracts a signal of a desired channel from among broadcasting signals received through the antenna 901 and demodulates the extracted signal. Then, the tuner 902 outputs an encoded bit stream obtained by the demodulation to the demultiplexer 903. In particular, the tuner 902 has a role as a transmission unit in the television apparatus 900 by which an encoded stream in which an image is encoded is received.

The demultiplexer 903 demultiplexes a video image stream and an audio stream of a program of a viewing target from within the encoded bit stream and outputs the demultiplexed streams to the decoder 904. Further, the demultiplexer 903 extracts auxiliary data such as an EPG (Electronic Program Guide) or the like from within the encoded bit stream and supplies the extracted data to the control unit 910. It is to be noted that, where the encoded bit stream is in a scrambled state, the demultiplexer 903 may perform descrambling.

The decoder 904 decodes the video image stream and the audio stream inputted from the demultiplexer 903. Then, the decoder 904 outputs video image data generated by the decoding process to the video image signal processing unit 905. Further, the decoder 904 outputs audio data generated by the decoding process to the audio signal processing unit 907.

The video image signal processing unit 905 reproduces the video image data inputted from the decoder 904 and causes the display unit 906 to display a video image. Further, the video image signal processing unit 905 may cause the display unit 906 to display an application screen image supplied through a network. Further, the video image signal processing unit 905 may perform an additional process such as, for example, noise removal from the video image data or the like in response to a setting. Furthermore, the video image signal processing unit 905 may generate, for example, an image of a GUI (Graphical User Interface) of a menu, a button, a cursor and so forth and cause the generated image to be superimposed on an output image.

The display unit 906 is driven by a driving signal supplied from the video image signal processing unit 905 and displays a video image or an image on a video image screen of display device (for example, a liquid crystal display device, a plasma display device, an OELD (Organic ElectroLuminescence Display) device or the like).

The audio signal processing unit 907 performs a reproduction process such as D/A (Digital-to-Analog) conversion, amplification or the like for audio data inputted from the decoder 904 and causes resulting sound to be outputted from the speaker 908. Further, the audio signal processing unit 907 may perform an additional process such as noise removal or the like for the audio data.

The external interface unit 909 is an interface for connecting the television apparatus 900 and an external apparatus or a network to each other. For example, a video image stream or an audio stream received through the external interface unit 909 may be decoded by the decoder 904. In other words, also the external interface unit 909 has a role as a transmission unit in the television apparatus 900 by which an encoded stream in which an image is encoded is received.

The control unit 910 is configured using a processor such as a CPU and a memory such as a RAM, a ROM and so forth. The memory stores a program to be executed by the CPU, program data, EPG data, data acquired through a network and so forth. The program stored in the memory is read in and executed, for example, upon activation of the television apparatus 900 by the CPU. By executing the program, the CPU controls action of the television apparatus 900, for example, in response to an operation signal inputted from the user interface unit 911.

The user interface unit 911 is connected to the control unit 910. The user interface unit 911 includes, for example, buttons and switches for allowing a user to operate the television apparatus 900, a reception unit for a remote control signal and so forth. The user interface unit 911 detects an operation by the user through the constituent elements to generate an operation signal and outputs the generated operation signal to the control unit 910.

The bus 912 connects the tuner 902, demultiplexer 903, decoder 904, video image signal processing unit 905, audio signal processing unit 907, external interface unit 909 and control unit 910 to each other.

In the television apparatus 900 configured in this manner, for example, the video image signal processing unit 905 may have functions of the image encoding device 100. In particular, the video image signal processing unit 905 may encode image data supplied from the decoder 904 by the method described hereinabove. The video image signal processing unit 905 can supply encoded data obtained by encoding thereby, for example, to the external interface unit 909 such that the encoded data is outputted from the external interface unit 909 to the outside of the television apparatus 900. Accordingly, the television apparatus 900 can suppress deterioration of the picture quality by encoding of an image that becomes a processing target.

<Second Application: Portable Telephone Set>

Figure 26:
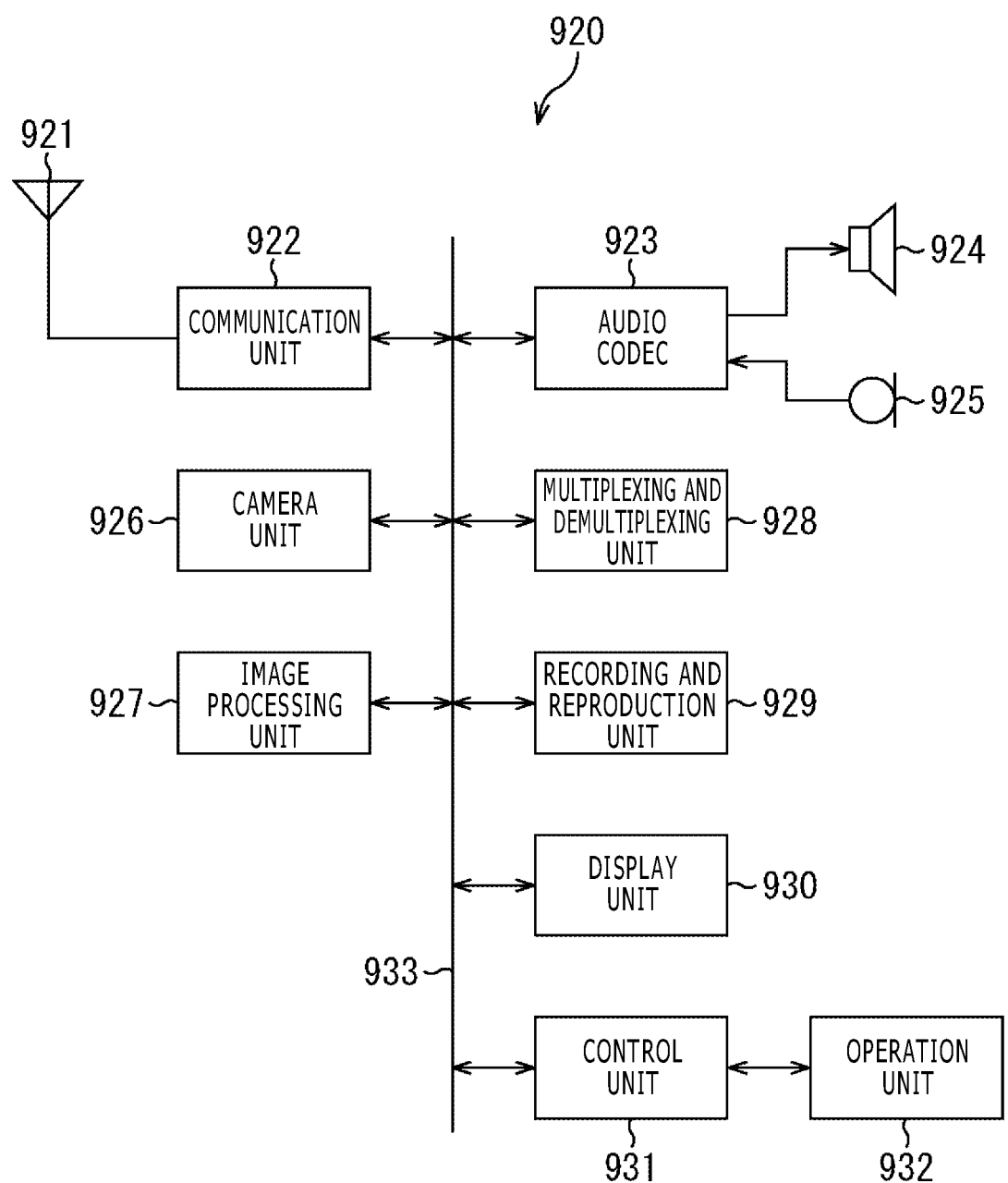
FIG. 26 is a block diagram depicting an example of a general configuration of a portable telephone set.

FIG. 26 depicts an example of a general configuration of a portable telephone set to which any of the embodiments described above is applied. The portable telephone set 920 includes an antenna 921, a communication unit 922, an audio codec 923, a speaker 924, a microphone 925, a camera unit 926, an image processing unit 927, a multiplexing and demultiplexing unit 928, a recording and reproduction unit 929, a display unit 930, a control unit 931, an operation unit 932, and a bus 933.

Further, the antenna 921 is connected to the communication unit 922. The speaker 924 and the microphone 925 are connected to the audio codec 923. The operation unit 932 is connected to the control unit 931. The bus 933 connects the communication unit 922, audio codec 923, camera unit 926, image processing unit 927, multiplexing and demultiplexing unit 928, recording and reproduction unit 929, display unit 930 and control unit 931 to each other.

The portable telephone set 920 performs various actions such as transmission and reception of an audio signal, transmission and reception of an electronic mail or image data, pickup of an image, recording of data and so forth in various action modes including a voice communication mode, a data communication mode, an image pickup mode and a video phone mode.

In the voice communication mode, an analog audio signal generated by the microphone 925 is supplied to the audio codec 923. The audio codec 923 converts the analog audio signal into audio data and A/D (Analog-to-Digital) converts and compresses the audio data obtained by the conversion. Then, the audio codec 923 outputs the audio data after the compression to the communication unit 922. The communication unit 922 encodes and modulates the audio data to generate a transmission signal. Then, the communication unit 922 transmits the generated transmission signal to a base station (not depicted) through the antenna 921. On the other hand, the communication unit 922 amplifies and frequency converts a wireless signal received through the antenna 921 to acquire a reception signal. Then, the communication unit 922 demodulates and decodes the reception signal to generate audio data and outputs the generated audio data to the audio codec 923. The audio codec 923 decompresses and D/A converts the audio data to generate an analog audio signal. Then, the audio codec 923 supplies the generated audio signal to the speaker 924 such that sound is outputted from the speaker 924.

On the other hand, in the data communication mode, for example, the control unit 931 generates character data that configures an electronic mail in response to an operation by the user through the operation unit 932. Further, the control unit 931 controls the display unit 930 to display characters. Further, the control unit 931 generates electronic mail data in response to a transmission instruction from the user through the operation unit 932 and outputs the generated electronic mail data to the communication unit 922. The communication unit 922 encodes and modulates the electronic mail data to generate a transmission signal. Then, the communication unit 922 transmits the generated transmission signal to the base station (not depicted) through the antenna 921. On the other hand, the communication unit 922 amplifies and frequency converts a wireless signal received through the antenna 921 to acquire a reception signal. Then, the communication unit 922 demodulates and decodes the reception signal to restore the electronic mail data and outputs the restored electronic mail data to the control unit 931. The control unit 931 controls the display unit 930 to display the substance of the electronic mail and supplies the electronic mail data to the recording and reproduction unit 929 so as to be written into its storage medium.

The recording and reproduction unit 929 has an arbitrary readable/writable storage medium. For example, the storage medium may be a built-in storage medium such as a RAM, a flash memory or the like, or may be an externally mounted storage medium such as a hard disk, a magnetic disk, a magneto-optical disk, an optical disk, a USB (Universal Serial Bus) memory, a memory card or the like.

Further, in the image pickup mode, for example, the camera unit 926 picks up an image of an image pickup object to generate image data and outputs the generated image data to the image processing unit 927. The image processing unit 927 encodes the image data inputted from the camera unit 926 and supplies an encoded stream to the recording and reproduction unit 929 so as to be written into the storage medium of the same.

Further, in an image display mode, the recording and reproduction unit 929 reads out an encoded stream recorded on a storage medium and outputs the encoded stream to the image processing unit 927. The image processing unit 927 decodes the encoded stream inputted from the recording and reproduction unit 929 and supplies image data to the display unit 930 such that an image of the image data is displayed on the display unit 930.

Further, in the video phone mode, for example, the multiplexing and demultiplexing unit 928 multiplexes a video image stream encoded by the image processing unit 927 and an audio stream inputted from the audio codec 923 and outputs the multiplexed stream to the communication unit 922. The communication unit 922 encodes and modulates the stream to generate a transmission signal. Then, the communication unit 922 transmits the generated transmission signal to the base station (not depicted) through the antenna 921. Further, the communication unit 922 amplifies and frequency converts a wireless signal received through the antenna 921 to acquire a reception signal. The transmission signal and the reception signal can include the encoded bit stream. Then, the communication unit 922 demodulates and decodes the reception signal to restore the stream and outputs the restored stream to the multiplexing and demultiplexing unit 928. The multiplexing and demultiplexing unit 928 demultiplexes the video image stream and the audio stream from the inputted stream, and outputs the video image stream and the audio stream to the image processing unit 927 and the audio codec 923, respectively. The image processing unit 927 decodes the video image stream to generate video image data. The video image data is supplied to the display unit 930 such that a series of images are displayed by the display unit 930. The audio codec 923 decompresses and D/A converts the audio stream to generate an analog audio signal. Then, the audio codec 923 supplies the generated audio signal to the speaker 924 such that sound is outputted from the speaker 924.

In the portable telephone set 920 configured in this manner, for example, the image processing unit 927 may have functions of the image encoding device 100. In other words, the image processing unit 927 may encode image data by the method described above. By the configuration, the portable telephone set 920 can suppress deterioration of the picture quality by encoding of an image that becomes a processing target.

<Third Application: Recording and Reproduction Apparatus>

Figure 27:
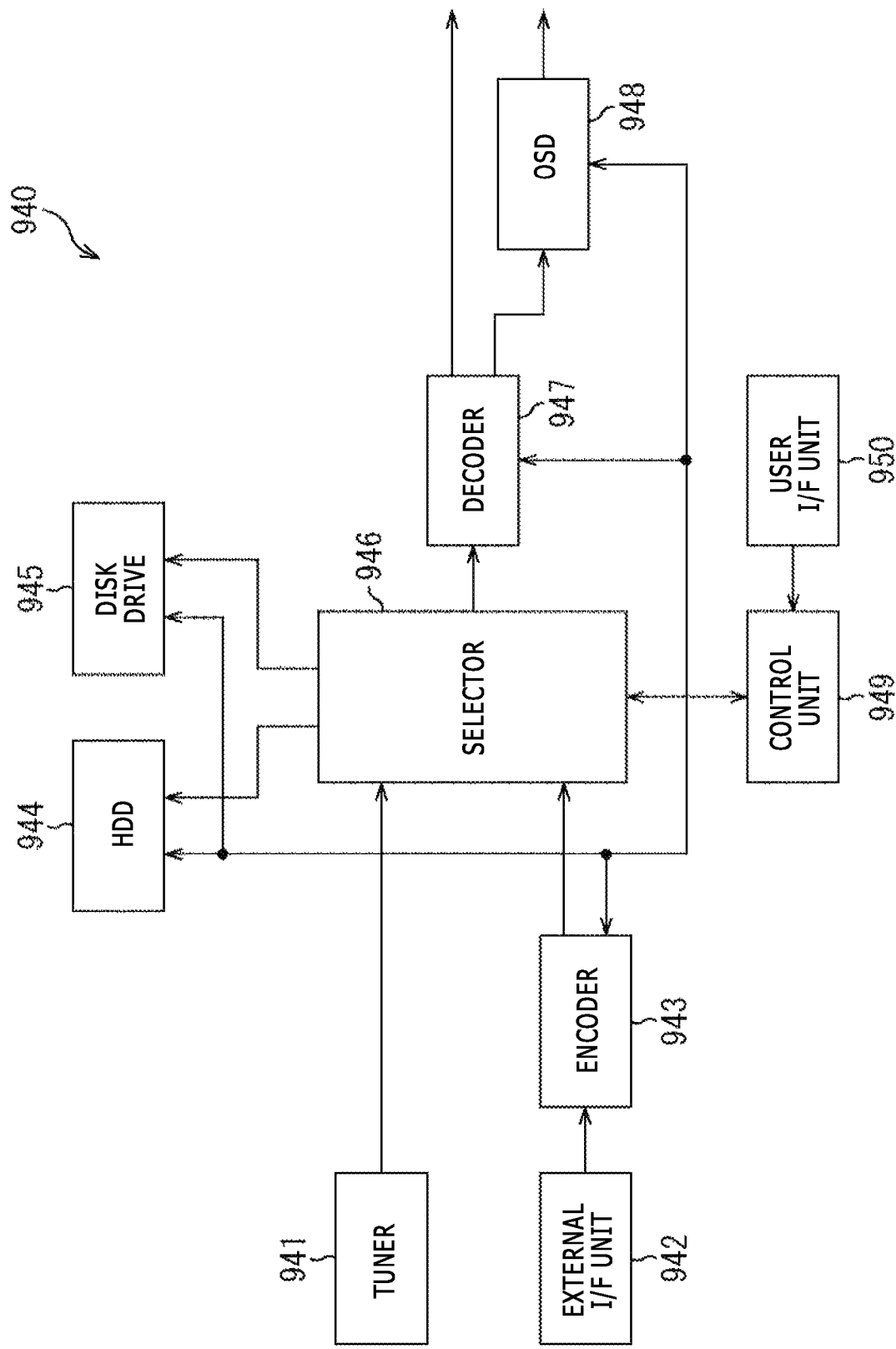
FIG. 27 is a block diagram depicting an example of a general configuration of a recording and reproduction apparatus.

FIG. 27 depicts an example of a general configuration of a recording and reproduction apparatus to which any of the embodiments described above is applied. The recording and reproduction apparatus 940 encodes, for example, audio data and video image data of a received broadcasting program and records the encoded data into a recording medium. Further, the recording and reproduction apparatus 940 may encode, for example, audio data and video image data acquired from a different apparatus and record the encoded data into a recording medium. Further, the recording and reproduction apparatus 940 reproduces data recorded in a recording medium on a monitor and a speaker, for example, in response to an instruction of a user. At this time, the recording and reproduction apparatus 940 decodes the audio data and the video image data.

The recording and reproduction apparatus 940 includes a tuner 941, an external interface (I/F) unit 942, an encoder 943, an HDD (Hard Disk Drive) 944, a disk drive 945, a selector 946, a decoder 947, an OSD (On-Screen Display) 948, a control unit 949 and a user interface (I/F) unit 950.

The tuner 941 extracts a signal of a desired channel from among broadcasting signals received through an antenna (not depicted) and demodulates the extracted signal. Then, the tuner 941 outputs an encoded bit stream obtained by the demodulation to the selector 946. In particular, the tuner 941 has a role as a transmission unit in the recording and reproduction apparatus 940.

The external interface unit 942 is an interface for connecting the recording and reproduction apparatus 940 and an external apparatus or a network to each other. The external interface unit 942 may be, for example, an IEEE (Institute of Electrical and Electronic Engineers) 1394 interface, a network interface, a USB interface, a flash memory interface or the like. For example, video image data and audio data received through the external interface unit 942 are inputted to the encoder 943. In particular, the external interface unit 942 has a role as a transmission unit in the recording and reproduction apparatus 940.

The encoder 943 encodes, when video image data and audio data inputted thereto from the external interface unit 942 are not in an encoded form, the video image data and the audio data. Then, the encoder 943 outputs an encoded bit stream to the selector 946.

The HDD 944 records an encoded bit stream in which content data of a video image, an audio and so forth are compressed, various programs and other data on an internal hard disk. Further, the HDD 944 reads out, upon reproduction of a video image and an audio, those data from the hard disk.

The disk drive 945 performs recording and reading out of data on and from a recording medium mounted thereon. The recording medium to be mounted on the disk drive 945 may be, for example, a DVD (Digital Versatile Disc) (DVD-Video, DVD-RAM, DVD-R (DVD-Recordable), DVD-RW (DVD-Rewritable), DVD+R (DVD+Recordable), DVD+RW (DVD+Rewritable) or the like), a Blu-ray (registered trademark) disk or the like.

Upon recording of a video image and an audio, the selector 946 selects an encoded bit stream inputted from the tuner 941 or the encoder 943 and outputs the selected encoded bit stream to the HDD 944 or the disk drive 945. On the other hand, upon reproduction of a video image and an audio, the selector 946 outputs the encoded bit stream inputted from the HDD 944 or the disk drive 945 to the decoder 947.

The decoder 947 decodes the encoded bit stream to generate video image data and audio data. Then, the decoder 947 outputs the generated video image data to the OSD 948. Meanwhile, the decoder 947 outputs the generated audio data to an external speaker.

The OSD 948 reproduces video image data inputted from the decoder 947 and displays a video image. Further, the OSD 948 may superimpose, for example, an image of a GUI of a menu, buttons, a cursor or the like on the video image to be displayed.

The control unit 949 includes a processor such as a CPU or the like and a memory such as a RAM and a ROM. The memory stores a program to be executed by the CPU, program data and so forth. The program stored in the memory is read in and executed by the CPU, for example, upon activation of the recording and reproduction apparatus 940. By executing the program, the CPU controls action of the recording and reproduction apparatus 940, for example, in response to an operation signal inputted from the user interface unit 950.

The user interface unit 950 is connected to the control unit 949. The user interface unit 950 includes, for example, buttons and switches for allowing the user to operate the recording and reproduction apparatus 940, a reception unit for a remote control signal and so forth. The user interface unit 950 detects an operation by the user through the constituent elements to generate an operation signal and outputs the generated operation signal to the control unit 949.

In the recording and reproduction apparatus 940 configured in this manner, the encoder 943 may have functions of the image encoding device 100. In other words, the encoder 943 may encode image data by the method described hereinabove. This makes it possible for the recording and reproduction apparatus 940 to suppress deterioration of the picture quality by encoding of an image that becomes a processing target.

<Fourth Application: Image Pickup Apparatus>

Figure 28:
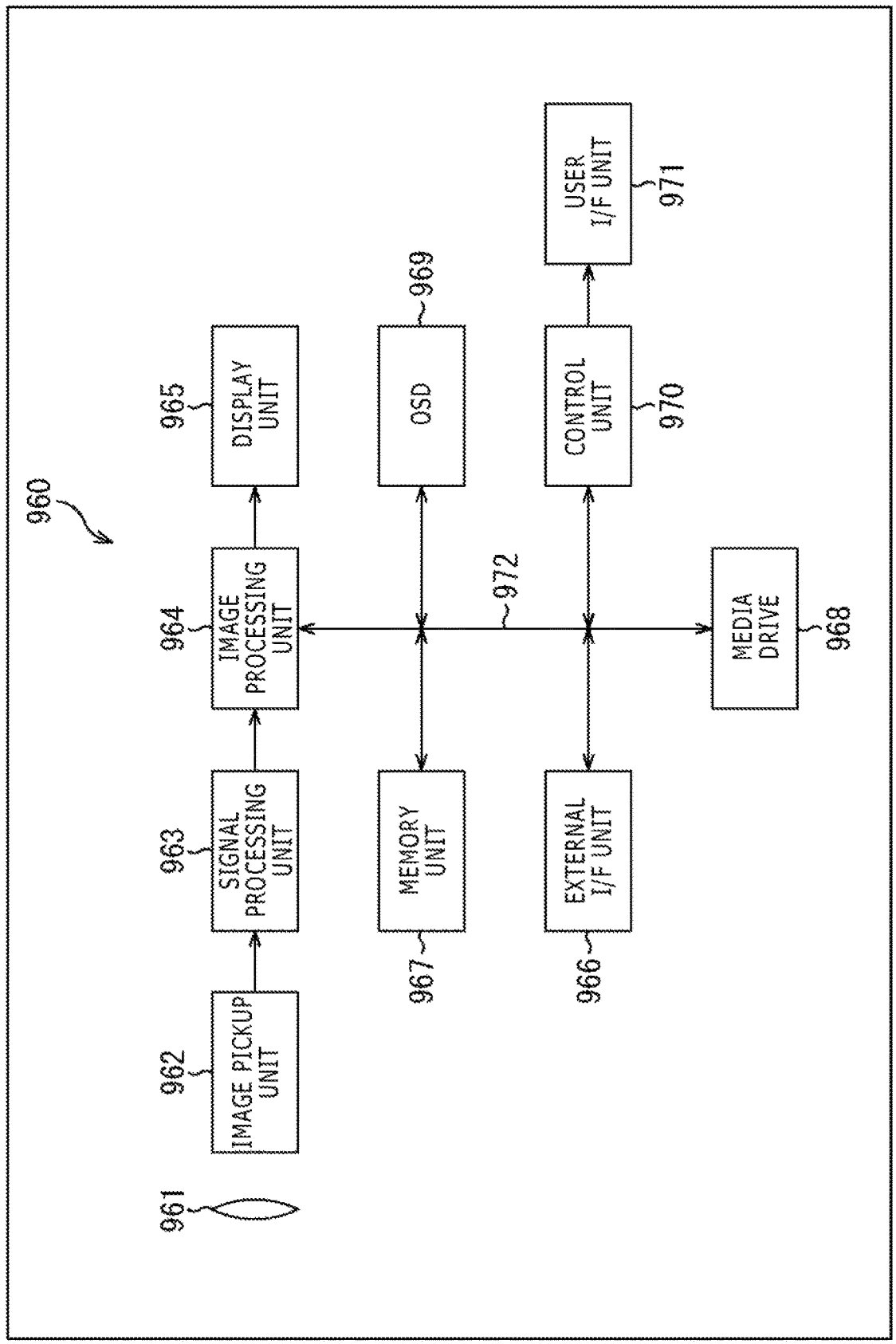
FIG. 28 is a block diagram depicting an example of a general configuration of an image pickup apparatus.

FIG. 28 depicts an example of a general configuration of an image pickup apparatus to which any one of the embodiments described above is applied. The image pickup apparatus 960 picks up an image of an image pickup object to generate an image, encodes image data and records the encoded image data into a recording medium.

The image pickup apparatus 960 includes an optical block 961, an image pickup unit 962, a signal processing unit 963, an image processing unit 964, a display unit 965, an external interface (I/F) unit 966, a memory unit 967, a media drive 968, an OSD 969, a control unit 970, a user interface (I/F) unit 971, and a bus 972.

The optical block 961 is connected to the image pickup unit 962. The image pickup unit 962 is connected to the signal processing unit 963. The display unit 965 is connected to the image processing unit 964. The user interface unit 971 is connected to the control unit 970. The bus 972 connects the image processing unit 964, external interface unit 966, memory unit 967, media drive 968, OSD 969 and control unit 970 to each other.

The optical block 961 includes a focus lens, a diaphragm mechanism and so forth. The optical block 961 forms an optical image of an image pickup object on an image pickup plane of the image pickup unit 962. The image pickup unit 962 includes an image sensor such as a CCD (Charge Coupled Device) or CMOS (Complementary Metal Oxide Semiconductor) image sensor or the like, and converts an optical image formed on the image pickup plane into an image signal as an electric signal by photoelectric conversion. Then, the image pickup unit 962 outputs the image signal to the signal processing unit 963.

The signal processing unit 963 performs various camera signal processes such as knee correction, gamma correction, color correction and so forth for the image signal inputted thereto from the image pickup unit 962. The signal processing unit 963 outputs the image data after the camera signal processes to the image processing unit 964.

The image processing unit 964 encodes the image data inputted from the signal processing unit 963 to generate encoded data. Then, the image processing unit 964 outputs the generated encoded data to the external interface unit 966 or the media drive 968. Further, the image processing unit 964 decodes encoded data inputted from the external interface unit 966 or the media drive 968 to generate image data. Then, the image processing unit 964 outputs the generated image data to the display unit 965. Further, the image processing unit 964 may output image data inputted from the signal processing unit 963 to the display unit 965 such that an image is displayed on the display unit 965. Further, the image processing unit 964 may superimpose displaying data acquired from the OSD 969 on an image to be outputted to the display unit 965.

The OSD 969 generates, for example, an image of a GUI of a menu, buttons, a cursor and so forth and outputs the generated image to the image processing unit 964.

The external interface unit 966 is configured, for example, as USB input/output terminals. The external interface unit 966 connects the image pickup apparatus 960 and a printer to each other, for example, upon printing of an image. Further, as occasion demands, a drive is connected to the external interface unit 966. A removable medium such as, for example, a magnetic disk, an optical disk or the like is mounted on the drive, and a program read out from the removable medium can be installed into the image pickup apparatus 960. Furthermore, the external interface unit 966 may be configured as a network interface to be connected to a network such as a LAN, the Internet or the like. In short, the external interface unit 966 has a role as a transmission unit of the image pickup apparatus 960.

The recording medium that can be mounted on the media drive 968 may be an arbitrary readable/writable removable medium such as, for example, a magnetic disk, a magneto-optical disk, an optical disk, a semiconductor memory or the like. Further, the recording medium may be fixedly mounted on the media drive 968 such that a non-portable storage unit like, for example, a built-in hard disk drive or an SSD (Solid State Drive) is configured.

The control unit 970 includes a processor such as a CPU or the like and a memory such as a RAM and a ROM. The memory stores a program to be executed by the CPU, program data and so forth. The program stored in the memory is read in and executed by the CPU, for example, upon activation of the image pickup apparatus 960. By executing the program, the CPU controls action of the image pickup apparatus 960, for example, in response to an operation signal inputted from the user interface unit 971.

The user interface unit 971 is connected to the control unit 970. The user interface unit 971 includes, for example, buttons, switches and so forth for allowing the user to operate the image pickup apparatus 960. The user interface unit 971 detects an operation by the user through the constituent elements mentioned above to generate an operation signal and outputs the generated operation signal to the control unit 970.

In the image pickup apparatus 960 configured in this manner, the image processing unit 964 may have functions of the image encoding device 100. In other words, the image processing unit 964 may encode image data by the method described hereinabove. This makes it possible for the image pickup apparatus 960 to suppress deterioration of the picture quality by encoding of an image that becomes a processing target.

It is to be noted that, in the present technology, appropriate encoded data is selected and used in a unit of a segment from among a plurality of encoded data prepared in advance which are different from each other in resolutions and so forth. For example, the present technology can be applied also to HTTP (Hyper Text Transfer Protocol) streaming such as, for example, that of MPEG-DASH (MPEG-Dynamic Adaptive Streaming over HTTP) or the like. In other words, information relating to encoding or decoding can be shared among such a plurality of encoded data as described above.

7. Seventh Embodiment

<Different Embodiment>

While examples of an apparatus, a system and so forth to which the present technology is applied are described above, the present technology is not limited to this but can be carried out also as any component to be incorporated in such an apparatus as described above or an apparatus that configures a system, for example, as a processor as a system LSI or the like, a module that uses a plurality of processors or the like, a unit that uses a plurality of modules or the like, a set in which a different function is added to a unit and so forth (namely, as part of components of an apparatus).

<Video Set>

Figure 29:
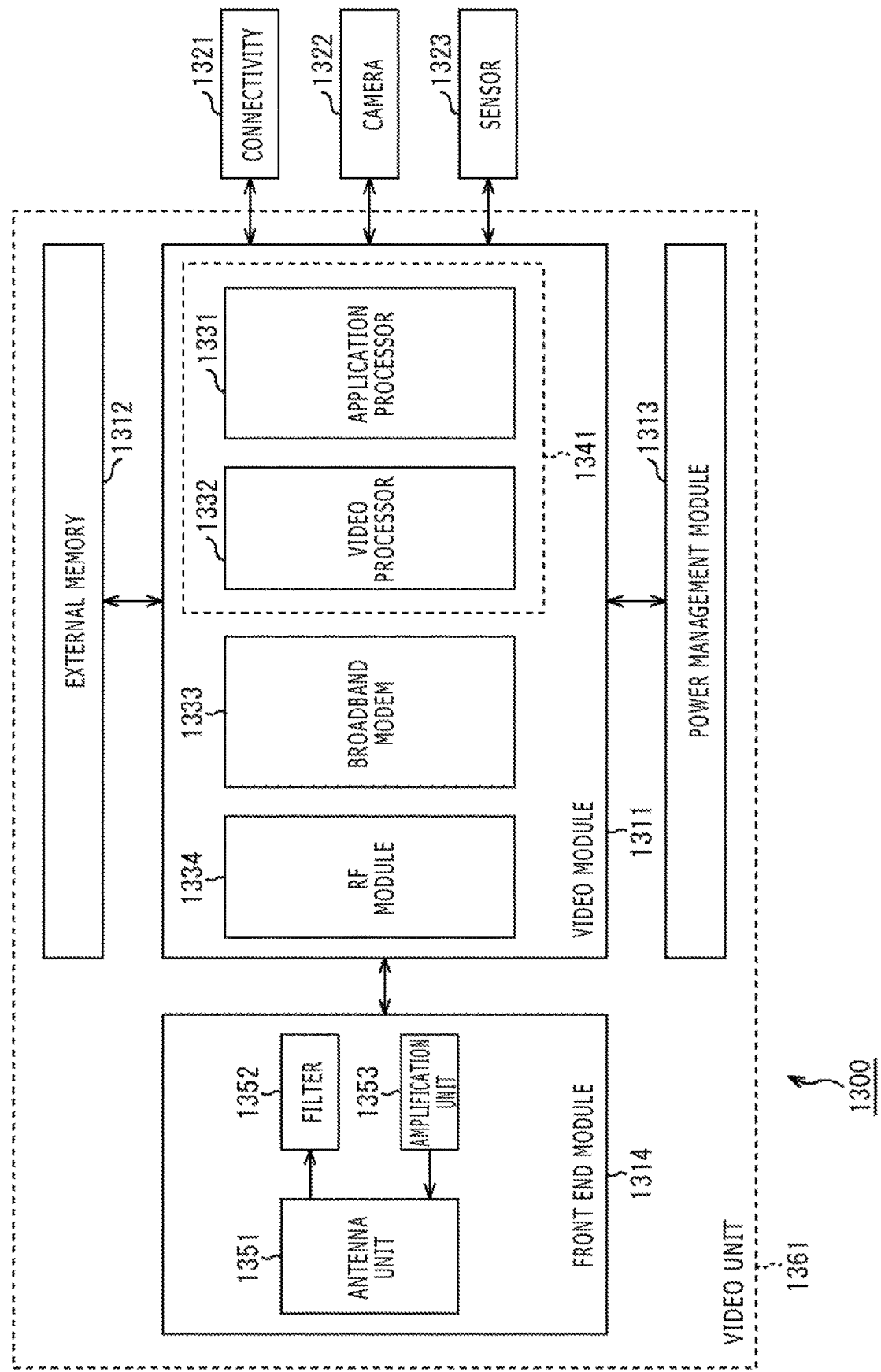
FIG. 29 is a block diagram depicting an example of a general configuration of a video set.

An example of a case in which the present technology is carried out as a set is described with reference to FIG. 29. FIG. 29 depicts an example of a general configuration of a video set to which the present technology is applied.

In recent years, multifunctionality of electronic equipment is advancing, and where some of components of the electronic equipment is carried out as sales, provision or the like in development or manufacture of electronic equipment, not only a case in which the part is carried out as a component having one function but also another case in which the part is carried out by combining a plurality of components having functions related to each other as one set having the plurality of functions have become noticed frequently.

The video set 1300 depicted in FIG. 29 has such a multifunctioned configuration and is a combination of a device having functions relating to encoding and/or decoding of an image (one or both of encoding and decoding may be involved) and a device having a different function relating to the functions.

As depicted in FIG. 29, the video set 1300 includes a module group including a video module 1311, an external memory 1312, a power management module 1313, a front end module 1314 and so forth, and includes devices having relating functions such as a connectivity 1321, a camera 1322, a sensor 1323 and so forth.

A module is a part in which several part functions related to each other are combined such that the part has coherent functions. Although a particular physical configuration is arbitrarily determined, the part may be, for example, an integrated part in which a plurality of processors individually having functions, electronic circuit elements such as resistors and capacitors, other devices and so forth are disposed on a wiring board or the like. Also a new module may be formed by combining a module with a different module, a processor or the like.

In the case of the example of FIG. 29, the video module 1311 is a combination of components having functions relating to image processing and includes an application processor 1331, a video processor 1332, a broadband modem 1333 and an RF (Radio Frequency) module 1334.

A processor is one in which components having predetermined functions are integrated on a semiconductor chip by SOC (System On a Chip) and is called, for example, system LSI or the like. The components having the predetermined functions may be logic circuits (hardware components) or may be a CPU, a ROM, a RAM and so forth and a program (software component) executed using them, or else may be a combination of both of them. For example, a processor may include logic circuits and a CPU, a ROM, a RAM and so forth such that parts of the functions are implemented by the logic circuits (hardware components) and the other functions are implemented by a program (software component) executed by the CPU.

The application processor 1331 of FIG. 29 is a processor that executes an application relating to image processing. The application executed by the application processor 1331 not only can perform an arithmetic operation process in order to implement a predetermined function but also can control components inside and outside the video module 1311 such as, for example, the video processor 1332 as occasion demands.

The video processor 1332 is a processor having a function relating to encoding-decoding (one or both of them) of an image.

The broadband modem 1333 converts data (digital signal), which is to be transmitted by wire or wireless (wire and wireless) broadband communication performed through a broadband line such as the Internet or a public telephone network, into an analog signal by digital modulation or the like or demodulates an analog signal received by the broadband communication to convert the analog signal into data (digital signal). For example, the broadband modem 1333 processes arbitrary information such as image data to be processed by the video processor 1332, a stream in which such image data is encoded, an application program, setting data and so forth.

The RF module 1334 is a module that performs frequency conversion, modulation and demodulation, amplification, a filter process and so forth for an RF signal to be transmitted and received through an antenna. For example, the RF module 1334 performs frequency conversion and so forth for a baseband signal generated by the broadband modem 1333 to generate an RF signal. Further, for example, the RF module 1334 performs frequency conversion and so forth for an RF signal received through the front end module 1314 to generate a baseband signal.

It is to be noted that the application processor 1331 and the video processor 1332 may be integrated so as to be configured as one processor as indicated by a broken line 1341 in FIG. 29.

The external memory 1312 is a module provided externally of the video module 1311 and having a storage device utilized by the video module 1311. Although the storage device of the external memory 1312 may be implemented by any physical configuration, since generally it is frequently utilized for storage of data of a large volume like image data of a unit of a frame, it is preferably implemented using a comparatively less expensive semiconductor memory of a large storage capacity like, for example, a DRAM.

The power management module 1313 manages and controls power supply to the video module 1311 (components in the video module 1311).

The front end module 1314 is a module that provides a front end function (circuit at transmission and reception ends at the antenna side) to the RF module 1334. As depicted in FIG. 29, the front end module 1314 includes, for example, an antenna unit 1351, a filter 1352 and an amplification unit 1353.

The antenna unit 1351 has an antenna for transmitting and receiving a wireless signal and peripheral components. The antenna unit 1351 transmits a signal supplied from the amplification unit 1353 as a wireless signal and supplies a received wireless signal as an electric signal (RF signal) to the filter 1352. The filter 1352 performs a filter process and so forth for an RF signal received through the antenna unit 1351 and supplies the RF signal after the processing to the RF module 1334. The amplification unit 1353 amplifies an RF signal supplied thereto from the RF module 1334 and supplies the amplified RF signal to the antenna unit 1351.

The connectivity 1321 is a module having a function relating to connection to the outside. The connectivity 1321 has an arbitrary physical configuration. For example, the connectivity 1321 has a configuration having a communication function for other than a communication standard with which the broad band modem 1333 is compatible, external input and output terminals and so forth.

For example, the connectivity 1321 may have a module having a communication function that complies with a wireless communication standard such as Bluetooth (registered trademark), IEEE 802.11 (for example, Wi-Fi (Wireless Fidelity, registered trademark)), NFC (Near Field Communication), IrDA (Infrared Data Association) or the like, an antenna for transmitting and receiving a signal that complies with the standard and so forth. Further, for example, the connectivity 1321 may include a module having a communication function that complies with such a wire communication standard as USB, HDMI (registered trademark) (High-Definition Multimedia Interface) or the like or a terminal that complies with the standard. Furthermore, for example, the connectivity 1321 may have a data (signal) transmission function and so forth such as analog input and output terminals and so forth.

It is to be noted that the connectivity 1321 may include a device of a transmission destination of data (signal). For example, the connectivity 1321 may have a drive that performs reading out or writing of data from or into a recording medium such as a magnetic disk, an optical disk, a magneto-optical disk, a semiconductor memory or the like (including not only a drive for removable media but also a hard disk drive, an SSD, an NAS (Network Attached Storage) and so forth). Further, the connectivity 1321 may have an outputting device (monitor, speaker or the like) for an image or sound.

The camera 1322 is a module having a function that picks up an image of an image pickup object to obtain image data of the image pickup object. The image data obtained by image pickup of the camera 1322 is supplied to and encoded by, for example, the video processor 1332.

The sensor 1323 is a module having an arbitrary sensor function such as, for example, a sound sensor, an ultrasonic sensor, an optical sensor, a luminance sensor, an infrared sensor, an image sensor, a rotation sensor, an angle sensor, an angular velocity sensor, a speed sensor, an acceleration sensor, an inclination sensor, a magnetic identification sensor, an impact sensor, a temperature sensor or the like. Data detected by the sensor 1323 is supplied, for example, to the application processor 1331 and utilized by an application or the like.

Any component described as a module hereinabove may be implemented as a processor, or conversely, any component described as a processor may be implemented as a module.

In the video set 1300 having such a configuration as described above, the present technology can be applied to the video processor 1332 as described below. Accordingly, the video set 1300 can be carried out as a set to which the present technology is applied.

<Example of Configuration of Video Processor>

Figure 30:
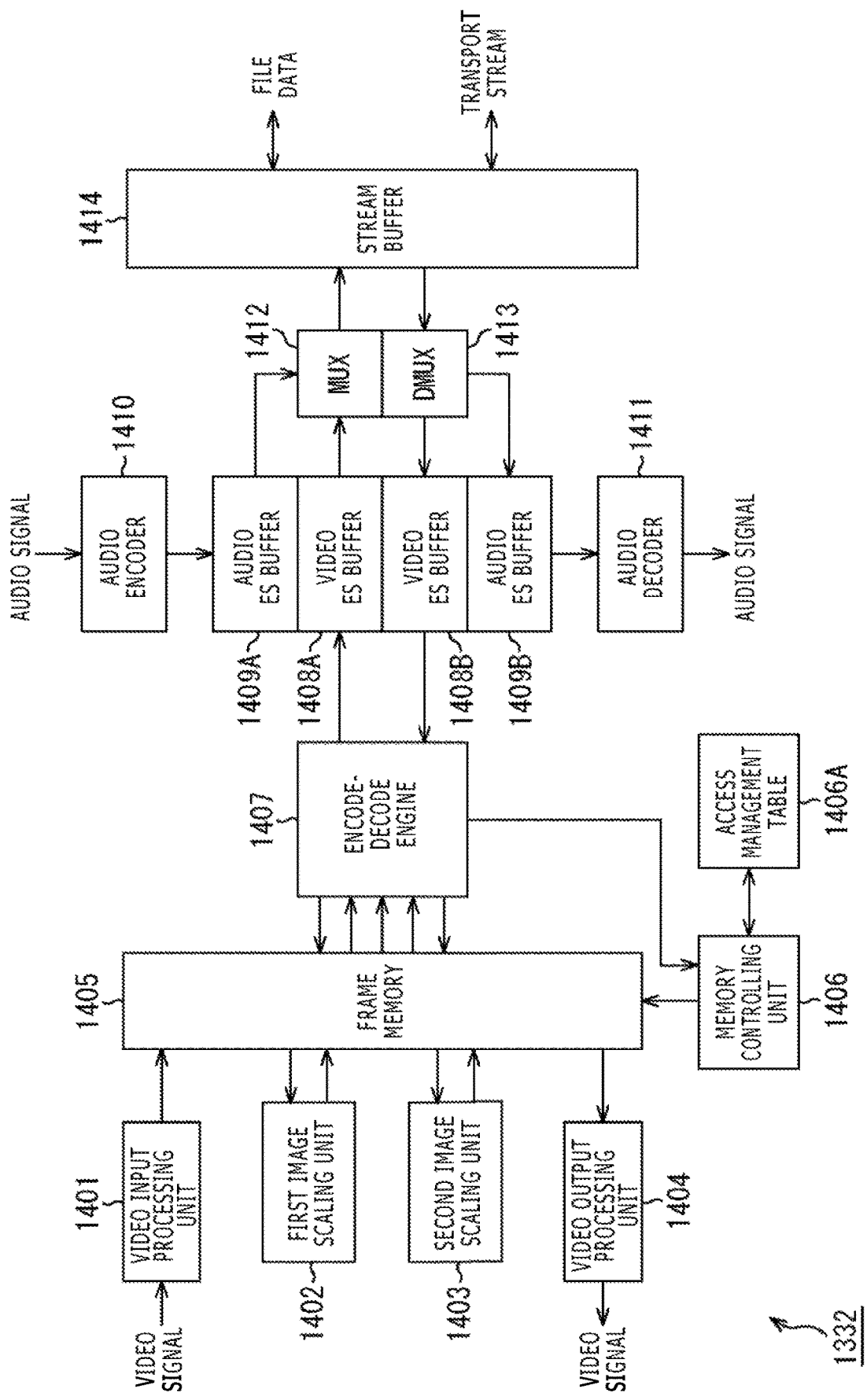
FIG. 30 is a block diagram depicting an example of a general configuration of a video processor.

FIG. 30 depicts an example of a general configuration of the video processor 1332 (FIG. 29) to which the present technology is applied.

In the case of the example of FIG. 30, the video processor 1332 has a function for receiving an input of a video signal and an audio signal and encoding them by a predetermined method and another function for decoding encoded video data and audio data and reproducing and outputting a video signal and an audio signal.

As depicted in FIG. 30, the video processor 1332 includes a video input processing unit 1401, a first image scaling unit 1402, a second image scaling unit 1403, a video output processing unit 1404, a frame memory 1405 and a memory controlling unit 1406. Further, the video processor 1332 includes an encode-decode engine 1407, video ES (Elementary Stream) buffers 1408A and 1408B, and audio ES buffers 1409A and 1409B. Furthermore, the video processor 1332 includes an audio encoder 1410, an audio decoder 1411, a multiplexing unit (MUX (Multiplexer)) 1412, a demultiplexing unit (DMUX (Demultiplexer)) 1413 and a stream buffer 1414.

The video input processing unit 1401 acquires a video signal inputted, for example, from the connectivity 1321 (FIG. 29) or the like and converts the video signal into digital image data. The first image scaling unit 1402 performs format conversion for image data, a scaling process for an image and so forth. The second image scaling unit 1403 performs, for image data, a scaling process for an image in response to a format at the destination of outputting through the video output processing unit 1404 and performs format conversion, a scaling process for an image and so forth similar to those by the first image scaling unit 1402. The video output processing unit 1404 performs format conversion, conversion into an analog signal and so forth for image data and outputs resulting image data as a reproduced video signal, for example, to the connectivity 1321 and so forth.

The frame memory 1405 is a memory for image data commonly used by the video input processing unit 1401, first image scaling unit 1402, second image scaling unit 1403, video output processing unit 1404 and encode-decode engine 1407. The frame memory 1405 is implemented as a semiconductor memory such as, for example, a DRAM or the like.

The memory controlling unit 1406 receives a synchronizing signal from the encode-decode engine 1407 and controls accessing for writing and reading out to and from the frame memory 1405 in accordance with an access schedule to the frame memory 1405 written in an access management table 1406A. The access management table 1406A is updated by the memory controlling unit 1406 in response to a process executed by the encode-decode engine 1407, first image scaling unit 1402, second image scaling unit 1403 and so forth.

The encode-decode engine 1407 performs an encoding process for image data and a decoding process for a video stream that is encoded data of image data. For example, the encode-decode engine 1407 encodes image data read out from the frame memory 1405 and successively writes the image data as a video stream into the video ES buffer 1408A. Further, the encode-decode engine 1407 successively read out a video stream, for example, from another video ES buffer 1408B and decodes the video stream and then successively writes the decoded video stream as image data into the frame memory 1405. In such encoding and decoding, the encode-decode engine 1407 uses the frame memory 1405 as a working area. Further, the encode-decode engine 1407 outputs a synchronizing signal to the memory controlling unit 1406, for example, at a timing at which a process for each macro block is to be started.

The video ES buffer 1408A buffers the video stream generated by the encode-decode engine 1407 and supplies the buffered video stream to the multiplexing unit (MUX) 1412. The video ES buffer 1408B buffers a video stream supplied thereto from the demultiplexing unit (DMUX) 1413 and supplies the buffered video stream to the encode-decode engine 1407.

The audio ES buffer 1409A buffers an audio stream generated by the audio encoder 1410 and supplies the buffered audio stream to the multiplexing unit (MUX) 1412. The audio ES buffer 1409B buffers an audio stream supplied thereto from the demultiplexing unit (DMUX) 1413 and supplies the buffered audio stream to the audio decoder 1411.

The audio encoder 1410, for example, digitally converts an audio signal inputted, for example, from the connectivity 1321 or the like and encodes the digital audio signal in accordance with a predetermined method such as, for example, an MPEG audio method, an AC3 (AudioCode number 3) method or the like. The audio encoder 1410 successively writes an audio stream that is encoded data of the audio signal into the audio ES buffer 1409A. The audio decoder 1411 decodes an audio stream supplied from the audio ES buffer 1409B, performs, for example, conversion into an analog signal and so forth, and supplies the resulting analog signal as a reproduced audio signal, for example, to the connectivity 1321 and so forth.

The multiplexing unit (MUX) 1412 multiplexes a video stream and an audio stream. The method for multiplexing (namely, the format of a bit stream to be generated by the multiplexing) is an arbitrary method. Further, upon such multiplexing, also it is possible for the multiplexing unit (MUX) 1412 to add predetermined header information and so forth to the bit stream. In particular, the multiplexing unit (MUX) 1412 can convert the format of the stream by multiplexing. For example, the multiplexing unit (MUX) 1412 multiplexes a video stream and an audio stream to convert the streams into a transport stream that is a bit stream of a format for transfer. Further, for example, the multiplexing unit (MUX) 1412 converts a video stream and an audio stream into data (file data) of a file format for recording by multiplexing the streams.

The demultiplexing unit (DMUX) 1413 demultiplexes a bit stream, in which a video stream and an audio stream are multiplexed, by a method corresponding to the multiplexing by the multiplexing unit (MUX) 1412. In particular, the demultiplexing unit (DMUX) 1413 extracts a video stream and an audio stream from a bit stream read out from the stream buffer 1414 (separates a video stream and an audio stream). In particular, the demultiplexing unit (DMUX) 1413 can convert the format of a stream by demultiplexing (reverse conversion to the conversion by the multiplexing unit (MUX) 1412). For example, the demultiplexing unit (DMUX) 1413 can acquire a transport stream supplied, for example, from the connectivity 1321, broadband modem 1333 or the like through the stream buffer 1414 and demultiplex the transport stream, thereby converting the transport stream to a video stream and an audio stream. Further, for example, the demultiplexing unit (DMUX) 1413 can acquire file data read out from various types of recording media, for example, by the connectivity 1321 through the stream buffer 1414 and demultiplex the file data, thereby converting the file data to a video stream and an audio stream.

The stream buffer 1414 buffers a bit stream. For example, the stream buffer 1414 buffers a transport stream supplied thereto from the multiplexing unit (MUX) 1412 and supplies the buffered transport stream, for example, to the connectivity 1321, broadband modem 1333 and so forth at a predetermined timing or on the basis of a request from the outside or the like.

Further, for example, the stream buffer 1414 buffers file data supplied thereto from the multiplexing unit (MUX) 1412 and supplies the buffered file data, for example, to the connectivity 1321 and so forth at a predetermined timing or on the basis of a request from the outside or the like such that the file data is recorded into various types of recording media.

Further, the stream buffer 1414 buffers a transport stream acquired, for example, through the connectivity 1321, broadband modem 1333 or the like and supplies the buffered transport stream to the demultiplexing unit (DMUX) 1413 at a predetermined timing or on the basis of a request from the outside or the like.

Further, the stream buffer 1414 buffers file data read out from various types of recording media, for example, by the connectivity 1321 or the like and supplies the buffered file data to the demultiplexing unit (DMUX) 1413 at a predetermined timing or on the basis of a request from the outside or the like.

Now, an example of action of the video processor 1332 having such a configuration as described above is described. A video signal inputted, for example, from the connectivity 1321 or the like to the video processor 1332 is converted into digital image data of a predetermined method such as a 4:2:2Y/Cb/Cr method or the like by the video input processing unit 1401 and successively written into the frame memory 1405. The digital image data is read out by the first image scaling unit 1402 or the second image scaling unit 1403, by which format conversion to that of a predetermined method such as a 4:2:0Y/Cb/Cr method or the like and a scaling process are performed for the digital image data, whereafter resulting image data is written into the frame memory 1405 again. The image data is encoded by the encode-decode engine 1407 and written as a video stream into the video ES buffer 1408A.

Meanwhile, an audio signal inputted from the connectivity 1321 or the like to the video processor 1332 is encoded by the audio encoder 1410 and written as an audio stream into the audio ES buffer 1409A.

The video stream of the video ES buffer 1408A and the audio stream of the audio ES buffer 1409A are read out and multiplexed by the multiplexing unit (MUX) 1412 and converted into a transport stream, file data or the like. The transport stream generated by the multiplexing unit (MUX) 1412 is buffered by the stream buffer 1414 once and then is outputted to an external network, for example, through the connectivity 1321, broadband modem 1333 or the like. Meanwhile, file data generated by the multiplexing unit (MUX) 1412 is buffered by the stream buffer 1414 once and then outputted, for example, to the connectivity 1321 or the like, by which it is recorded into various types of recording media.

Meanwhile, a transport stream inputted from the external network to the video processor 1332, for example, through the connectivity 1321, broadband modem 1333 or the like is buffered once by the stream buffer 1414 and then demultiplexed by the demultiplexing unit (DMUX) 1413. On the other hand, file data read out from various types of recording media, for example, by the connectivity 1321 or the like and inputted to the video processor 1332 is buffered once by the stream buffer 1414 and then demultiplexed by the demultiplexing unit (DMUX) 1413. In particular, a transport stream or file data inputted to the video processor 1332 is demultiplexed into a video stream and an audio stream by the demultiplexing unit (DMUX) 1413.

The audio stream is supplied through the audio ES buffer 1409B to the audio decoder 1411, by which it is decoded to reproduce an audio signal. Meanwhile, the video stream is successively read out and decoded, after it is written into the video ES buffer 1408B, by the encode-decode engine 1407 and written into the frame memory 1405. The decoded image data is subjected to a scaling process by the second image scaling unit 1403 and written into the frame memory 1405. Then, the decoded image data is read out into the video output processing unit 1404, by which the format thereof is converted into a format of a predetermined method such as the 4:2:2Y/Cb/Cr method and then converted into an analog signal to reproduce and output the video signal.

Where the present technology is applied to the video processor 1332 configured in such a manner as described above, the present technology described hereinabove may be applied to the encode-decode engine 1407. In particular, for example, the encode-decode engine 1407 may be provided with the functions of the image encoding device 100 described hereinabove. This makes it possible for the video processor 1332 to achieve effects similar to those described hereinabove with reference to FIGS. 1 to 17.

It is to be noted that, in the encode-decode engine 1407, the present technology (namely, the functions of the image encoding device 100 described hereinabove) may be implemented by hardware such as logic circuits or may be implemented by software such as an embedded program or otherwise may be implemented by both of hardware and software.

<Different Example of Configuration of Video Processor>

FIG. 31 depicts a different example of a general configuration of the video processor 1332 to which the present technology is applied. In the case of the example of FIG. 31, the video processor 1332 has a function for encoding and decoding video data by a predetermined method.

More particularly, as depicted in FIG. 31, the video processor 1332 includes a control unit 1511, a display interface 1512, a display engine 1513, an image processing engine 1514 and an internal memory 1515. Further, the video processor 1332 includes a codec engine 1516, a memory interface 1517, a multiplexer and demultiplexer unit (MUX DMUX) 1518, a network interface 1519 and a video interface 1520.

The control unit 1511 controls action of the processing units in the video processor 1332 such as the display interface 1512, display engine 1513, image processing engine 1514, codec engine 1516 and so forth.

As depicted in FIG. 31, the control unit 1511 includes, for example, a main CPU 1531, a sub CPU 1532 and a system controller 1533. The main CPU 1531 executes a program and so forth for controlling action of the processing units in the video processor 1332. The main CPU 1531 generates a control signal in accordance with the program and so forth and supplies the control signal to the processing units (in short, controls action of the processing units). The sub CPU 1532 plays an auxiliary role of the main CPU 1531. For example, the sub CPU 1532 executes a child process, a subroutine or the like of a program or the like to be executed by the main CPU 1531. The system controller 1533 controls action of the main CPU 1531 and the sub CPU 1532 such as to designate a program to be executed by the main CPU 1531 and the sub CPU 1532.

The display interface 1512 outputs image data, for example, to the connectivity 1321 and so forth under the control of the control unit 1511. For example, the display interface 1512 converts image data of digital data into an analog signal and outputs the analog signal as a reproduced video signal, or outputs the image data of the digital data as it is, to the monitor apparatus of the connectivity 1321 or the like.

The display engine 1513 performs, under the control of the control unit 1511, various conversion processes such as format conversion, size conversion, color gamut conversion and so forth for image data so as to satisfy hardware specifications of the monitor apparatus or the like on which an image of the image data is to be displayed.

The image processing engine 1514 performs a predetermined image process such as, for example, a filter process or the like for improving the picture quality for image data under the control of the control unit 1511.

The internal memory 1515 is a memory provided in the inside of the video processor 1332 and commonly used by the display engine 1513, image processing engine 1514 and codec engine 1516. The internal memory 1515 is utilized for transmission and reception of data performed, for example, between different ones of the display engine 1513, image processing engine 1514 and codec engine 1516. For example, the internal memory 1515 stores data supplied from the display engine 1513, image processing engine 1514 or codec engine 1516 and supplies the data to the display engine 1513, image processing engine 1514 or codec engine 1516 as occasion demands (for example, in response to a request). Although this internal memory 1515 may be implemented by any storage device, since generally it is frequently utilized for storage of data of a small volume such as image data of a unit of a block, parameters or the like, it is preferably implemented by a semiconductor memory that has a high response speed although it has a comparatively small (for example, in comparison with the external memory 1312) storage capacity like, for example, an SRAM.

The codec engine 1516 performs processing relating to encoding and decoding of image data. The encoding and decoding method with which the codec engine 1516 is compatible is an arbitrary method, and the number of such methods may be one or a plural number. For example, the codec engine 1516 may include a codec function of a plurality of encoding and decoding methods such that a selected one of the methods may be used to perform encoding of image data or decoding of encoded data.

In the example depicted in FIG. 31, the codec engine 1516 includes, as function blocks for processing relating to codec, for example, an MPEG-2 Video 1541, an AVC/H.264 1542, an HEVC/H.265 1543, an HEVC/H.265 (Scalable) 1544, an HEVC/H.265 (Multi-view) 1545 and an MPEG-DASH 1551.

The MPEG-2 Video 1541 is a function block that encodes and decodes image data by the MPEG-2 method. The AVC/H.264 1542 is a function block for encoding and decoding image data by the AVC method. The HEVC/H.265 1543 is a function block for encoding and decoding image data by the HEVC method. The HEVC/H.265 (Scalable) 1544 is a function block for scalably encoding and scalably decoding image data by the HEVC method. The HEVC/H.265 (Multi-view) 1545 is a function block for multi-view encoding and multi-view decoding image data by the HEVC method.

The MPEG-DASH 1551 is a function block for transmitting and receiving image data by the MPEG-DASH method. The MPEG-DASH is a technology for performing streaming of a video using the HTTP and has one of characteristics in that appropriate encoded data is selected and transmitted in a unit of a segment from among a plurality of encoded data prepared in advance which are different from each other in resolution and so forth. The MPEG-DASH 1551 performs generation of a stream that complies with the standard, transmission control of the stream and so forth and utilizes, in encoding and decoding of image data, the function blocks from the MPEG-2 Video 1541 to the HEVC/H.265 (Multiview) 1545 described above.

The memory interface 1517 is an interface for the external memory 1312. Data supplied from the image processing engine 1514 or the codec engine 1516 is supplied to the external memory 1312 through the memory interface 1517. On the other hand, data read out from the external memory 1312 is supplied to the video processor 1332 (image processing engine 1514 or codec engine 1516) through the memory interface 1517.

The multiplexer and demultiplexer unit (MUX DMUX) 1518 performs multiplexing and demultiplexing of various types of data relating to an image such as a bit stream of encoded data, image data, a video signal or the like. The method for such multiplexing and demultiplexing is an arbitrary method. For example, upon multiplexing, the multiplexer and demultiplexer unit (MUX DMUX) 1518 not only can combine a plurality of data into one piece of data but also can add predetermined header information and so forth to the data. On the other hand, upon demultiplexing, the multiplexer and demultiplexer unit (MUX DMUX) 1518 can not only divide one piece of data into a plurality of data but also can add predetermined header information and so forth to each of the divisional data. In other words, the multiplexer and demultiplexer unit (MUX DMUX) 1518 can convert the format of data by multiplexing or demultiplexing. For example, the multiplexer and demultiplexer unit (MUX DMUX) 1518 can multiplex a bit stream to convert the bit stream into a transport stream that is a bit stream of a format for transfer or into data (file data) of a file format for recording. Naturally, also reverse conversion can be performed by demultiplexing.

The network interface 1519 is an interface, for example, for the broadband modem 1333, connectivity 1321 and so forth. The video interface 1520 is an interface, for example, for the connectivity 1321, camera 1322 and so forth.

Now, an example of action of such a video processor 1332 as described above is described. For example, if the video processor 1332 receives a transport stream from an external network through the connectivity 1321, broadband modem 1333 or the like, then the transport stream is supplied to the multiplexer and demultiplexer unit (MUX DMUX) 1518 through the network interface 1519 and demultiplexed by the multiplexer and demultiplexer unit (MUX DMUX) 1518 and then decoded by the codec engine 1516. Image data obtained by the decoding of the codec engine 1516 is subjected, for example, to a predetermined image process by the image processing engine 1514 and then to predetermined conversion by the display engine 1513, whereafter it is supplied through the display interface 1512, for example, to the connectivity 1321 or the like and an image of the image data is displayed on the monitor. Further, image data obtained, for example, by decoding by the codec engine 1516 is re-encoded by the codec engine 1516 and multiplexed by the multiplexer and demultiplexer unit (MUX DMUX) 1518 so as to be converted into file data. The file data is outputted through the video interface 1520, for example, to the connectivity 1321 or the like, by which it is recorded into various recording media.

Furthermore, file data of encoded data obtained by encoding image data and read out from a recording medium not depicted, for example, by the connectivity 1321 or the like is supplied through the video interface 1520 to and demultiplexed by the multiplexer and demultiplexer unit (MUX DMUX) 1518 and then is decoded by the codec engine 1516. Image data obtained by the decoding of the codec engine 1516 is subjected to a predetermined image process by the image processing engine 1514 and to predetermined conversion by the display engine 1513, and is supplied through the display interface 1512, for example, to the connectivity 1321 or the like, by which an image of the data is displayed on the monitor. Meanwhile, image data obtained by decoding, for example, by the codec engine 1516 is re-encoded by the codec engine 1516, multiplexed by the multiplexer and demultiplexer unit (MUX DMUX) 1518 so as to be converted into a transport stream and supplied to the connectivity 1321, broadband modem 1333 or the like through the network interface 1519 and transmitted to a different apparatus not depicted.

It is to be noted that transfer of image data and other data between the processing units in the video processor 1332 is performed utilizing, for example, the internal memory 1515 or the external memory 1312. Further, the power management module 1313 controls power supply, for example, to the control unit 1511.

Where the present technology is applied to the video processor 1332 configured in such a manner as described above, the present technology described hereinabove may be applied to the codec engine 1516. In other words, for example, the codec engine 1516 may be configured so as to have a function block that implements the image encoding device 100 described hereinabove. By configuring the codec engine 1516 in this manner, the video processor 1332 can achieve effects similar to those described hereinabove with reference to FIGS. 1 to 17.

It is to be noted that, in the codec engine 1516, the present technology (namely, functions of the image encoding device 100 described hereinabove) may be implemented by hardware such as logic circuits or the like or may be implemented by software such as an embedded program or the like or else may be implemented by both of them.

While the two examples of the configuration of the video processor 1332 are exemplified above, the video processor 1332 may have an arbitrary configuration and have a configuration other than those of the two examples described above. Further, although the video processor 1332 may be configured as one semiconductor chip, it may otherwise be configured as a plurality of semiconductor chips. For example, the video processor 1332 may be configured as a three-dimensional multilayer LSI in which a plurality of semiconductors are layered. Further, the video processor 1332 may be implemented by a plurality of LSIs.

<Application Example to Apparatus>

The video set 1300 can be incorporated in various types of apparatus for processing image data. For example, the video set 1300 can be incorporated in the television apparatus 900 (FIG. 25), portable telephone set 920 (FIG. 26), recording and reproduction apparatus 940 (FIG. 27), image pickup apparatus 960 (FIG. 28) and so forth. By incorporating the video set 1300, the apparatus can achieve effects similar to those described hereinabove with reference to FIGS. 1 to 17.

It is to be noted that, if even part of the components of the video set 1300 described hereinabove includes the video processor 1332, then it can be carried out as a component to which the present technology is applied. For example, only the video processor 1332 can be carried out as a video processor to which the present technology is applied. Further, for example, the processor indicated by the broken line 1341, the video module 1311 or the like described hereinabove can be carried out as a processor, a module or the like to which the present technology is applied. Also it is possible to combine, for example, the video module 1311, external memory 1312, power management module 1313 and front end module 1314 so as to carry out the combination as a video unit 1361 to which the present technology is applied. In the case of any component, effects similar to those described hereinabove with reference to FIGS. 1 to 17 can be achieved.

In particular, if the video processor 1332 is included, then any component can be incorporated into various apparatus for processing image data similarly as in the case of the video set 1300. For example, the video processor 1332, processor indicated by the broken line 1341, video module 1311 or video unit 1361 can be incorporated into the television apparatus 900 (FIG. 25), portable telephone set 920 (FIG. 26), recording and reproduction apparatus 940 (FIG. 27), image pickup apparatus 960 (FIG. 28) and so forth. Further, by incorporating any of the components to which the present technology is applied, the apparatus can achieve effects similar to those described hereinabove with reference to FIGS. 1 to 17 similarly as in the case of the video set 1300.

Further, in the present specification, an example is described in which various kinds of information is multiplexed into an encoded stream and transmitted from the encoding side to the decoding side. However, the technique for transmitting the information is not limited to this example. For example, the information may be transmitted or recorded as mutually separate data associated with an encoded bit stream without being multiplexed into an encoded bit stream. Here, the term "associated" signifies that an image included in a bit stream (also part of an image such as a slice, a block or the like may be applicable) and information corresponding to the image can be made capable of being linked with each other upon decoding. In other words, the information may be transmitted on a transmission line different from that on which the image (or bit stream) is transmitted. Further, the information may be recorded in a recording medium different from that in which the image (or bit stream) is recorded (or in a different recording area in the same recording medium). Furthermore, the information and the image (or bit stream) may be associated with each other in an arbitrary unit such as, for example, a plurality of frames, one frame, one portion in a frame or the like.

It is to be noted that also it is possible for the present technology to have such configurations as described below.
(1) An image processing device including:
a decoding unit configured to decode encoded data obtained by lossy encoding an image of a frame encoded already which is used as a reference image in encoding of an image of a current frame and perform rounding of a decoded image obtained by the decoding with a rounding value whose value is changed over in a time direction of the image.
(2) The image processing device according to (1), wherein the decoding unit changes over the rounding value at a random timing.
(3) The image processing device according to (1) or (2), wherein
the decoding unit changes over the rounding value for each frame of the image.
(4) The image processing device according to (3), wherein the decoding unit performs the changeover of the rounding value based on a POC included in header information of the encoded data of the image.
(5) The image processing device according to any one of (1) to (4), wherein
the decoding unit changes over the rounding value at a P picture.
(6) The image processing device according to (5), wherein the decoding unit performs rounding of an I picture and a B picture using a rounding value having comparatively good characteristics from among a plurality of rounding values that are to be used for rounding of the P picture.
(7) The image processing device according to (5) or (6), wherein
the decoding unit performs the changeover of the rounding value based on information indicative of POC and information indicative of a picture type both included in header information of the encoded data of the image.
(8) The image processing device according to any one of (1) to (7), wherein
the decoding unit changes over the rounding value at a block of a picture that is a target for changing over the rounding value, an orthogonal transformation coefficient being generated in the block in encoding of the image for the compensation for an error caused by lossy encoding of the image of the frame encoded already.
(9) The image processing device according to (8), wherein the decoding unit changes over the rounding value at the block of a P picture.
(10) The image processing device according to (9), wherein the decoding unit performs rounding of an I picture and a B picture and rounding of a block of the P picture other than the block using a rounding value having comparatively good characteristics from among a plurality of rounding values that are to be used for the rounding of the block of the P picture.
(11) The image processing device according to any one of (8) to (10), wherein
the decoding unit performs the changeover of the rounding value based on information indicative of a POC and information indicative of a picture type both included in header information of the encoded data of the image and information relating to a generation quantity of the orthogonal transformation coefficient.
(12) The image processing device according to any one of (1) to (11), wherein
the decoding unit performs the rounding for lower bits of each pixel value of the decoded image.
(13) The image processing device according to any one of (1) to (12), wherein
the decoding unit uses a random number whose value is updated in a time direction of the image as the rounding value.
(14) The image processing device according to any one of (1) to (13), wherein
the decoding unit alternately uses two 5-bit values "10000" and "01111" in a time direction of the image as the rounding value.
(15) The image processing device according to any one of (1) to (13), wherein
the decoding unit uses three 4-bit values "1001," "1000" and "0111" in order in a time direction of the image as the rounding value.
(16) The image processing device according to any one of (1) to (15), wherein
the decoding unit changes over the rounding value in a time direction of the image so as to decrease an orthogonal transformation coefficient that is generated in the encoding of the image for the compensation for an error caused by lossy encoding for the image of the frame encoded already.

(17) The image processing device according to any one of (1) to (16), further including:
a storage unit configured to store the encoded data, wherein the decoding unit decodes the encoded data read out from the storage unit and performs rounding of a decoded image obtained by the decoding.
(18) The image processing device according to (17), further including:
an encoding unit configured to lossy encode an image of a frame encoded already which is used as the reference image, wherein
the storage unit stores the encoded data generated by the lossy encoding by the encoding unit.
(19) The image processing device according to any one of (1) to (18), further including:
an orthogonal transformation unit configured to orthogonally transform a difference image between the image of the current frame and the reference image obtained by the decoding by the decoding unit to generate an orthogonal transformation coefficient for the compensation for an error caused by the lossy encoding for the image of the frame encoded already.
(20) An image processing method including:
decoding encoded data obtained by lossy encoding an image of a frame encoded already which is used as a reference image in encoding of an image of a current frame; and
performing rounding of a decoded image obtained by the decoding with a rounding value whose value is changed over in a time direction of the image.

REFERENCE SIGNS LIST

100 Image encoding device, 113 Orthogonal transformation unit, 115 Lossless encoding unit, 120 Loop filter, 121 Encoding unit, 122 Frame memory, 123 Decoding unit, 124 Intra prediction unit, 125 Inter prediction unit, 128 Header information generation unit, 150 Image decoding device, 166 Loop filter, 168 Frame memory, 169 Intra prediction unit, 170 Inter prediction unit, 181 Decoding unit, 182 Rounding processing unit (type 1), 183 Rounding processing unit (type 2), 184 Selection unit, 185 Arithmetic operation unit, 191 Selection unit

The invention claimed is:
1. An image processing device, comprising:
an encoder configured to generate simplified encoded data based on lossy encode of a previous frame image of a plurality of frame images, wherein
a current frame image of the plurality of frame images is encoded based on a reference image, and
the reference image corresponds to the previous frame image; and
a decoder configured to:
decode the simplified encoded data to generate decoded data;
add a rounding value to the decoded data to compensate for an error between the previous frame image and the simplified encoded data, wherein
the error is based on the lossy encode of the previous frame image,
the previous frame image is encoded with respect to an obtained reference image, and
the current frame image is subsequent to the previous frame image.
2. The image processing device according to claim 1, wherein the decoder is further configured to change the rounding value at a random timing.
3. The image processing device according to claim 1, wherein the decoder is further configured to change the rounding value for each frame image of the plurality of frame images.
4. The image processing device according to claim 3, wherein
header information of the simplified encoded data includes a picture order count (POC), and
the decoder is further configured to change the rounding value based on the POC.
5. The image processing device according to claim 1, wherein the decoder is further configured to change the rounding value at a P picture.
6. The image processing device according to claim 5, wherein
the decoder is further configured to compensate an I picture and a B picture based on a particular rounding value of a plurality of rounding values associated with the compensation of the P picture, and
the particular rounding value exhibits specific characteristics from among the plurality of rounding values.
7. The image processing device according to claim 5, wherein
header information of the simplified encoded data includes:
first information that indicates a picture order count (POC); and
second information that indicates a picture type, and
the decoder is further configured to change the rounding value based on the first information and the second information.
8. The image processing device according to claim 1, further comprising a processor configured to generate an orthogonal transformation coefficient based on the encode of the previous frame image, wherein
the compensation for the error is based on the generated orthogonal transformation coefficient, and
the decoder is further configured to change the rounding value at a first block of a picture based on the generated orthogonal transformation coefficient.
9. The image processing device according to claim 8, wherein the decoder is further configured to change the rounding value at the first block of a P picture.
10. The image processing device according to claim 9, wherein
the decoder is further configured to compensate an I picture, a B picture and a second block of the P picture based on a particular rounding value of a plurality of rounding values associated with compensation of the first block of the P picture, and
the particular rounding value exhibits specific characteristics from among the plurality of rounding values.
11. The image processing device according to claim 8, wherein
header information of the simplified encoded data includes:
first information that indicates a picture order count (POC);
second information that indicates a picture type; and
third information that indicates a generation quantity of the orthogonal transformation coefficient, and
the decoder is further configured to change the rounding value based on the first information, the second information, and the third information.
12. The image processing device according to claim 1, wherein the decoder is further configured to compensate lower bits of each pixel value of the decoded data.

13. The image processing device according to claim 1, wherein
the rounding value is a random number, and
the decoder is further configured to update a value of the random number in a time direction of the previous frame image.

14. The image processing device according to claim 1, wherein the decoder is further configured to alternately update the rounding value in a time direction of the previous frame image with two 5-bit values "10000" and "01111".

15. The image processing device according to claim 1, wherein the decoder is further configured to update the rounding value in a time direction of the previous frame image with three 4-bit values "1001," "1000" and "0111" in order.

16. The image processing device according to claim 1, further comprising a processor configured to generate an orthogonal transformation coefficient based on the encode of the previous frame image wherein,
the compensation for the error is based on the generated orthogonal transformation coefficient, and
the decoder is further configured to:
change the rounding value in a time direction of the previous frame image; and
decrease the orthogonal transformation coefficient based on the change of the rounding value.

17. The image processing device according to claim 1, further comprising a memory configured to store the simplified encoded data, wherein
the decoder is further configured to obtain the simplified encoded data from the memory.

18. The image processing device according to claim 1, further comprising a processor configured to:
orthogonally transform a difference image between the current frame image and the reference image; and
generate an orthogonal transformation coefficient for the compensation for the error.

19. An image processing method, comprising:
generating simplified encoded data based on lossy encode of a previous frame image of a plurality of frame images, wherein
a current frame image of the plurality of frame images is encoded based on a reference image, and
the reference image corresponds to the previous frame image;
decoding the simplified encoded data to generate decoded data; and
adding a first rounding value to the decoded data to compensate for an error between the previous frame image and the simplified encoded data, wherein
the error is based on the lossy encode of the previous frame image,
the previous frame image is encoded with respect to an obtained reference image, and
the current frame image is subsequent to the previous frame image.

* * * * *